May 7, 1946.　　　S. N. WIGHT ET AL　　　2,399,777
AIRWAY TRAFFIC CONTROL SYSTEM
Filed Aug. 31, 1943　　　20 Sheets-Sheet 1

Inventors,
S.N.Wight, O.S.Field and O.H.Dicke,
By Neil W. Preston,
their Attorney.

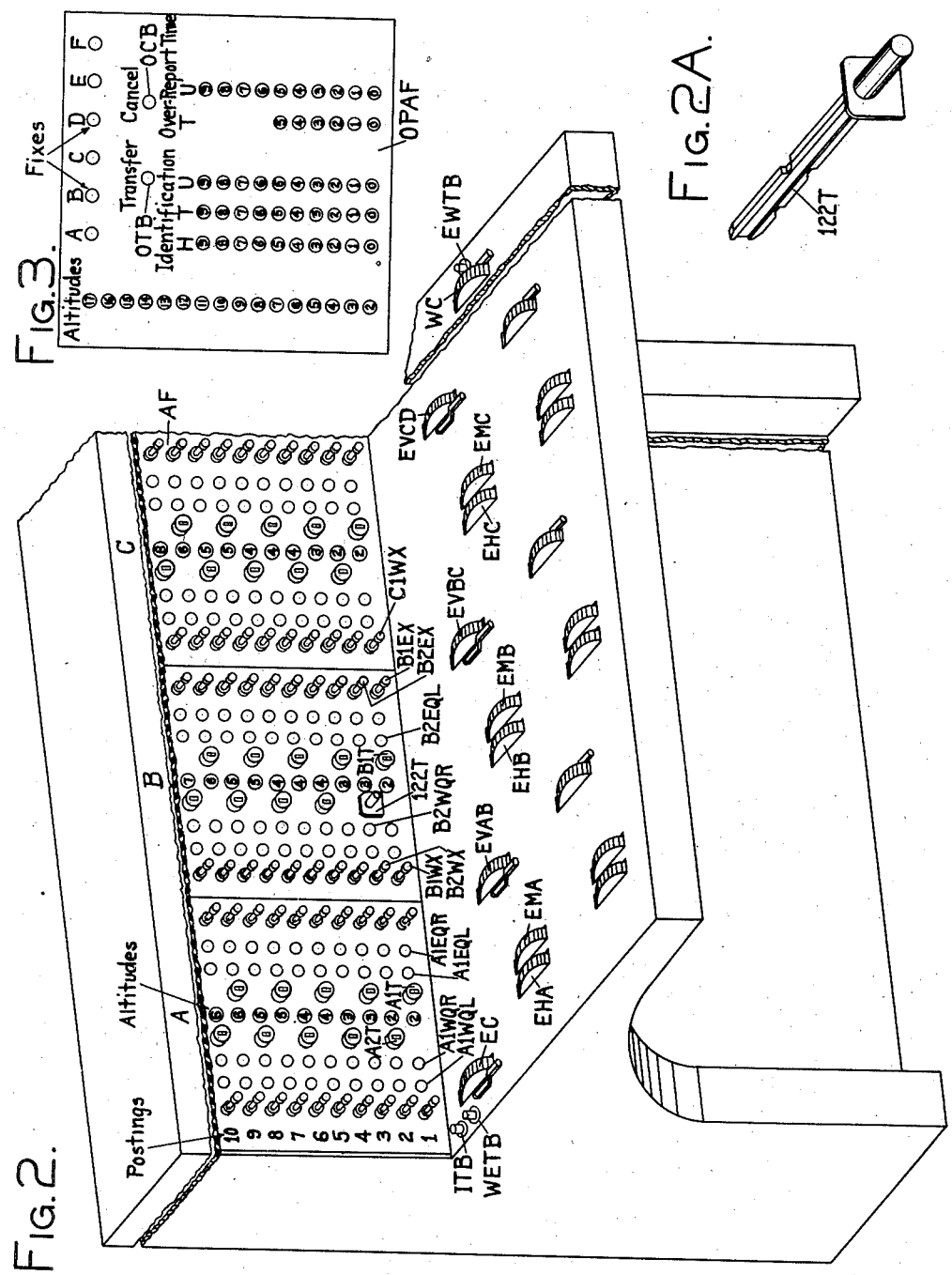

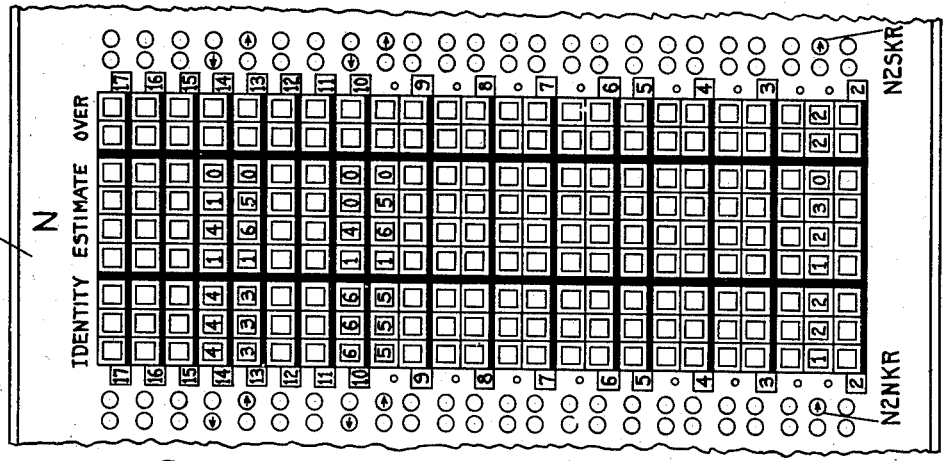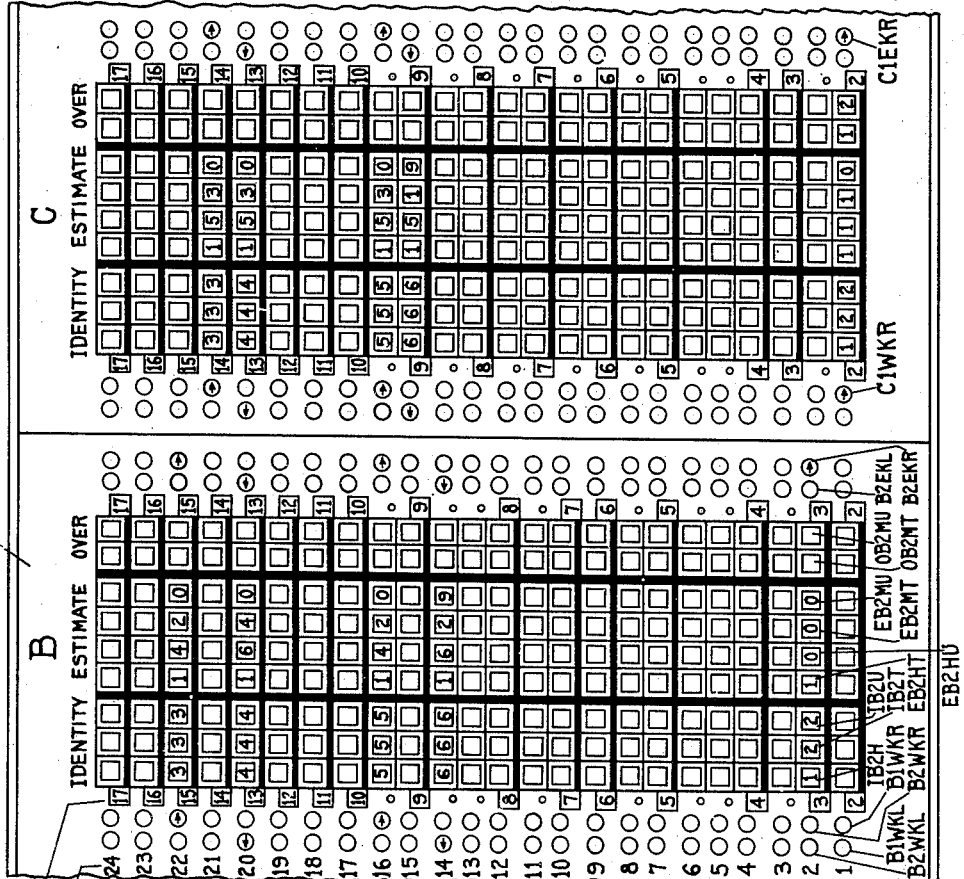

May 7, 1946.    S. N. WIGHT ET AL    2,399,777
AIRWAY TRAFFIC CONTROL SYSTEM
Filed Aug. 31, 1943    20 Sheets-Sheet 5

Inventors,
S. N. Wight, O. S. Field and O. H. Dicke,
Neil W. Alston,
their Attorney.

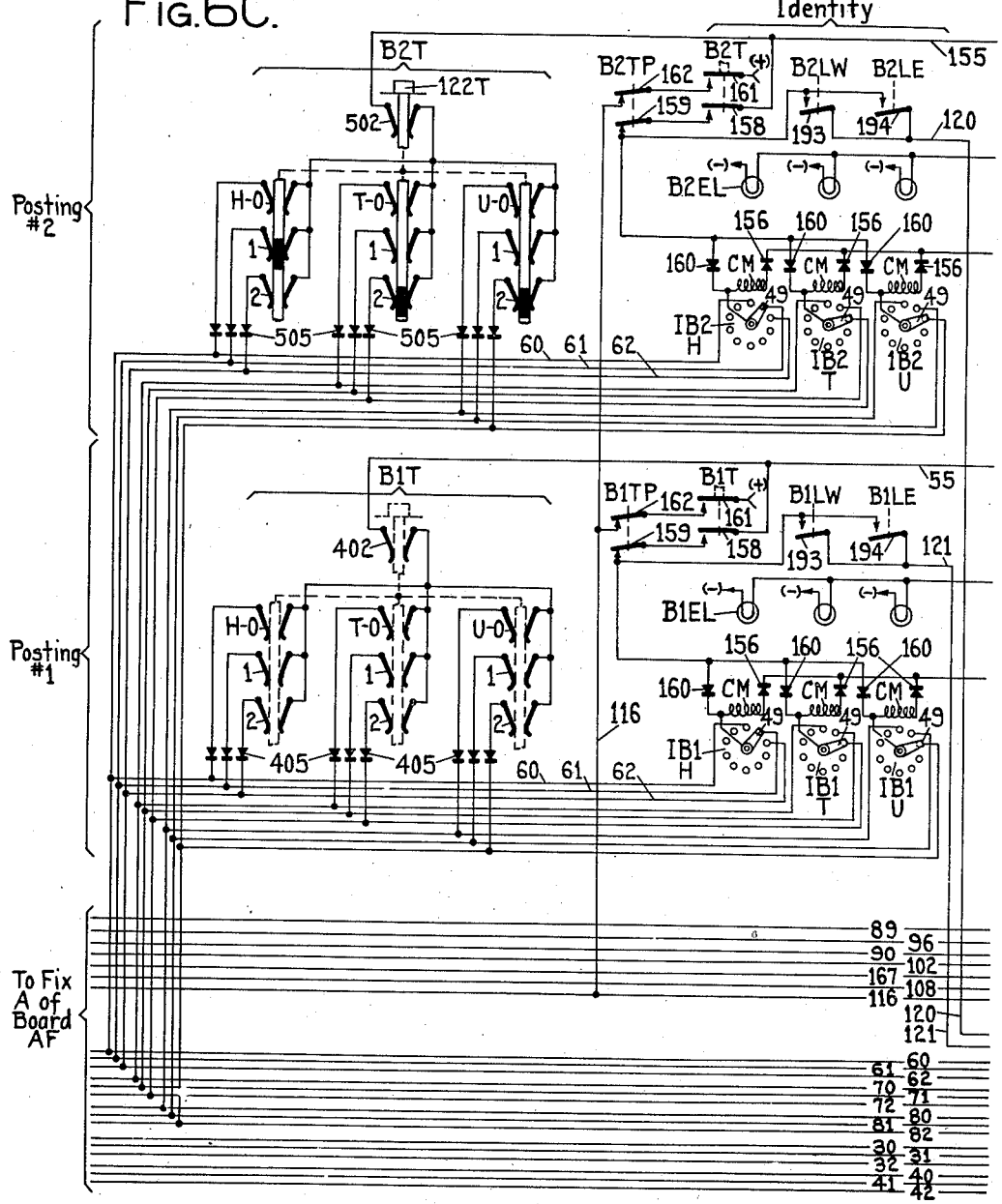

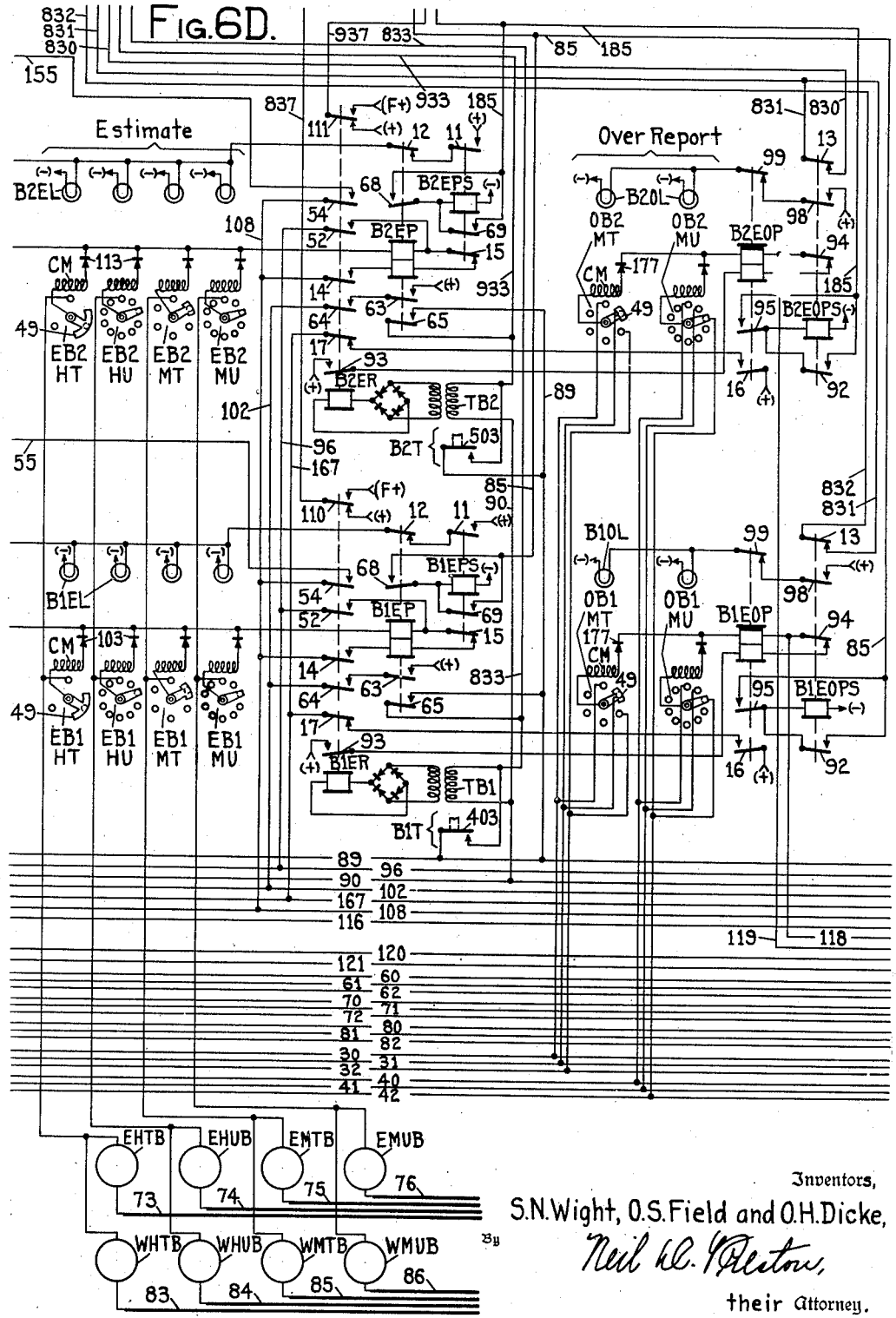

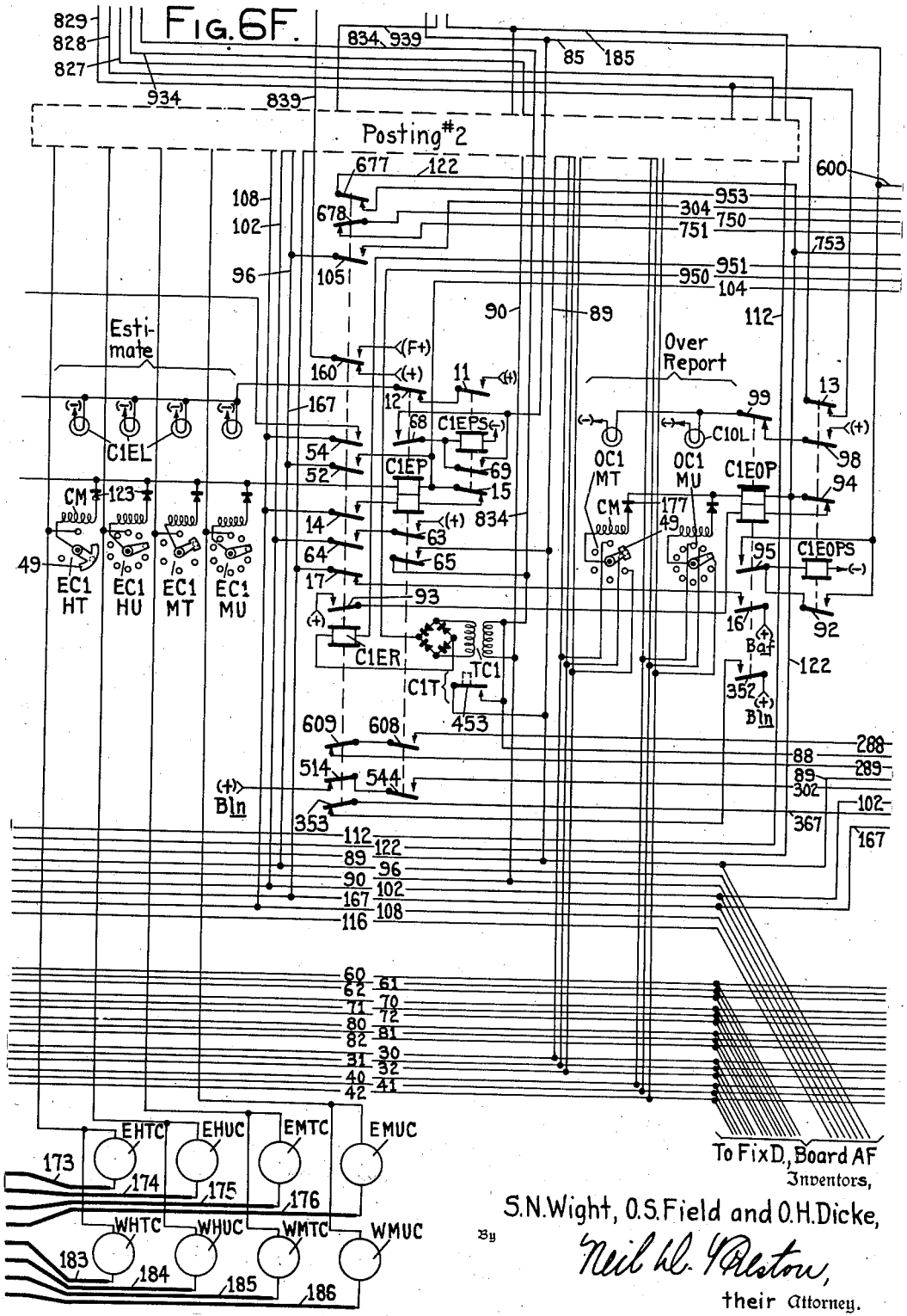

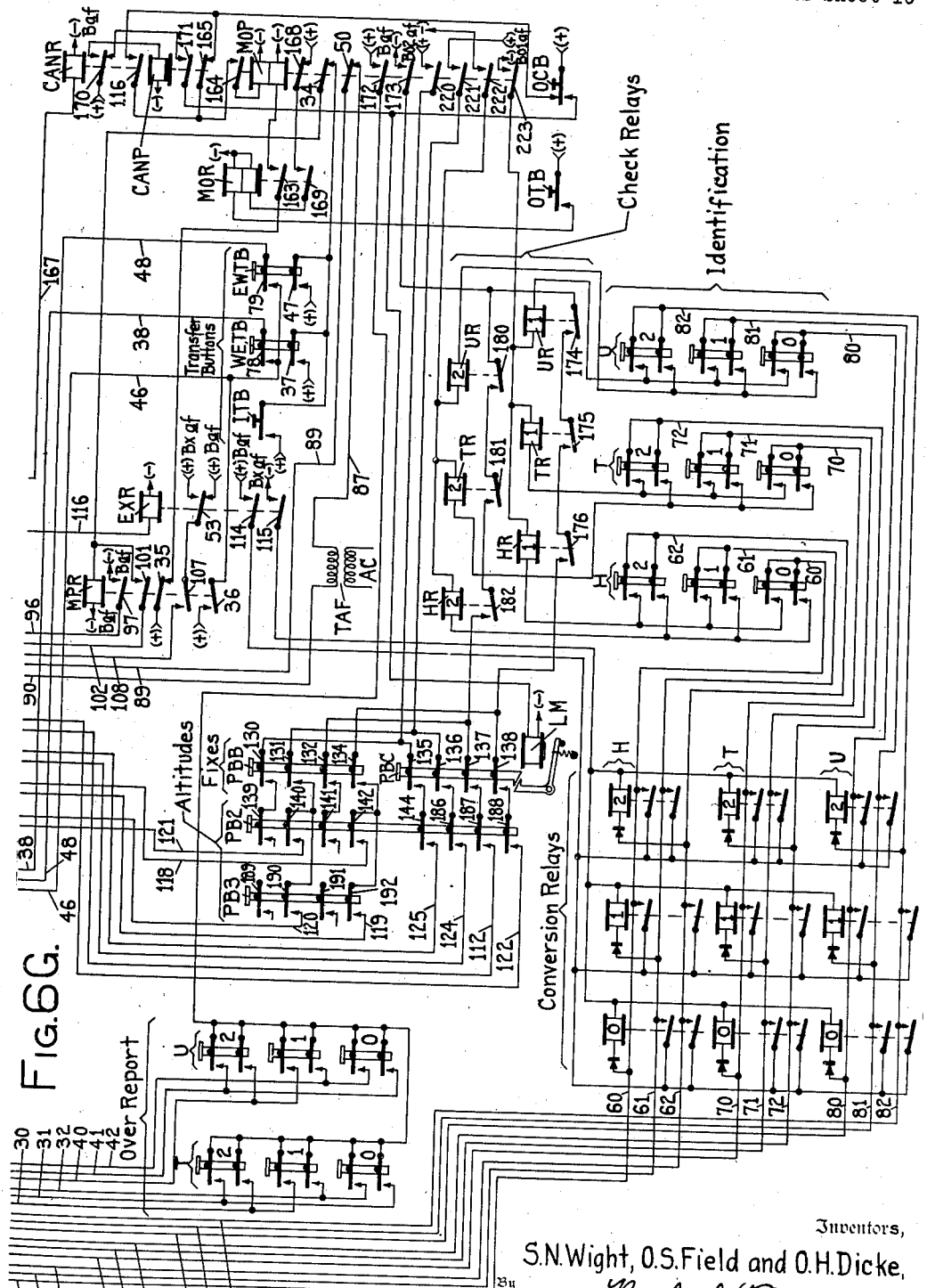

May 7, 1946.  S. N. WIGHT ET AL  2,399,777
AIRWAY TRAFFIC CONTROL SYSTEM
Filed Aug. 31, 1943   20 Sheets-Sheet 11

Fig. 6H.

Inventors,
S. N. Wight, O. S. Field and O. H. Dicke,
By Neil A. Preston,
their Attorney.

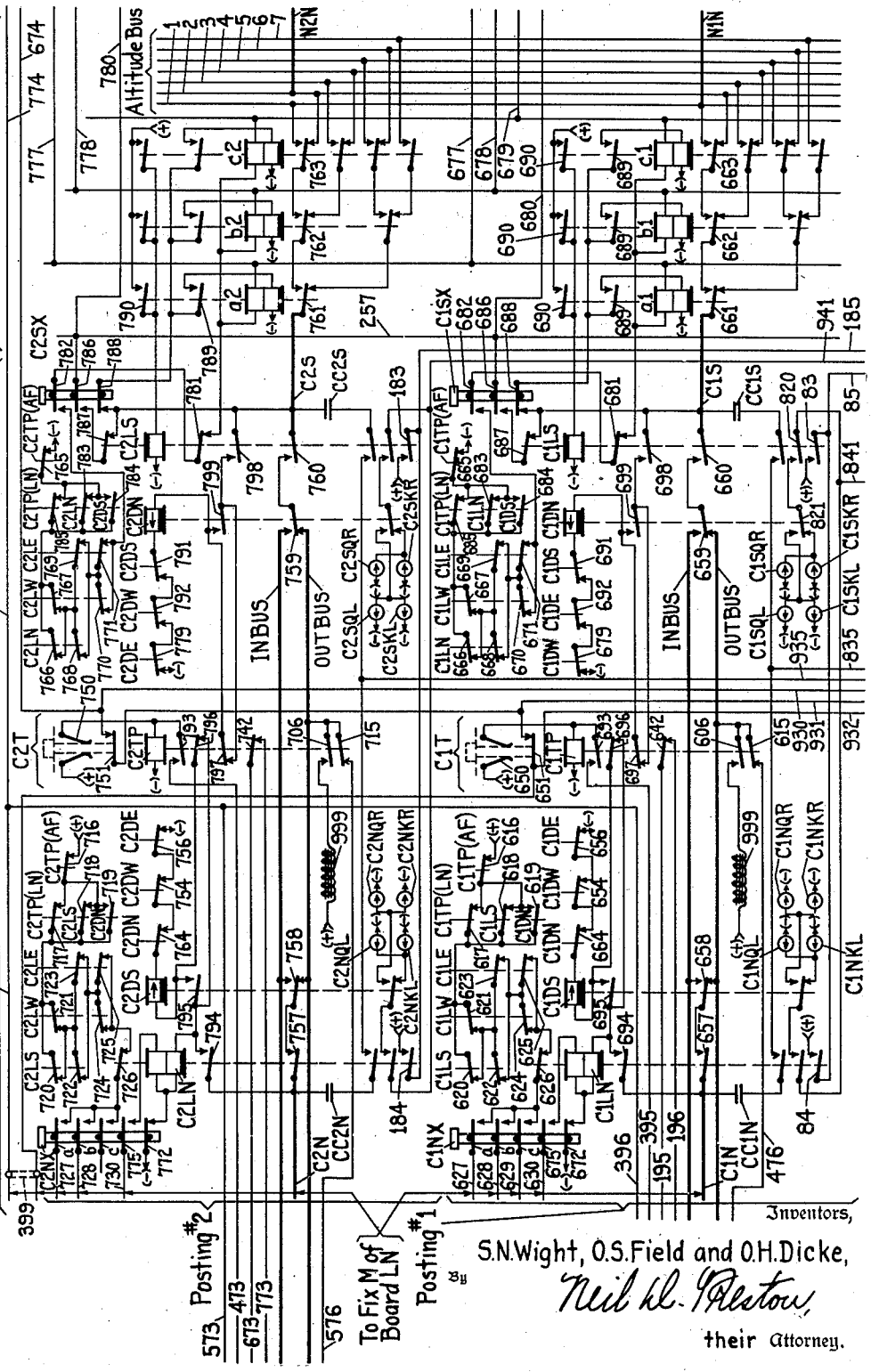

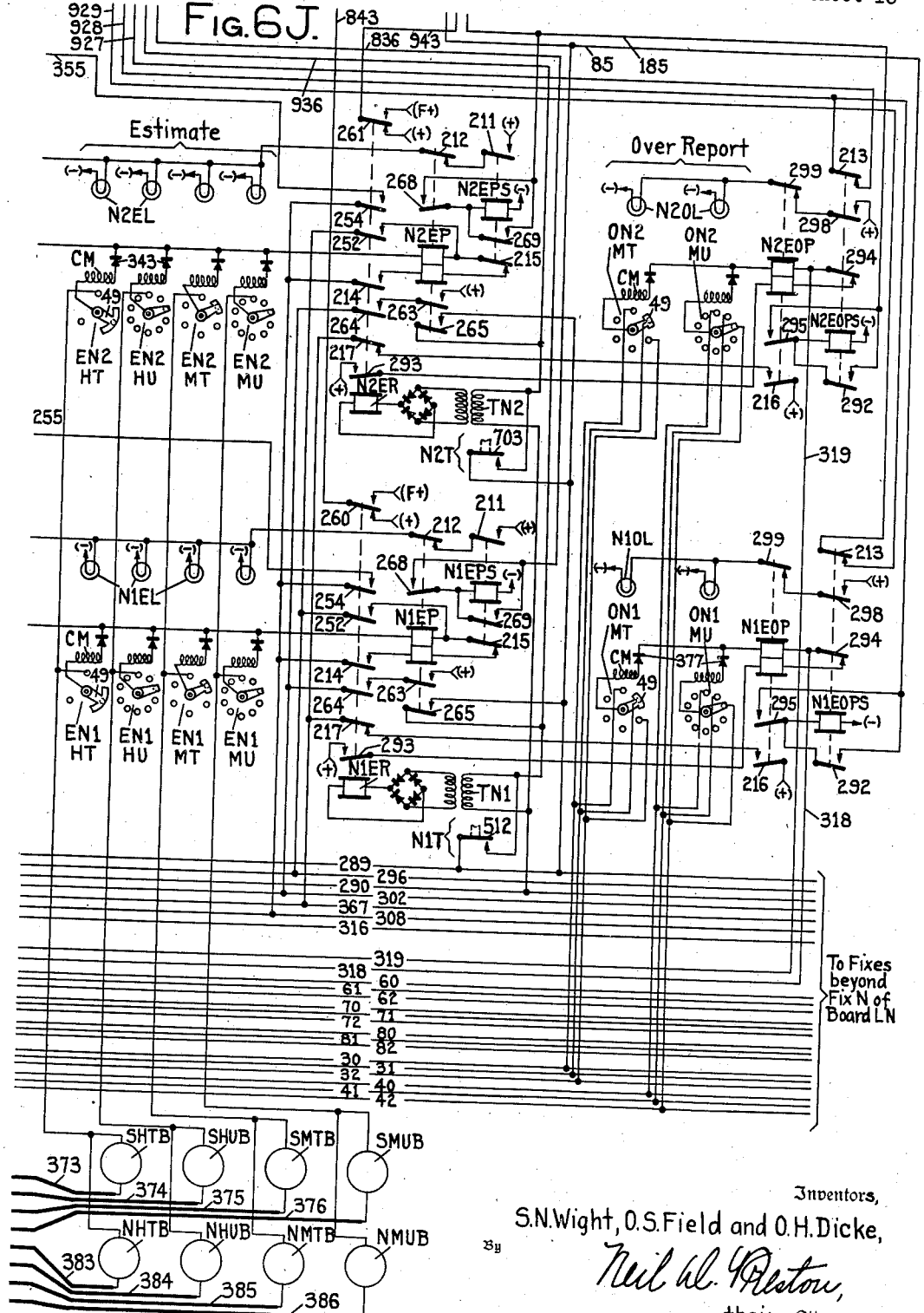

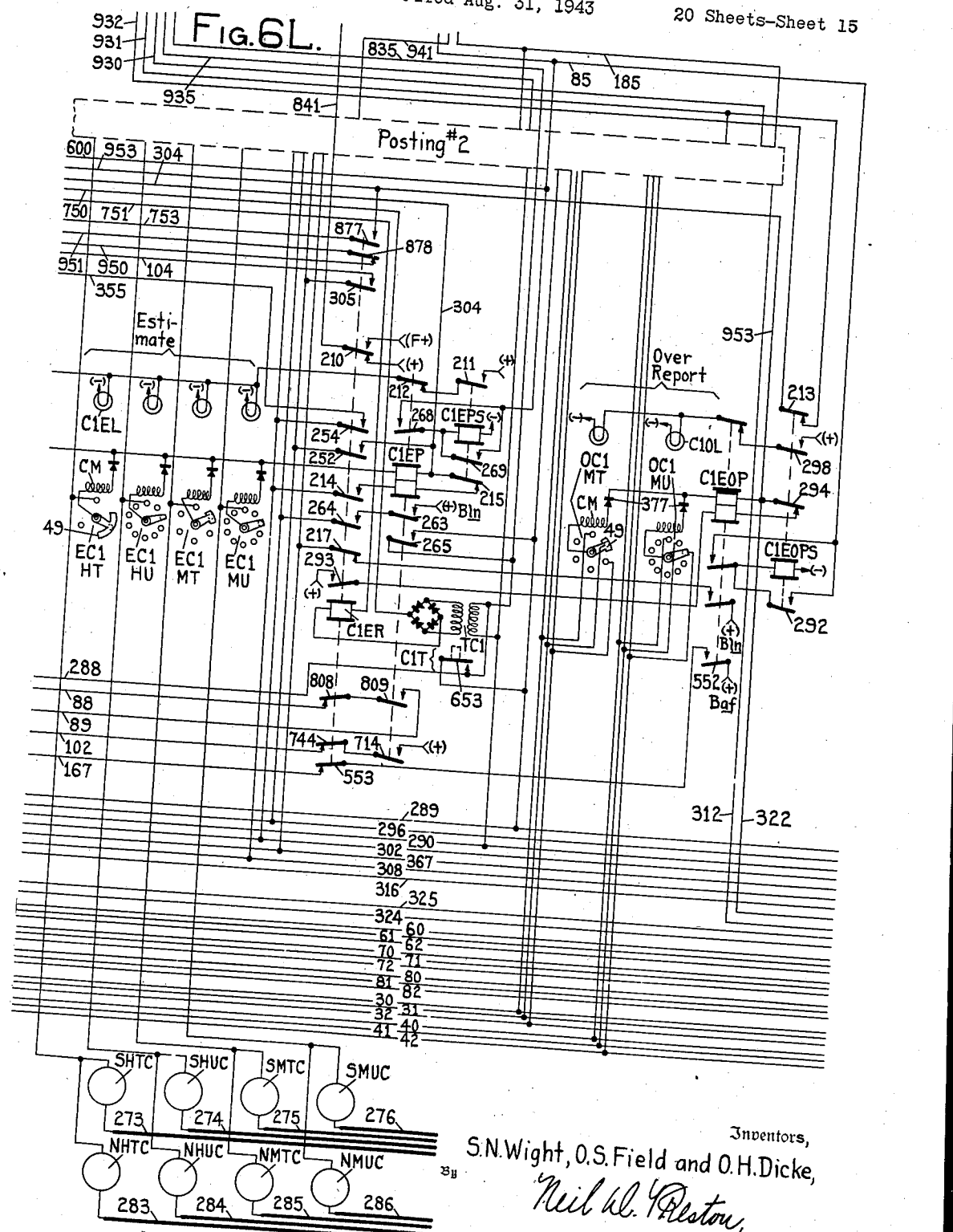

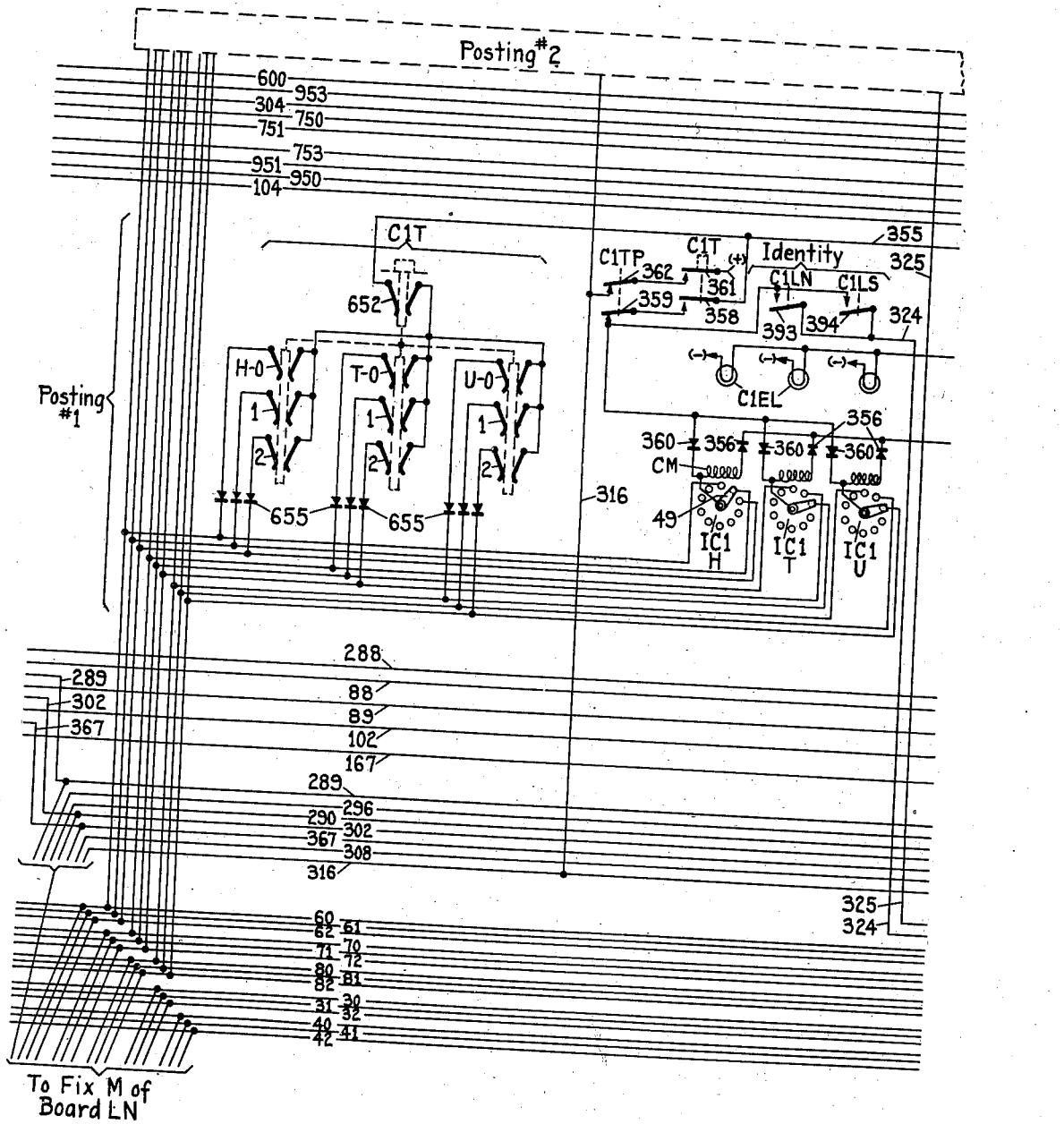

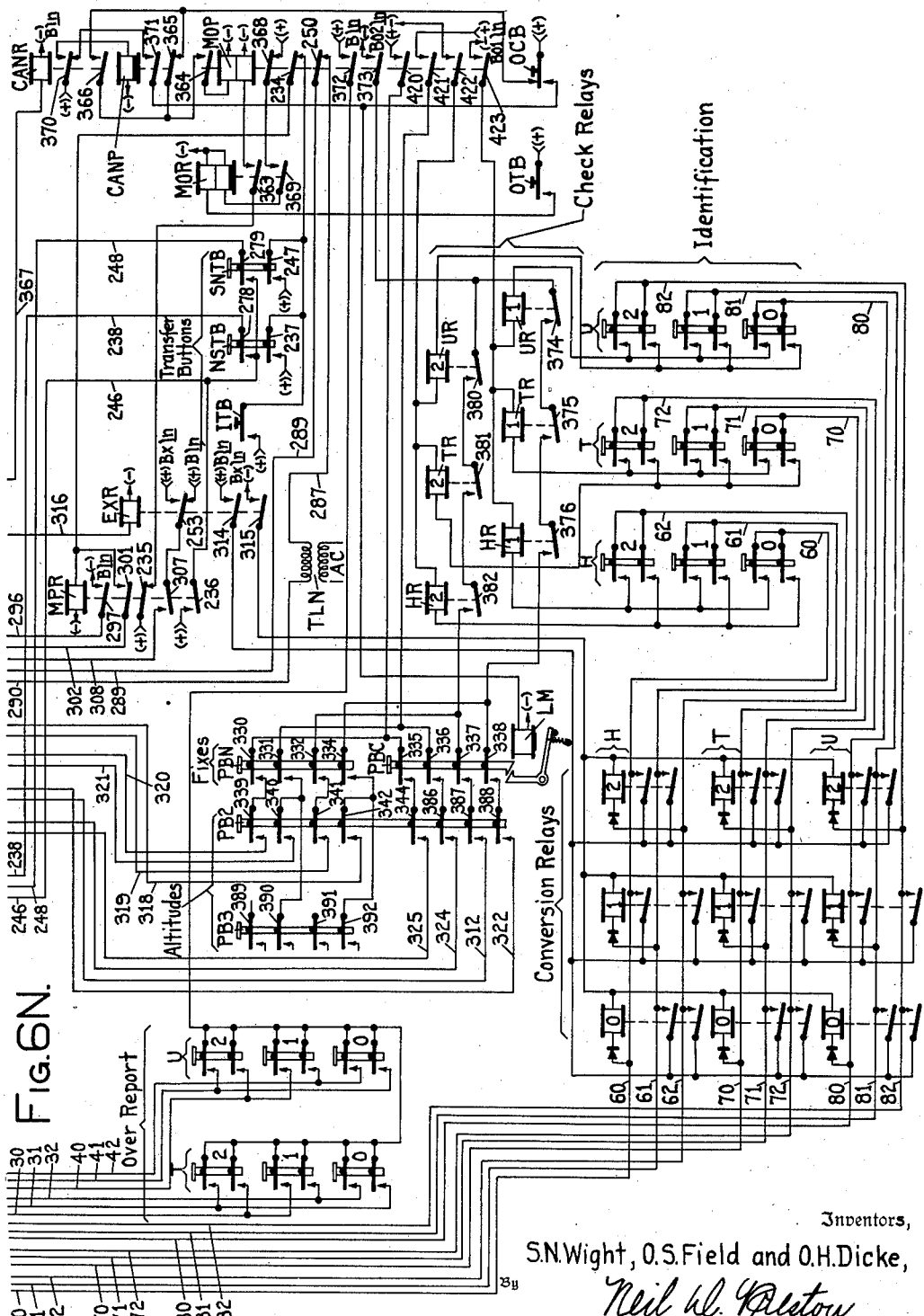

May 7, 1946.  S. N. WIGHT ET AL  2,399,777
AIRWAY TRAFFIC CONTROL SYSTEM
Filed Aug. 31, 1943   20 Sheets-Sheet 18
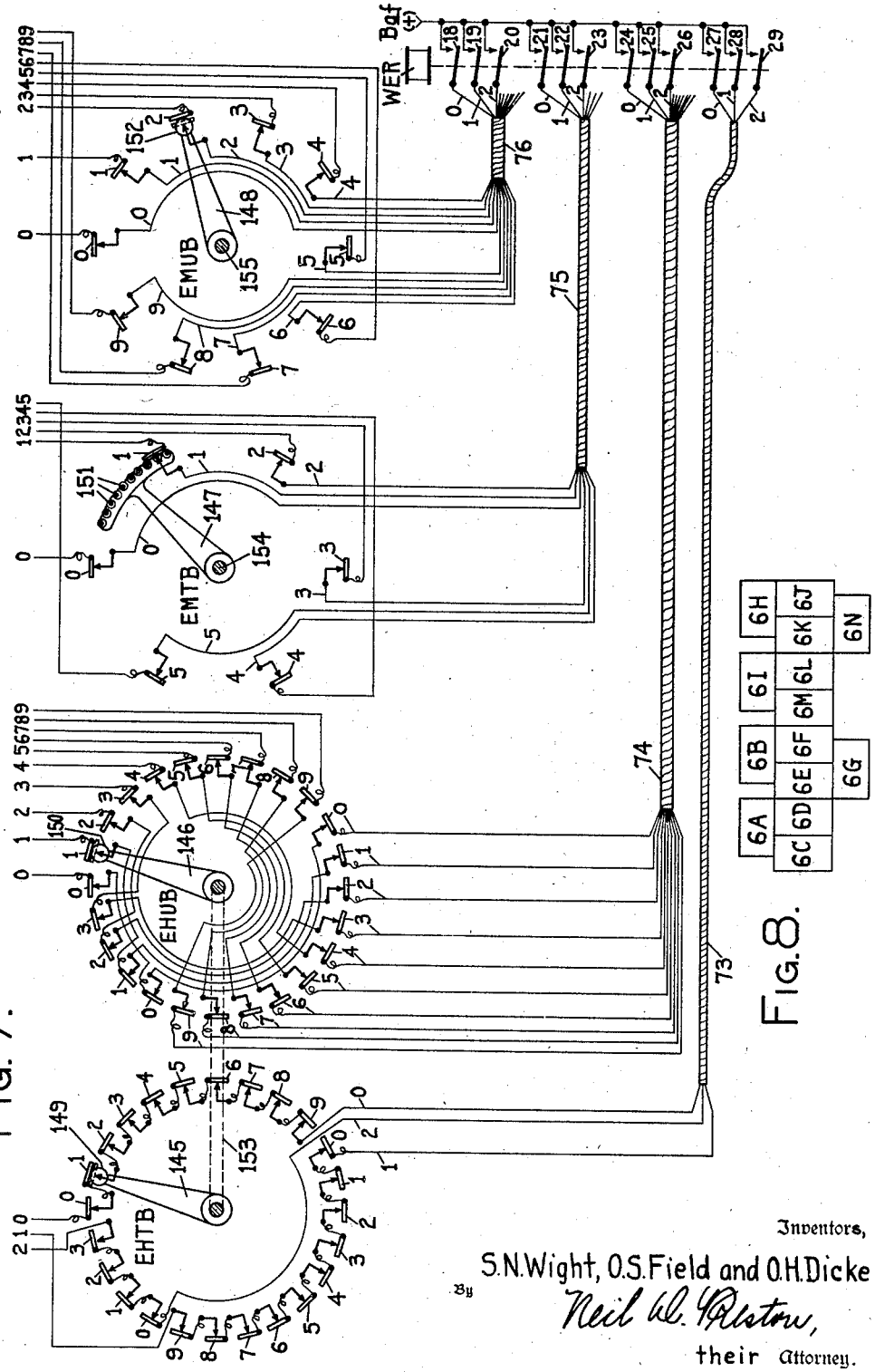
Inventors,
S.N.Wight, O.S.Field and O.H.Dicke
By Neil W. Preston,
their Attorney.

May 7, 1946.  S. N. WIGHT ET AL  2,399,777
AIRWAY TRAFFIC CONTROL SYSTEM
Filed Aug. 31, 1943  20 Sheets-Sheet 20
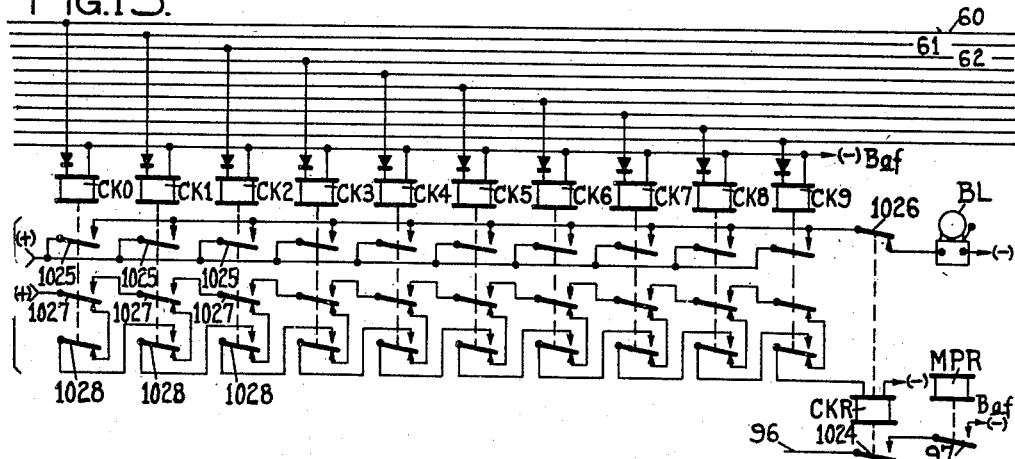
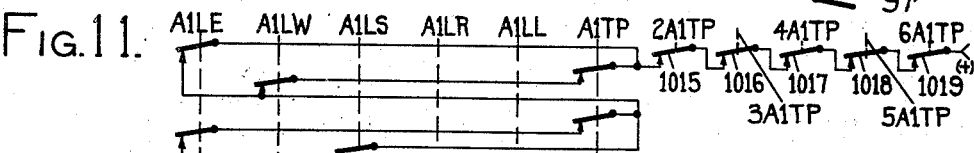
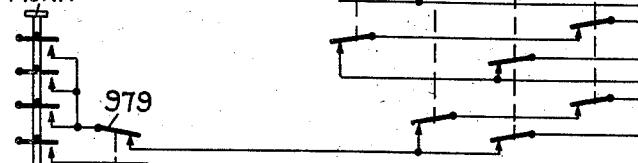
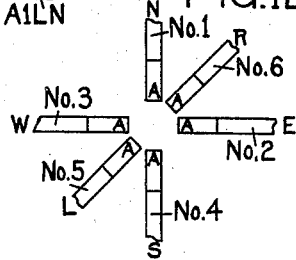
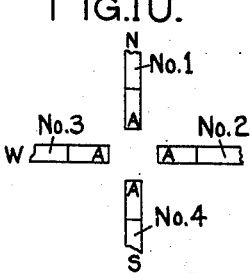
Inventors,
S. N. Wight, O. S. Field and O. H. Dicke,
By Neil W. Preston,
their Attorney.

Patented May 7, 1946

2,399,777

UNITED STATES PATENT OFFICE 2,399,777

AIRWAY TRAFFIC CONTROL SYSTEM

Sedgwick N. Wight, Oscar S. Field, and Oscar H. Dicke, Rochester, N. Y., assignors to General Railway Signal Company, Rochester, N. Y.

Application August 31, 1943, Serial No. 500,672

12 Claims. (Cl. 177—337)

This invention relates to airways traffic control systems or for airplane dispatching systems, and more particularly to a system for displaying on a flight progress board authorized plane flights or authorized flight routes over various altitudes over a geographic route (route on the ground) and for displaying at each fix, check point or station a number identifying the airplane, the estimated arrival time and also displaying the time at which the airplane actually reaches or passes over such fix conveniently called the "over-report time," and which flight route may be cancelled by one man or by the cooperation of two different operators. This application is an improvement over the prior and copending application of Wight and Field, Ser. No. 489,774, filed June 5, 1943, now Patent No. 2,344,761, dated March 21, 1944.

In railway signalling it is customary and practical and necessary for routes set up over certain railway tracks to be protected by interlocking so that trains cannot move on conflicting routes. This is an ideal and safe way of preventing trains from colliding with each other during their progress. By reason of the extremely high speed at which airplanes fly, and by reason of the fact that airplanes must either continue their flight or come to the ground, an entirely different problem presents itself in airplane dispatching which problem in certain respects is advantageous. The advantages reside in the fact that airplanes in flight fly at very high speeds and maintain their estimated schedule very closely and cannot come to rest on their flight route, and this enables their arrival times at certain destinations to be made much more certain than is true of railway trains that may stop on their route.

In accordance with the present invention it is proposed to post or display by suitable posting units on a flight progress board, preferably of large dimensions and located at considerable distance away from the dispatcher, operator and over-reporter, the airplane identification or the flight route, and its estimated arrival times at each of various fixes, check points or report stations along the ground route and to rely on the dispatcher and operator to give authority to airplane pilots to fly over certain designated ground routes at specified altitudes on different stretches thereof only if the estimated arrival time for other airplanes at conflicting fixes and altitudes as compared with the estimated arrival times of the airplane under consideration is such as not to impose a hazard upon any of these airplanes. It is readily seen that in some instances airplane flight routes may be set up and displayed on the display board at the same fix and the same altitude at the same time if the arrival times for such airplanes are sufficiently different to preclude the possibility of a collision between such airplanes either at that fix or in adjacent territory extending say at least one-half the distance to the next adjacent fix.

By reason of the fact that a plurality of postings of airplane flight routes which pass over certain fixes at the same altitude is contemplated and since the over-report, namely, the report from the airplane pilot to the dispatcher or one of his assistants, will give the altitude of the airplane but not the particular posting number in that altitude assigned to that airplane, the cancellation of a flight route will be determined by the airplane identification and altitude information reported by the pilot which must be translated into posting information.

The circuits for displaying an over-report involves particular postings in particular altitudes rather than particular altitudes only and it is proposed to so construct the apparatus that the over-report time will be posted only in the posting of the fix under consideration over which a flight designated by the same number has been set up. Since weather conditions and other abnormal airway traffic conditions demand that a certain amount of flexibility as to the number of postings assigned to specific altitudes is essential, it is desirable to provide a ready means of changing the circuits to conform to a change in the number of postings assigned to a particular altitude at a particular fix and in accordance with the present invention it is proposed to employ a plug board for making the necessary electrical connections to conform the electrical circuits with the appearance of the flight progress board when new assignments of postings to particular altitudes at specific fixes are made. This plug board has been disclosed in the said copending Wight and Field application and is for convenience omitted from the present application.

In accordance with the present invention it is also proposed to employ an interlocked network of electrical route circuits for setting up on the flight progress board various airplane flight routes varying in altitude from fix to fix and to indicate on this flight progress board where a proposed route shall be established and to thereafter automatically, in accordance with contacts closed by a token identifying a particular airplane or flight route, project electrically this identification, expressed by a flight character or flight number of such airplane and of its token, into posting units at the particular altitude at each fix identified by such route circuit. It is further proposed to provide a mechanical arrival time calculator for each control board which electrically manifests by the closing of particular contacts the arrival time for the airplane at various fixes on a proposed flight route as determined by setting the starting time dial and the cruising speed dial for such airplane and to then project electrically to suitable posting units at the proper altitudes on the flight progress board the arrival times as calculated by such arrival time calculator.

It is further proposed in accordance with the present invention to indicate the actual arrival time or over-report time on the flight progress board only if the airplane identification, altitude and fix as reported by the pilot to the over-report operator, the latter of which translates this report into specific manipulation, is in agreement with the airplane identification displayed by the airplane identification posting units of a route passing through such altitude for such fix. It is further proposed to cancel that portion of the airplane flight route to the rear of such token when such token after having been advanced is depressed.

It is also proposed in accordance with the present invention to employ a particular display board for each ground route. Since the various ground routes may, as at a crossing, have report stations or fixes in common, it will follow that the same report station may be represented by a panel on each of a plurality of boards, and in accordance with the present invention it is proposed to display the same indications for a common fix-posting located on each of a plurality of boards and to so interlock the route circuits that a particular display set up by the operator at a fix-posting of one board cannot be changed or disturbed by an operator of another board having that fix in common.

Since the system of the present invention employs many posting units each operable to a plurality of positions, and since these operations are caused by electrical manifestations impressed on a common multiwire bus structure, it is proposed to connect the lead-in wires of such posting units to the bus wires by the associated bus structure permanently. In order to avoid circuits within posting units which can connect two or more bus wires together it is proposed to employ posting units which cannot create such run-around or sneak circuits by constructing them so that they will operate until they reach a deenergized bus wire. Such a posting unit will require all but one of the bus wires to be energized to electrically manifest a particular posting character. Since open circuits, due to accident, occur more easily than unauthorized closed circuits it is proposed to prevent a posting unit from being operated at all if any other bus energization than a one-wire-only deenergized condition exists, and apparatus to perform this function is proposed.

Other objects and purposes of the invention will be understood when the specification is considered in the light of the accompanying drawings, of which:

Fig. 2 shows fixes A, B and C of the control board AF on an enlarged scale, illustrating a west-to-east calculator and an east-to-west calculator and the transfer buttons on the operator's desk, together with the various control knobs, token jacks and indicating lamps located on the back panel of the operator's board (control board LN, not shown on enlarged scale, is similar);

Fig. 2A illustrates the token shown in Fig. 2 on an enlarged scale;

Fig. 3 illustrates, on an enlarged scale, the over-report board for pedestal OPAF of Fig. 1 illustrating the various altitude push buttons, fix push buttons, identification push buttons, over-report time push buttons, transfer push button and cancellation push button (the over-report board of pedestal OPLN, not shown on enlarged scale, is similar);

Fig. 4 illustrates on an enlarged scale the panels B and C of the flight progress board FPAF.

Fig. 5 illustrates on an enlarged scale the panel N of the flight progress board FPLN.

Figure 6A:
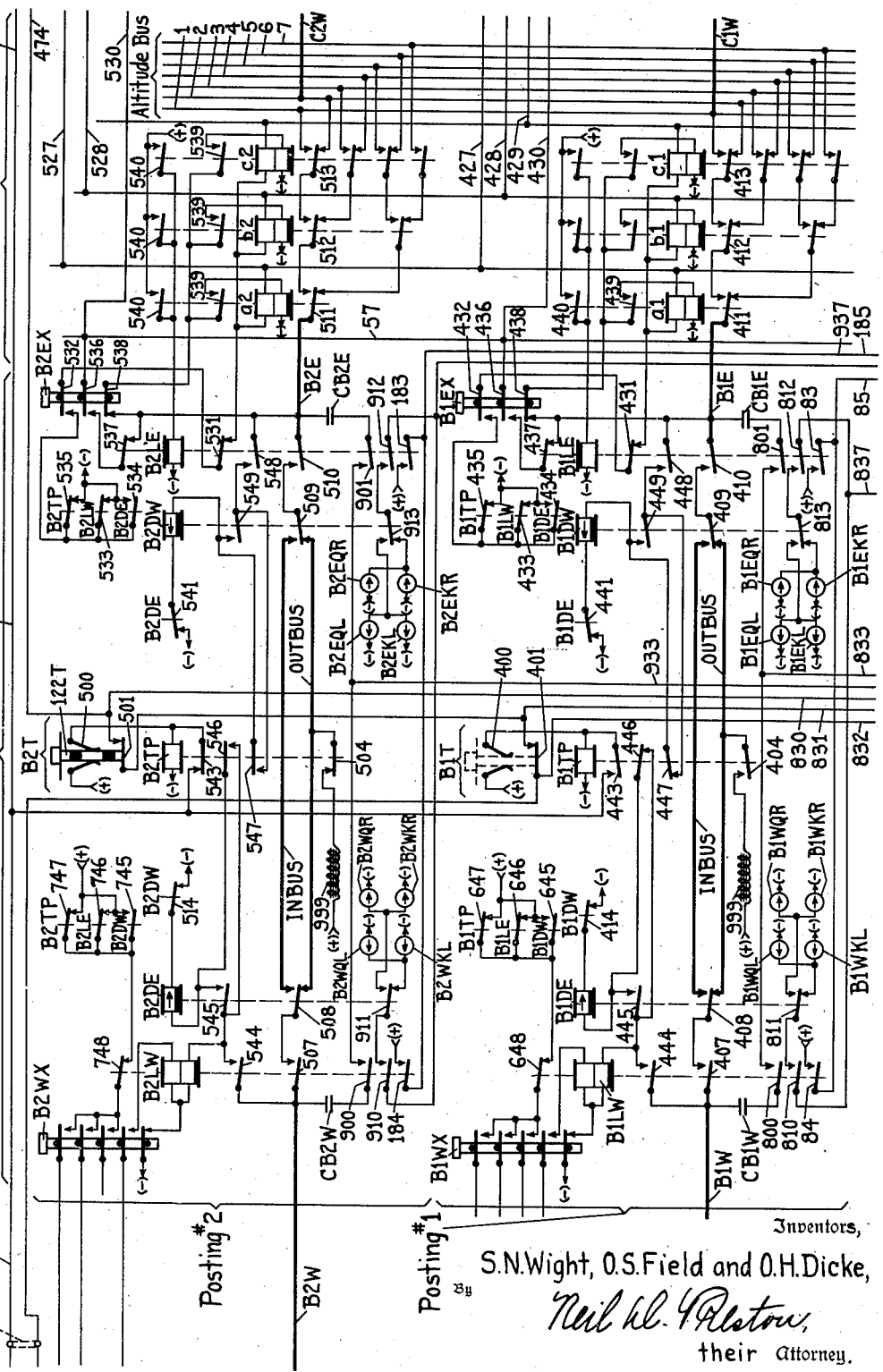

Figs. 6A–6N, when assembled as shown in Fig. 8, illustrate the circuits interconnecting the various apparatuses illustrated in Figs. 1 to 5, inclusive, for establishing flight route circuits, posting circuits and over-report circuits involving two ground routes, the route network being shown in Figs. 6A, 6B, 6H and 6I and the master apparatus being shown in Figs. 6G and 6N.

Figure 9:
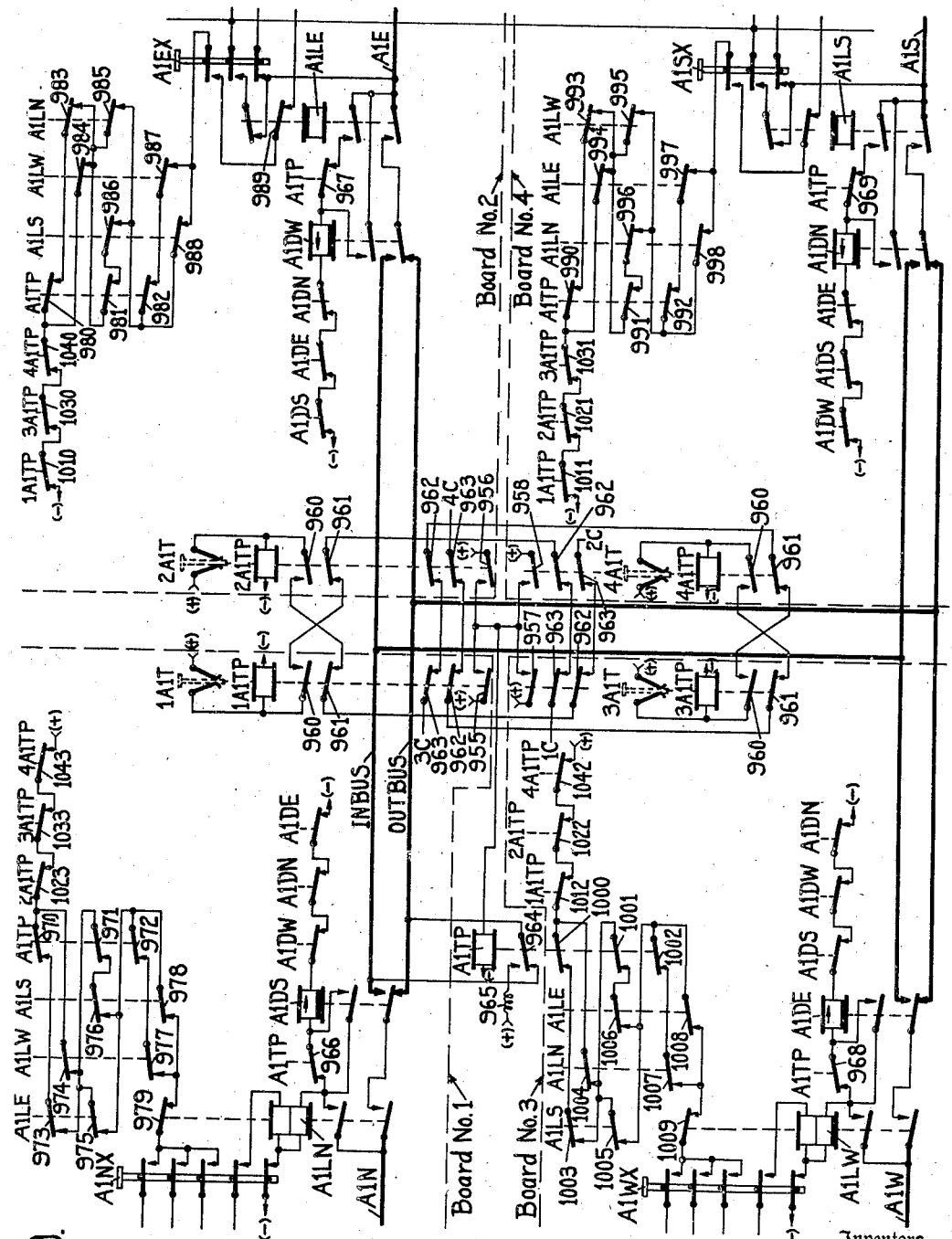

Fig. 7 illustrates the circuits for projecting or transferring the estimated arrival time from the arrival time calculator to the flight progress board by contact mechanism energizing all but one of the digit number wires for each digit;

Fig. 8 illustrates how Figs. 6A–6N must be assembled to constitute the wiring diagram of the complete system;

Figs. 9 and 11 illustrate a modified network embodying a common end fix on each of four or six boards;

Figs. 10 and 12 show top views of the four and six board arrangements of Figs. 9 and 11 respectively; and Fig. 13 shows a check-feature which may be considered part of the Fig. 6 system.

*Structure*

Figure 1:
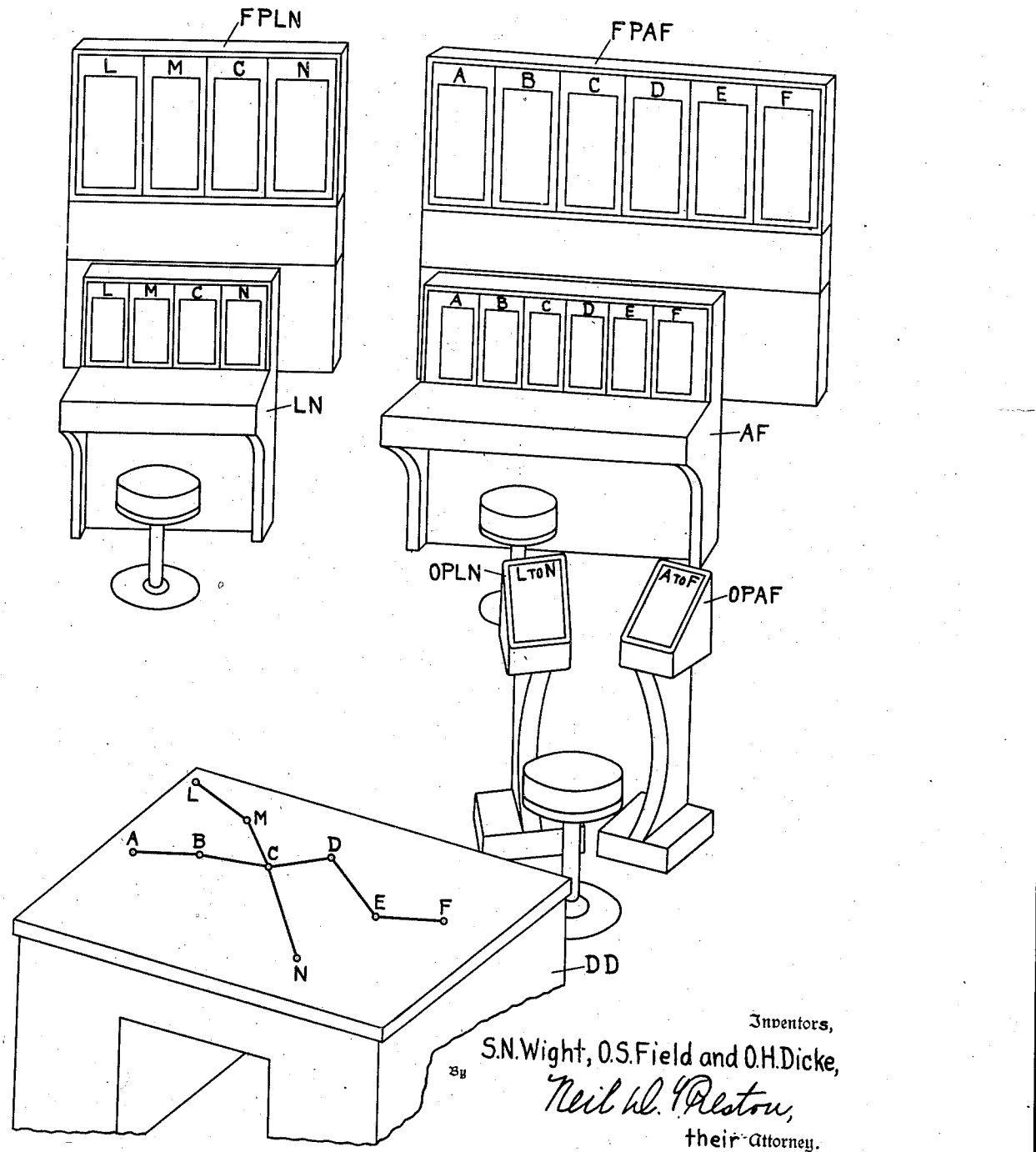
Fig. 1 illustrates the dispatcher's room containing two flight progress boards FPAF and FPLN, two controller's boards AF and LN, two over-report pedestals OPAF and OPLN and a dispatcher's desk DD.

*Dispatcher's desk.*—Referring to Fig. 1, and particularly to the dispatcher's desk DD, it will be observed that this desk shows the ground routes (route on the ground as distinguished from various flight routes at various altitudes over such ground route) A—B—C—D—E—F and L—M—C—N. It will also be observed that these two ground routes cross at fix or station C. It is desired to point out that the ground route A—B—C—D—E—F is controlled by the control board AF whereas the ground route L—M—C—N is controlled by the control board LN. It may also be pointed out that the flight routes over ground route A—B—C—D—E—F are displayed on the flight progress board FPAF whereas flight routes set up over the ground route L—M—C—N are displayed on the flight progress board FPLN. It may also be pointed out that the over-report times displayed on the flight progress board FPLN are obtained by the manipulation of buttons on the over-report pedestal OPLN whereas the over-report times displayed on the flight progress board FPAF are determined by the manipulation of push buttons on the over-report pedestal OPAF. At a common fix the over-report times are posted on both boards from either over-report pedestal. For convenience only circuits and apparatus relative to postings 1 and 2 for fixes B and N and posting 1 for fix C will be discussed hereinafter.

*Controller's board.*—In Fig. 2 has been illustrated a portion of the control board AF illustrating a portion of the control panels for fixes A, B and C and also illustrating the corresponding portion of the arrival time calculators, for calculating west-to-east arrival time and calculating east-to-west arrival time. On control board LN similar north-to-south and south-to-north arrival time calculators are provided. Referring to panel B (see Fig. 2) the left-hand column of push buttons including push buttons B1WX and B2WX constitute the exit buttons for establishing routes from left to right from fix A toward fix B and constitute the entrance push buttons for establishing routes extending toward the left from fix B to fix A; whereas the push buttons in the right-hand column and including push buttons B1EX and B2EX are push buttons for extending routes from fix B to fix C and also constitute the exit push buttons for establishing routes from fix C to fix B. The numerals 1 to 10 inclusive on panel A constitute the numeral designations of postings (there preferably being a total of twenty-four postings, see Figs. 4 and 5), whereas the numerals 2 to 6, inclusive, for fixes A and C and numerals 2 to 7 of fix B illustrate that these postings or flight authorizations may exist in altitudes 2000, 3000, 4000, 5000 and 6000 feet, fixes A and C and 2000 to 7000 fix B, respectively, sixteen altitudes (2–17) being contemplated, see Fig. 4. In other words, these various numerals for panel A indicate that the 2000 foot altitude may be occupied by airplanes authorized by postings or flight authorizations 1 and 2, that the 3000 foot altitude may be occupied by airplanes flying on routes authorized by postings 3 and 4, that the 4000 foot altitude may be occupied by airplanes flying on flight routes authorized by postings 5 and 6, that the 5000 foot altitude may be occupied by airplanes flying on flight routes authorized by postings 7 and 8, and that the 6000 foot altitude may be occupied by airplanes flying on flight routes authorized by postings or flight authorizations 9 and 10. For panel B the postings are differently distributed among the altitudes. It should be understood that altitude markers on the control boards are readily interchangeable and that additional markers having like numbers are provided so that the altitude assignment for the various postings may be changed easily, corresponding changes of altitude assignment being made on the flight progress boards, so that the altitude assignment on each control board and its flight progress board remain the same.

Referring again to panel A of the operator's control board AF (Fig. 2) the two left-hand columns of lamps including the lamps A1WQL and A1WQR are employed to signify when energized that a flight route either to or from the next fix to the left of fix A has been set up, whereas the indicating lamps in the two right-hand rows including the lamps A1EQL and A1EQR when lighted signify that either a flight route from fix A to fix B or a flight route from fix B to fix A has been either tentatively or actually established, the arrows signifying the directions in which airplanes may fly over such flight routes. Obviously, if a lamp in each column for a particular posting is illuminated, it indicates that an airplane flight route through the fix A at the altitude signified by the altitude marker for such posting has been set up. What has been said in regard to fix A is likewise true of fixes B and C where like reference characters are employed except that the letters B and C have been substituted for the letter A. What has been said in regard to the lamps for posting 1 is also true for lamps of other postings which are assigned like reference characters except for the posting numeral (see Figs. 6A and 6B). Similar direction lamps designated by like reference characters except that "K" has been substituted for "Q" are employed on the flight progress board (see Fig. 4). It should, however, be noted that the altitude assignments for some of the postings of fixes B and C are different from those of fix A.

The west-to-east calculator and the east-to-west calculator have been fully disclosed and described in the prior application of Wight and Field, Ser. No. 470,018, filed December 24, 1942, and the functions performed by these calculators will only be briefly discussed. At the upper left-hand corner of the desk of the controller's board AF (see Fig. 2) is illustrated a cruising dial EC and a transfer button WETB for the west-to-east calculator, of which the cruising dial EC may be adjusted to the particular cruising speed of an airplane under consideration. A transfer button ITB for projecting airplane identity only on the flight progress board is also illustrated. If it is now desired to calculate the arrival time of an airplane at fixes B and C which starts at a particular starting time or base time at fix A it is only necessary to adjust the cruising dial EC to a speed characteristic of that airplane and to then adjust the starting time knobs EHA and EMA to indicate the starting time at A after which the arrival times for fix B and C will be immediately indicated on the dials EHB—EMB and EHC—EMC, respectively. It may also be necessary to adjust the variable factor knob EVAB or EVBC to compensate for a change of cruising speed due to prevailing winds, ascending and descending factors, and the like, after which the corrected arrival time for fixes B and C will be indicated on the indicating knobs EHB, EMB, EHC and EMC without further manipulation. The arrival time for all subsequent fixes D to F inclusive will be calculated in a similar manner and simultaneously therewith without further manipulation. In the lower portion of the desk of the controller's board AF illustrated in Fig. 2 a similar calculator for calculating east-to-west arrival times is indicated which latter calculator includes a cruising speed knob WC and an east-to-west transfer button EWTB. Similar north-to-south and south-to-north calculators are provided on control board LN.

Each of the posting areas for each fix is also provided with a receptacle for receiving a token, conveniently called a token jack. These token jacks are staggered by reason of the token data plate which is of considerable size attached to the token. It will be seen that the token jack B2T (obscured by the token 122T, see Fig. 2) is shown to the right of the indicating lamp B2WQR whereas the token jack B1T is shown to the left of the indicating lamp B1EQL. However, as shown, a token when in place in a jack will have its token handle directly in line with the push buttons, indicating lamps and altitude and posting numerals for that particular posting. These token plates may have suitable data written thereon, such as pilot's name, the type of airplane, the kind of cargo, its final destination, etc. One such token has been shown on enlarged scale in Fig. 2A of the drawings. These token jacks are provided with a large number of contacts some of which are closed when any token is inserted therein, whereas others are closed only by certain tokens to electrically characterize the identifying character of the token. Some of these token jack contacts are shown in Figs. 6A–6N of the drawings. These token jacks are constructed to be depressable and certain contacts are closed and others are opened when a jack is depressed either with or without a token therein. For a more detailed illustration and description of these tokens and jacks attention is directed to the joint application of Wight and Field, Ser. No. 489,775, filed June 5, 1943.

*Over-report pedestal.*—The panel of the over-report pedestal OPAF shown in Fig. 1 is illustrated on an enlarged scale in Fig. 3 of the drawings. The buttons 2 to 17 in the left-hand column below the heading "altitude" signify altitudes of 2000 feet to 17,000 feet inclusive. The push buttons A to F, inclusive, shown in a horizontal row near the top of the panel signify push buttons for fixes A to F, inclusive. The three columns H, T and U each consisting of push buttons 0 to 9, inclusive, below the heading "identification" are employed for signifying the three digits hundreds, tens and units, respectively, of airplane identification numbers, from which it is readily seen that airplane identification numbers from 1 to 999, inclusive, may be characterized. The two columns T and U consisting of push buttons 0 to 5 and 0 to 9 inclusive and designated "over-report time" indicate in tens and units of minutes respectively, when an airplane is reported over a particular fix, it being understood that if the actual arrival time over a fix in minutes is known, the actual arrival time in hours can be ascertained from the estimated arrival time which has been indicated on the flight progress board adjacent the over-report time. This over-report board OPAF also includes an over-report transfer button OTB and an over-report cancelling button OCB. It may be pointed out that each of the push buttons shown on the over-report pedestal, except the transfer button OTB and the cancelling button OCB is constructed to be latched down where manually depressed and which will only be released by the energization of a release magnet LM shown for button PBC only in Figs. 6G and 6N of the drawings. In other words, if the over-report operator wishes to manifest electrically that he has received, as by radio, a report that airplane number 122 has arrived at fix B at the 3000 foot altitude at 11:12 o'clock, he will operate his push button 3 in the "altitude" column, push button 1 in the first column of "identification," push button 2 in each of the second and third columns of "identification," the push button B, the push button 1 in the first column of "over-report time" and the push button 2 in the second column of "over-report time." All these buttons will remain in their depressed position until the over-report time has been displayed on the flight progress board, all in a manner as hereinafter described, after which the cancelling or latch magnet LM (see Fig. 6G of the drawings) is automatically momentarily energized to cause all of these depressed push buttons on the over-report board to return to their normal retracted position.

*Flight progress board.*—The panels B and C of the flight progress board FPAF (see Fig. 1 of the drawings) have been illustrated in detail in Fig. 4 of the drawings, as has also been illustrated panel N of flight progress board FPLN in Fig. 5 of the drawings. It will be observed that at the left-hand side of panel B, as signified by the numerals 1 to 24, the various postings or airplane flight authorizations that may be displayed for fix A on the flight progress board have been indicated. It will be observed that the numbers shown on horizontally disposed markers, as indicated by numerals 2 to 17, inclusive, signify that the 24 postings or flight authorizations may be divided among altitudes 2000 feet to 17,000 feet, each altitude being spaced 1000 feet from the next adjacent altitude. It will also be observed that in panel C for each of altitudes 2 to 9, inclusive, signifying 2000 feet to 9000 feet altitudes except altitude 3 and 4 is provided with two postings, whereas only one posting for altitude 3 and for each altitude 10 to 17 is provided, altitude 4 being provided with three postings. Referring now to panel B of this same flight progress board it will be observed that one posting only may exist on the 2000 foot altitude, two postings numbered 2 and 3 may exist on altitude 3000 feet, that postings 4, 5 and 6 may exist for altitude 4000 feet, that postings 7 and 8 may exist at altitude 5000 feet, that posting 9 only may exist at altitude 6000 feet, that postings 10 and 11 may exist at altitude 7000 feet, that three postings 12, 13 and 14 may exist at altitude 8000 feet, two postings may exist at altitude 9000, and that one posting may exist at each of altitudes 10,000 to 17,000, each inclusive. It will be noted that in practice these altitude markers 1 to 17, inclusive, are provided with pins which fit in holes in the panel so that the particular postings assigned to a particular altitude may be definitely indicated and may be changed at will, corresponding changes being of course made as to altitude assignment on the control board. Corresponding circuit changes are also made in a manner as more fully disclosed in the copending application of Wight and Field, Ser. No. 489,774, filed June 5, 1943.

Referring again to panel B for fix B on the flight progress board FPAF (see Fig. 4) the left-hand column of lamps including indicating lamps B1WKL and B2WKL each display an arrow pointing to the left when illuminated and that the next column of lamps including lamps B1WKR and B2WKR is each provided to display an arrow pointing to the right when illuminated, similar lamps being provided for the right column which have been designated by like reference characters except that E has been substituted for W. Similar indicating lamps are provided for each of the other fixes and are designated by like reference characters except that the proper fix letter is substituted for the letter "B." Each of these displayed arrows manifest that a flight route to or from such fix in the direction as indicated by the arrow has been set up. It should be observed that in the reference characters for these arrow lamps that the first letter denotes the fix, the number denotes the posting, the second letter denotes the side, the "K" denotes display board and the last letter denotes direction of travel.

Referring to panel B (see Fig. 4) there are three columns of changeable exhibitor indicators or posting units each column of which is capable of displaying multiple digit numbers. The first column headed "identity" has sufficient posting units to display three digit numbers signifying the identity of the airplane, the second column headed "estimate" has sufficient posting units to indicate four digit numbers signifying the hours and minutes of estimated arrival time, and the third column headed "over" has only sufficient posting units to display two digit numbers signifying the actual arrival time of an airplane over that fix expressed in minutes. These changeable exhibitor indicators or posting units may be of a construction such as shown in Figs. 7 to 10 of the copending application of Wight and Field, Ser. No. 470,018, filed December 24, 1942, or may be of a construction such as illustrated in the copending application of Wight and Field, Ser. No. 489,776, filed June 5, 1943.

*Token and token receptacle.*—The token receptacles, conveniently called token jacks, employed are shown conventionally in Figs. 6A–6F and 6H–6M of the drawings, whereas token 122T is shown in Figs. 2 and 2A of the drawings and is also shown conventionally in jack B2T in Figs. 6A and 6C of the drawings. Referring to Figs. 6A, 6B, 6I and 6H of the drawings it will be observed that a portion of each of the token jacks B1T, B2T, C1T, N1T and N2T have been illustrated and that a token 122T has been shown inserted in the token jack B2T. As illustrated in Fig. 6A of the drawings the token jack B2T shows associated therewith only two contacts of which contacts 500 are closed when the token is inserted and of which contacts 501 are opened when the token and its jack, or the jack alone, are depressed. There is also a contact 503 for this token jack B2T but it is shown in Fig. 6D and is closed only when the token jack B2T is depressed. The corresponding contacts of other token jacks are similarly identified. The token contact 502 (Fig. 6C) is closed only when the token is fully inserted. In addition to the contacts already mentioned there are 30 other contacts, namely, 10 in each column H, T and U of which 9 in each column are closed by insertion of a token in the jack and irrespective of whether the token and its jack are depressed or not. Of these 30 contacts 9 contacts only have been illustrated in the lower portion of Fig. 6C of the drawings, 3 contacts having been illustrated in each of the hundreds column H, the tens column T, and the units column U, the contacts in each column having been designated 0, 1 and 2 respectively. It should be understood that there are 10 such contacts in each digit column and for future reference purposes the three contacts for the columns will be designated H0, H1, H2, etc.; T0, T1, T2, etc.; and U0, U1, U2, etc. Although the 30 contacts just mentioned, which are used for airplane identification purposes, are illustrated as being arranged in three columns one column for each digit, these contacts are actually, in practice, arranged in two columns, there being 15 such contacts in each column. This is done to permit a narrower and longer token to be employed and is advantageous by reason of the limited space on the face of the operator's control board available. As illustrated in Fig. 2A each of the tokens is provided with three actuating notches each of which can leave open a particular airplane identification contact and these notches are arranged differently on each of the tokens so that various airplane identification numbers from 1 to 999 may be characterized by these various tokens. For instance, token No. 122T would be constructed to leave open contact 1 in column H (see upper portion of Fig. 6C) and to leave open the contacts 2 in both the tens column T and the units column U. By properly distributing the notches in each of these tokens, numbers from 1 to 999 may be electrically manifested or characterized. The token jack contacts such as 500, 501, 502 and 503 (see token jack B2T) are actuated by any token and no notches are required to cause such actuation. For a more detailed illustration and more detailed description of these token and token jacks attention is directed to the copending application of Wight and Field, Ser. No. 489,775, filed June 5, 1943. It will be observed that a half-wave rectifier is included in series with each of the 30 identifying outlet wires leading from the token jacks. These rectifiers are employed to allow current to flow only toward bus wires 60, 61, 62, 70, 71, 72, 80, 81 and 82 and thereby prevent the establishment of runaround or sneak circuits. These rectifiers have been designated 405, 505, 455, 605, 705 and 655 for token jacks B1T, B2T, C1T (board AF), N1T, N2T and C1T (board LN) respectively (Figs. 6C, 6E, 6K and 6M).

*Posting units.*—Referring to the upper part of Fig. 6C of the drawings and to the panel B shown on Fig. 4 of the drawings, it will be observed that the three indicators for indicating airplane identification at posting 2 and located in the column "identity" (Fig. 4) have been designated IB2H, IB2T and IB2U. These posting units are used for indicating the hundreds, tens and units digit of the airplane identifying number. Similarly, indicators or posting units EB2HT, EB2HU, EB2MT and EB2MU are provided for posting 2 in the column headed "estimate" to indicate the tens of hours, units of hours, tens of minutes and units of minutes of the estimated arrival time, respectively. Similar posting units OB2MT and OB2MU for posting 2 are provided in the third column of the panel B of the flight progress board FPAF and shown in Fig. 6D of the drawings and headed "over" in Fig. 4. These posting units are used for indicating the over-report time in minutes. Similar posting units are provided for each posting of the 24 postings employed for each fix and have been designated by similar reference characters. These movable indicator posting units may be of a construction such as illustrated in Figs. 7 to 10, inclusive, of the prior application of Wight and Field, Ser. No. 470,018, or may be of a construction such as indicated in their copending application, Ser. No. 489,776, filed June 5, 1943.

Generally speaking, these posting units constitute a rotatable belt or drum of translucent material on the inside of which the numerals are painted or otherwise affixed, there being an indicating lamp such as B1EL or B1OL (see Figs. 6C and 6D) for rendering these numerals visible only when such lamp is illuminated. The construction is such that the lamps are illuminated only when the number displayed by such drum or belt is to be rendered visible. The construction is further such as to provide a plurality of inlet wires to each indicator or unit to actuate the same by suitable power operating means and including means for opening the energizing circuit for such power operating means at the proper position of such drum. The construction of the posting units of this application differs from that of the posting units in the applications above referred to in that, as shown, only one inlet wire at a time is connected to the clutch coil. Also, to display a new indication all but one of such inlet wires are energized to in turn cause the drum or belt to be rotated to a position to display a number corresponding to the number of the wire then deenergized. In other words, if wire No. 5 is deenergized and all other wires are energized, the rotatable drum or belt will be operated by the power operating means until the numeral 5 is displayed by the indicator, at which point in the operation of the unit the energizing circuit for the power operating means is opened and the rotatable belt or drum is suddenly brought to stop by a spring pressed electro-magnetically operated brake or detent. For a detailed description of the construction and operation of these movable indicator posting units, except for the modification in the structure above pointed out, attention is directed to the above-mentioned copending applications. These applications show the structure except that the lead-in wires in this application are connected to the clutch magnet CM one at a time in non-overlapped relation. This may be done by arranging stationary contacts in a circle, as shown, where a lead-in wire is connected to each contact and where a rotary contact arm 49, rotating with such drum, and engaging these contacts, one at a time, is directly connected to the clutch magnet coil CM (see Figs. 6C and 6D).

*Indicating lamps.*—As already pointed out, indicating lamps such as B1WQL, B1WQR, B2WQL and B2WQR (see Figs. 2 and 6A of the drawings) are employed on the controller's board. These lamps indicate whether a flight route has been established up to that fix or has been established through that fix, the arrows indicating the direction of the flight route. Similar arrow display indicating lamps such as B1WKL, B1WKR, B2WKL and B2WKR are provided on the flight progress board. Corresponding lamps, such as B1WQL and B1WKL are connected in multiple. In addition to these indicating lamps the lamps, such as B1EL and B2EL (see Figs. 6C and 6D), which have been mentioned above, light corresponding posting units for displaying the airplane identification of the estimated arrival times on corresponding portions of the flight progress board. These latter lamps will only be lighted when the numerals displayed by these posting units are to be recognized on the flight progress board, these numerals on the posting units being invisible so long as the lamps associated therewith are extinguished. Similar lamps B1OL and B2OL are used on the over-report posting units, such as OB1MT and OB2MT.

*Arrival time calculator.*—The estimated arrival time calculators include a series of differential or epicyclic gear units through the medium of which a shaft may be driven by several other shafts, these units being located in the desk shown in Fig. 2 of the drawings, there being three such units in the control board AF for each fix for each direction of calculation. The west-to-east arrival time calculator is located underneath the back part of the desk, whereas the east-to-west arrival time calculator is located underneath the front part of the desk. The west-to-east calculator has been shown in detail in Figs. 1, 2 and 3 of the prior copending application of Wight and Field, Ser. No. 470,018, to which attention is directed.

Generally speaking, this west-to-east arrival time calculator includes a cruising knob EC (see Fig. 2), which may be adjusted to the cruising speed of the airplane under consideration. This cruising knob or dial EC is so associated through gearing with the hour and minute indicating dials EHA and EMA for fix A, EHB and EMB for fix B and EHC and EMC for fix C that these hour and minute dials will indicate a difference in time depending on the adjusted position of the cruising knob EC. The actual distance in miles between fixes A and B and between fixes B and C is taken into consideration by gear ratios built into the calculator between the gear units for fix A and the gear units for fix B and between gear units for fix B and gear units for fix C. From this it is readily seen that if the hour and minute dials EHA and EMA for fix A are set to indicate the starting or base time and the cruising knob EC is set to indicate the cruising speed of the airplane under consideration that the arrival time for that airplane at fixes B and C will be indicated on the hour dials EHB and EHC and the minute knobs EMB and EMC. It may be pointed out that due to variable factors such as a head wind, a tail wind, an airplane ascent or an airplane descent, it may be desirable to compensate for these variable factors and for this reason a variable factor correcting knob EVAB for making such correction between such fixes A and B and a variable factor correcting knob EVBC for making variable factor correction between fixes B and C have been provided and are illustrated on the desk of the control board shown in Fig. 2 of the drawings. A similar variable factor correcting knob EVCD is also illustrated. The hour dial EHB has associated therewith contact mechanisms EHTB and EHUB (not shown in Fig. 2 but shown in Figs. 6D and 7 of the drawings), whereas the minute dial EMB has associated therewith contact mechanisms EMTB and EMUB (see Figs. 6D and 7). These contact mechanisms EHTB, EHUB, EMTB and EMUB are shown more clearly in Fig. 7 of the drawings. The manner in which these contact mechanisms are associated with the arrival time calculator is indicated in Figs. 2A, 2B, 2C and 3 of prior application, Ser. No. 470,018, to which attention is directed. These contact mechanisms electrically reflect or manifest the arrival times that have been calculated by the calculator. These electrical manifestations may be electrically projected or transferred onto the flight progress board in response to manual push button and token manipulation as more specifically pointed out hereinafter.

Referring to Fig. 7 of the drawings and remembering that the estimated arrival time posting units are operated to the proper position only by energizing all wires except the wire numbered the same as the particular number which is to appear on the posting unit, it will now be explained how all but one of the wires is energized for each digit when the corresponding contact mechanism of the arrival time calculator assumes a particular time indicating condition. In Fig. 7 has been illustrated the contact mechanism for the west-to-east calculator for fix B of control board AF. The tens of hour digit contact mechanism has been designated EHTB, the units of hour contact mechanism has been designated EHUB, the tens of minutes contact mechanism has been designated EMTB and the units of minutes contact mechanism has been designated EMUB. The rotary arms 145, 146, 147 and 148 assume positions to electrically reflect the time indication 01:12. It may be pointed out here that when the west-to-east transfer button WETB (Fig. 6G) is depressed the west-to-east calculator relay WER (Figs. 6E and 7) is energized as a result of which energy is applied from the (+) terminal of a suitable source of current through front contact of this relay WER, to all of the wires leading out from the top of the contact mechanisms EHTB, EHUB, EMTB, EMUB were it not for the fact that the rollers 149, 150, 151 or 152 hold one of the circuit wires passing through each of the respective contact mechanisms open. It is readily seen that the roller 149 operated by arm 145 of contact mechanism EHTB holds the zero wire open so that the numeral zero is manifested for the tens hour digit, that the roller 150 operated by arm 146 of the contact mechanism EHUB holds the wire 1 open upon manifesting 1 for the units hour digit, that the rollers 151 operated by arm 147 of the contact mechanism EMTB hold the circuit 1 open thereby manifesting one in the tens of minutes digit and that the roller 152 operated by arm 148 holds the circuit 2 open thereby manifesting the number 2 for the units of minutes digit.

In other words, the rotary arms 145, 146, 147 and 148 supporting the rollers 149, 150, 151 and 152 respectively, assuming positions as illustrated in Fig. 7 of the drawings cause the contact mechanisms for fix B of the west-to-east calculator to manifest electrically the time 01:12. It may be pointed out here that the various contacts 1, 2, 3, etc., arranged in a circle about the calculator shafts constitute end views of contact blades which are normally in engagement with stationary contacts (conventionally illustrated by arrows) and which may be disengaged from their associated stationary contacts by the associated roller assuming that particular time position. In this connection it may be pointed out that the structure is such (not shown) so that each time that time calculations are transferred from the calculator to certain posting units the various rotary arms are so centered that their respective rollers are each engaged with one contact and with one contact only. It may also be pointed out that the arms 145 and 146 are mounted on the same shaft 153 which makes one complete revolution for a 24 hour period, whereas the shafts 154 and 155 are gear connected to cause the shaft 155 to make 6 revolutions for each revolution made by shaft 154. It will be seen that arm 147 is provided with a plurality of rollers 151, whereas each of the other arms is provided with only one roller. The reason for this construction is that since shafts 154 and 155 are gear connected, and if ordinary gearing is used, the arms 147 will move only one tenth the distance to the next contact when the arm 148 moves to the next contact.

Attention is directed to the fact that for the tens-of-minutes and units-of-minutes contact mechanism EMTB and EMUB there is only one pair of contacts in each circuit passing therethrough, whereas for the tens-of-hours and units-of-hours contact mechanism EHTB and EHUB a plurality of contacts are connected in series in each circuit. For the contact mechanism EHUB all of the contacts which have the same unit number are connected in series whereas for the contact mechanism EHTB all of the contacts falling in the same tens digit are included in series. It is thus seen that the picking up of the relay WER will cause all of the wires leading out of the top of the contact mechanisms EHTB, EHUB, EMTB and EMUB except one wire for each mechanism to be energized, and since these wires are included in circuits leading to the proper posting units these posting units will be operated to display the time 01:12.

*Posting apparatus.*—As hereinbefore pointed out electrical apparatus is provided for transferring the airplane identification numbers, characterized by a token, and the estimated arrival time numbers, characterized by contact mechanisms controlled by the arrival time calculator, into the posting units of the columns "identity" and "estimate," respectively, in response to the depression of the token and a directional transfer button. If only the identification number is to be transferred the token and the transfer button ITB (Figs. 2 and 6G) is depressed.

Attention is now directed to the transfer apparatus shown in the upper right-hand corner of Fig. 6G of the drawings. This transfer apparatus includes a master posting relay MPR, an extension relay EXR, and transfer buttons ITB, WETB and EWTB for the control board AF (see Fig. 6G) and includes similarly designated relays and push buttons for corresponding apparatus of the control board LN (see Fig. 6N).

*Over-report apparatus.*—The over-report apparatus that is visible on the panel of the over-report pedestal has already been mentioned in connection with the description of this pedestal (see Over-report board). By referring to Fig. 6G of the drawings it will be observed that this master over-report apparatus in addition to the push buttons PB2, PB3, PBB and PBC (designated 2, 3, B and C in Fig. 3) the identification push buttons H0, H1, H2, T0, T1, T2, U0, U1 and U2, the over-time push buttons T0, T1, T2, U0, U1 and U2, the over-report transfer button OTB, and the over-report cancelling button OCB, there are provided a master over-report relay MOP, a relay MOR, a cancelling relay CANR, and a cancelling repeater relay CANP. The manner in which this apparatus cooperates to perform the over-report posting function will be pointed out in the description of the operation hereinafter.

*Conversion relays.*—As more fully pointed out hereinafter the posting units for posting airplane identity are each controlled by energizing all but one of the lead-in wires from bus wires but if the position of a posting unit is desired to be electrically manifested this is accomplished by electrical energy flowing only from one of the posting unit lead-in wires to such bus wires. It is thus seen that if the electrical manifestation of the position assumed by a posting unit is to be reposted somewhere else, as on another flight progress board, it will be necessary to convert the one-wire-only energized condition into a one-wire-only deenergized condition. That is, all the bus wires exclusive of the one wire which was energized from one source must be energized from a separate source of current, so that the posting unit to be operated will be operated to a corresponding position as that of the original posting unit. For this reason, conversion relays illustrated in the lower left-hand corner of Fig. 6G of the drawings for the control board AF have been illustrated, similar conversion relays for the control board LN have been illustrated in the lower left-hand corner of Fig. 6N.

By referring to the conversion relays in the lower left-hand corner of Fig. 6N it will be observed that relay H0 of this board is picked up by energy derived over the "zero" bus wire designated 60 and by picking up applies energy from another source to all of the remaining nine wires of which wires 61 and 62 only have been illustrated. Similarly, it will be observed that the relay H1 is picked up in response to energy of one kind derived from the "one" wire designated 61 and that this relay H1 applies energy of another source to all of the other remaining nine wires of that group of which the wires 60 and 62 only have been illustrated, and similarly, the relay H2 is energized from the "two" wire designated 62 and by picking up applies energy from a different source to each of the remaining nine wires of which only the wires 60 and 61 have been illustrated. In a similar manner the relays T0, T1, T2, U0, U1, U2, and all of the other conversion relays which have for convenience been omitted, similarly apply energy of a different character to each of the wires belonging to that digit except the particular wire which was energized to pick up such relay. It is thus seen that the expression "conversion relays" is significant in that it converts the one-wire-only energized condition of the bus into a one-wire-only deenergized condition.

Figure 6B:
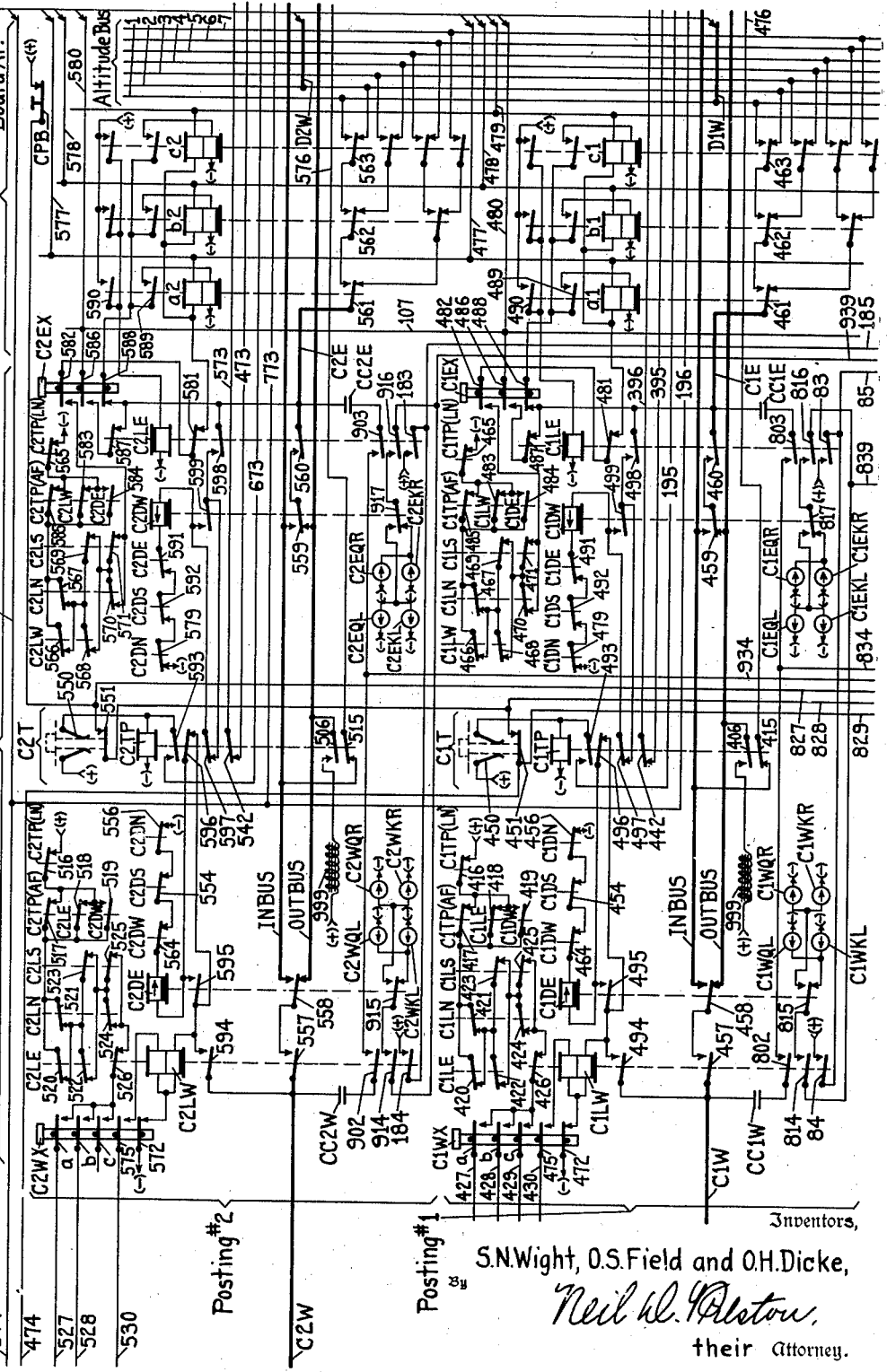

*Posting interlocking network.*—The posting interlocking network is substantially entirely shown in Figs. 6A, 6B, 6H and 6I of the drawings and is almost wholly controlled from the operator's control board and is used to establish flight route circuits. Each route circuit electrically identifies one posting area in each of a plurality of fixes on the control board and one posting area in each of a plurality of fixes on the flight progress board. These flight route circuits are controlled by the push buttons of control areas on the control board and control indicating lamps located in corresponding posting areas on both the control board and the flight progress board. These route circuits conform substantially, that is, rise and fall in the same way as the actual flight routes rise and fall in passing through the altitudes involved over the ground route defined by that control board and indicated by the associated flight progress board. Fig. 6A shows the postings 1 and 2 of the network for fix B, board AF whereas Fig. 6B shows postings 1 and 2 of the network for fix C, board AF. Similarly Fig. 6H shows postings 1 and 2 of the network for fix N, board LN and Fig. 6I shows postings 1 and 2 of the network for fix C of board LN, the fix C being common to both boards. It is desired to point out here that the apparatus and circuits in Figs. 6A, 6B, 6C, 6D, 6E, 6F and 6G (board AF) are identical to the apparatus and circuits of Figs. 6H, 6I, 6J, 6K, 6L, 6M and 6N, respectively (board LN). Different and distinct sources of current are, however, used on the two boards. It will be observed that each posting of the network is provided with two link wires. For posting 1 of fix B these link wires have been designated B1W and B1E and are electrically connected together only if a route circuit extending through the network of that posting has been established. In the reference character B1W the first character denotes the fix "B," the second the posting "1" and the third the direction "west" and other link wires are similarly designated. If the route circuit in question starts at that particular posting it receives its energy through the front contact of the associated token repeating relay, such as contact 504 of token repeating relay B2TP. Any one right-hand link wire for fix B can be connected to any left-hand link wire for fix C through the vertical bus wires 1 to 7 of the altitude bus illustrated on the right-hand side of Fig. 6A. Any east link wire of fix C board AF can be connected to any west link wire of fix D through the medium of similar altitude bus wires shown at the extreme right-hand end of Fig. 6B of the drawings. Similarly, any south link wire of fix C board LN can be connected to any north link wire of fix N through the medium of similar altitude bus wires shown at the extreme right-hand side of Fig. 6I. Also, any north link wire of fix C board LN can be connected to any south link wire of fix M through the medium of similar altitude bus wires, not shown. When a route is set up from left to right on either board AF (Figs. 6A and 6B) or board LN (Figs. 6I and 6H) current flows from left to right from link wire to link wire and it flows from right to left if the route has been set up from right to left.

The connections for connecting any particular east link wire of fix B to any particular west link wire of fix C is carried out through altitude bus wires numbered 1 to 7, inclusive, and these altitude wires are selected through the medium of combination relays or selecting relays *a*, *b* and *c*. There is a set of such combination relays for each posting-fix. The manner in which these combination relays *a*, *b*, *c*, etc., are picked up, that is, whether all or only some of these relays *a*, *b*, and *c* are picked up, for the section BC is determined by the particular push button CWX depressed at fix C, whereas the particular group of combination relays energized, that is, those with a suffix 1 (posting 1) or those with a suffix 2 (posting 2) is determined by the particular push button BEX depressed at fix B. The combination contacts for these combination relays *a*, *b*, and *c* are shown directly below these relays and from consideration of these contacts and their electrical interconnections it is readily seen that altitude bus 1 is selected by having all of the relays *a*, *b*, and *c* of any group energized, whereas, altitude bus wire 2 is selected when relays *a* and *b* only of any group are energized, altitude bus wire 3 is selected when relays *a* and *c* only of any group are energized, altitude bus wire 4 is selected when the relay *a* only of any group is energized, altitude bus wire 5 is selected when the relays *b* and *c* only of any group are energized, altitude bus wire 6 is selected when the relay *b* only of any group is energized, and altitude bus wire 7 is selected when the relay *c* only of any group is energized. As illustrated only seven altitude bus wires are employed and this would take care of only seven different postings at each fix. Since it is contemplated to employ 24 postings at each fix these combination relays would have to be increased to 5 and the circuits illustrated would have to be correspondingly expanded as will be obvious to any one skilled in the art. It is thus seen that any push button toward the left from any section (such as section BC) selects a particular, namely the associated, bank of combination relays; whereas, any push button in the fix toward the right of such section determines how the selected group shall be energized to select a particular altitude bus wire. The combination contacts *a*, *b*, *c* provided on the push buttons to the right of the section, such as push button C1WX (Fig. 6B) are such as to select the altitude bus wire connected to the associated link wire, such as C1W.

Each posting is provided with a token receptacle or token jack such as B1T or B2T (Fig. 6A) directly below which is shown its associated token repeating relay BTP. To the left of each token relay is shown the east direction relay DE and to the right of each token repeating relay is shown a west direction relay DW. For board AF these direction relays have been designated B1DE, B1DW, C1DE, C1DW, B2DE, B2DW, C2DE and C2DW. For board LN these direction relays have been designated C1DS, C1DN, N1DS, N1DN, C2DS, C2DN, N2DS and N2DN where the letters "S" and "N" designate south and north respectively (Figs. 6H and 6I).

Directly to the left of each east direction relay, such as BIDE, is shown the push button repeating relay BILW, whereas directly to the right of the west direction relay BIDW is shown the push button repeater relay BILE. Similarly designated push button relays are provided at other fix-postings. The push button repeating relay BILW is directly associated with the push button BIWX, whereas the push button repeating relay BILE is indirectly associated with the push button BIEX through the medium of the combination relays $ai$, $bi$, and $ci$ shown to the right thereof. The relay BILE, to be picked up requires at least one of the associated combination relays $ai$, $bi$ or $ci$ to be up. These combination relays are picked up by a circuit passing through the push contact 432 of such push button BIEX and a back contact 431 of its associated push button repeating relay BILE. The reference characters for the various relays just mentioned include prefixes which designate the fix and the posting with which they are associated. It may be pointed out that the push button repeating relays BILW and BILE in combination with the direction relays BIDE and BIDW control the indicating lamps BIWQR, BIWQL, BIEQR and BIEQL located on the control board and control the direction indicating lights BIWKR, BIWKL, BIEKR and BIEKL located on the flight progress board. This is accomplished through the medium of contacts 407, 408, 409 and 410 of the associated push button repeating and direction relays. Similarly numbered contacts are provided at the other fix-postings.

Referring to posting 2 for fix B (Fig. 6A) it will be observed that if token 122T, for instance, is inserted in token receptacle B2T, as shown, that the token repeating relay B2TP will be energized and picked up, and that current may then flow from the positive terminal of the main battery through the inductance 999 and front contact 504 of token repeating relay B2TP to the associated out bus OUTBUS. If a route is to be set up toward the east, the push button repeater relay B2LE will be picked up and by the closing of its front contact 510 will energize the link wire B2E, whereas if a route toward the west is to be set up the push button repeater relay B2LW will be picked up and by the closing of its front contact 507 will energize the link wire B2W. This energy flows through back contacts 509 and 508 of direction relays B2DW and B2DE respectively. The manner in which these push button repeating relays B2LE and B2LW and their associated direction relays B2DW and B2DE are controlled will be more specifically pointed out in the complete operation of the system hereinafter described.

*Brief operation*

By reason of the complex network of circuits involved it is considered desirable to first give a brief description of the operation of the system by discussing the manipulation of the apparatus and the results accomplished thereby and without discussing the specific circuits involved.

Referring to Fig. 1 of the drawings, let us assume that the dispatcher is informed that an airplane numbered 122 is to start at fix or station B which airplane is to proceed to fix N over the ground route A—F from fix B to fix C and over ground route L—N from fix C to fix N shown on his desk and which flight route may be set up by manipulation of push buttons on the two board and a token on the control board AF. This information would come to the dispatcher in short form called a flight plan which might read: Flight plan 122, speed 180, estimated over B at 10:00, cruising 2000 to enter B 3000. The dispatcher will advise the two operators of boards AF and LN of the desired flight route for airplane 122 and of the necessity of setting up and assigning an air flight route for airplane 122 on the flight progress boards FPAF and FPLN starting at station B at 10 o'clock in a direction from left to right toward station N and that this route is to start at altitude 3000 possibly because the airplane is approaching at the 3000 foot altitude and will not stop at fix B. The controller at the control board AF will observe his board and also the flight progress board FPAF and will observe that he has posting 2 assigned to the 3000 foot altitude available, at fix B on the control board AF and the flight progress board FPAF and that he has postings 1 and 2 available both assigned to 2000 foot altitude at fix C, and the operator of board LN will observe that he has postings 1 and 2 assigned to the 2000 foot altitude available at fix N. The operator of board AF will now conclude, knowing the base time or starting time for the airplane at fix B to be 10 o'clock, that it will probably be safe to choose the posting 2 assigned to the 3000 foot altitude at fix B and to choose posting 1 assigned to the 2000 foot altitude at fix C for his proposed route for airplane 122. Let us also assume that the airplane flight identification number is 122 which is also the identification number for that particular airplane. These identification characters may, however, be different and if they are the airplane identifying character will be inscribed on the token plate, as will also the cruising speed, the pilot's name, the destination of the airplane, its cargo, etc.

The operator of board AF will now take token 122T and insert it in token jack B2T on the control board (see Figs. 2, 6A and 6C). He could just as well have inserted it in token jack B3T (not shown) because these postings 2 and 3 have both been assigned to the same altitude 3000. He will then depress the push button B2EX on panel B of his control board and will simultaneously therewith depress the push button CIWX on the panel C of this control board (Figs. 2 and 6B). Depression of these push buttons will cause the indicating lamps B2EQR and CIWQR on his controller's board to be illuminated, as are also lamps B2EKR and CIWKR on the flight progress board FPAF. On the flight progress board FPAF (see Fig. 4) the indicating lamps B2EKR and CIWKR will be illuminated displaying arrow points pointing to the right and evidencing that an airplane flight from left to right and entering fix C at posting 1 at altitude 2000 feet has been set up. The operator will also be informed by his token on panel B and from arrow lamp B2WQR from what posting on panel B his route entered panel C. By depressing his token 122T the indicating lamps lighted on the control board AF and on the flight progress board FPAF for the route represented by that token will be intermittently lighted or flashed so that he can readily observe at what altitudes at particular fixes his proposed route is located.

The operator will now set the west-to-east cruising knob EC, direction of airplane travel being toward the east, to the proper cruising speed (180 miles per hour) for the airplane 122 under construction. He will then manipulate the indicating-control dials EHB—EMB (see Fig. 2) to display the starting time of 10:00 on these dials. He will then adjust, if necessary, the variable factor correcting dial EVBC to make the proper correction for windage and other variable factors entering into the effective airplane speed. As a result of these manipulations the arrival time for the airplane 122 at fix C will be directly indicated on the control and indicating dials EHC—EMC on the controller's board which we will assume is 11:10 for fix C (see Fig. 4). This starting time of 10:00 will also be electrically manifested by the circuit controllers EHTB, EHUB, EMTB and EMUB (see Figs. 6D and 7 of the drawings) whereas the arrival time of 11:10 will be electrically manifested by the circuit controllers EHTC, EHUC, EMTC and EMUC (Fig. 6F) of the west-to-east calculator contained in the controller's desk of board AF (Fig. 2). Had the arrival time desired for fix C been known the starting time for fix B could have been calculated in a similar way by first setting the time for fix C.

The operator now has before him the display of a tentative flight route not only on his control board by the illumination of direction indicating lamps B2EQR and C1WQR but he is also provided with illuminated direction indicating lamps B2EKR and C1WKR on the flight progress board of which all the arrows point to the right. The operator is also informed by the readings on the starting time indicating dials EHB—EMB and on the arrival time dials EHC—EMC when the airplane 122 is to fly over fixes B and C of the proposed flight route. The operator may now compare these time readings with other time readings displayed on postings at fixes B and C in the neighborhood of the 2000 and 3000 foot altitudes. If the operator concludes that it is safe to assign the proposed route to the pilot of airplane 122 he will depress the token 122T and will simultaneously therewith depress the west-to-east transfer button WETB (see Figs. 2 and 6G) in response to which the airplane identification number 122 as well as the starting and arrival times will be displayed in the proper display areas on each of the panels B and C of the flight progress board FPAF, as shown in Fig. 4 of the drawings.

For reasons hereinafter explained the airplane identification number 122 and the estimated arrival time 11:10 will also be displayed in posting 1 of fix C of flight progress board FPLN. The operator of control board LN will now decide to continue the flight route to, say posting 2 of fix N which is assigned to the 2000 foot altitude (see Fig. 4). To accomplish this he will depress his push buttons C1SX (Fig. 6I) and N2NX (Fig. 6H) simultaneously. This will cause the relays a1 and b1 of Fig. 6I only to pick up (the contact c of push putton N2NX not being connected to any wire) which is followed by the picking up of push button repeating relays C1LS and N2LN and direction relay N2DS. This will cause the direction arrow lights C1SQR, C1SKR, N2NQR and N2NKR to be illuminated. The operator of board LN will now set time dials for fix C of his north-to-south arrival time calculator to 11:10 and will adjust the cruising speed dial SE (not shown) to the cruising speed 180 of airplane 122 as a result of which the arrival time for airplane 122 at fix N will appear on his time dial for fix N, assumed to be 12:30. After comparing the estimated arrival time of 12:30 on his calculator with other arrival times for fix N in the neighborhood of altitude 2000 to see if any hazard of possible conflict is imposed and finding none he will depress the token jack C2T (with no token therein) and will simultaneously depress his north-to-south transfer button NSTB (Fig. 6N) as a result of which the flight route number 122 will appear in posting 2 "identity" column fix N (Fig. 5) as will also appear the estimated arrival time of 12:30 in the column "estimate" on the same panel. The posting of identity at a second fix on the second board is accomplished by copying the identity number 122 from the identity posting units of the common fix C in such flight route on the second board. This is accomplished by feeding current from a special source to the identity bus over the wire for each posting unit which was deenergized when such posting unit was last operated. This special energy then picks up a conversion relay for each digit which conversion relay in turn energizes from the regular source for board LN every bus wire for that digit except the bus wire that picked up such conversion relay. This regular energy source then operates the identity posting units, all but one wire for each digit being energized, in the same manner as energy from the identity contacts of a token jack can operate such posting units.

One of the operators, or the dispatcher, as the case may be, will now issue orders to the pilot of airplane 122 informing him that he is to fly from west to east over fix B at 10:00 o'clock, over fix C at 11:10 and over fix N at 12:30 and that he is to fly at an altitude of 3000 feet over fix B and at 2000 feet when passing over fixes C and N. In practice this order will be issued in short form somewhat as follows: Flight plan 122, speed 180, cruising 2000, to cross B 3000 at 10:00, C at 11:10 to N at 12:30, which means he is to fly at 2000 feet throughout the entire flight except where other altitudes are specified.

Let us now assume that this airplane 122 proceeds over the flight route assigned to it and that it arrives at fix C two minutes late, namely, at 11:12 o'clock. The pilot will then report, as by radio-phone, to the over-report man stationed at over-report pedestal OPAF (see Figs. 1 and 3) the fact that his airplane 122 is passing over fix C at altitude 2000 feet at 11:12 o'clock. The over-report operator will then (see Figs. 3 and 6G) depress the push button C (PBC in Fig. 6G or 6N) the push button 2 in the column headed "altitude" (PB2 in Fig. 6G or 6N) the push buttons 1, 2 and 2 (H1, T2, and U2 in Fig. 6G or 6N) in the three columns of airplane "identification," will push the push button 1 in the first column T and push button 2 in the second column U of the "over-report time" push buttons, and will then depress the transfer push button OTB (Figs. 3 and 6G or 6N) on his over-report pedestal OPAF. Depression of these various push buttons on the over-report pedestal will, of course, cause these push buttons to remain in their depressed position by electro-magnetically operated latches, one such latch designated LM having been illustrated on push button PBC in each of Figs. 6G and 6N of the drawings. With these push buttons held in their depressed position a circuit is established to identify postings 2 and 3 at fix C because both of these postings are assigned to altitude 2000. Separate sets of check relays HR, TR and UR have been provided, one set for each posting for each altitude. For the first posting in a particular altitude these check relays have been designated HR1, TR1 and UR1, (Fig. 6G) and for the second posting of such altitude these check relays have been designated HR2, TR2 and UR2 (Fig. 6G), and as more specifically pointed out hereinafter the check relays HR1, TR1 and UR1 will all pick up whereas one or more of the check relays HR2, TR2 and UR2 will remain in their deenergized position. The picking up of the check relays HR1, TR1 and UR1 will establish a circuit to post the over-report time of 12 minutes in posting 1, column "over" on panel C of each of the flight progress boards FPAF and FPLN (Figs. 4, 6F and 6L).

The operator who sits at the control board AF will be expected to watch his board and observe that the over-report time of 12 minutes has been displayed on panel C of his flight progress board FPAF at posting 1 located in the 2000 foot altitude band. As he observes this actual arrival time, or time at which the airplane flew over fix C, he is of course aware of the fact that the flight route 122 from fix B to fix C on his flight progress board is no longer necessary for airplane 122 and he will then remove his token 122T from token jack B2T and will advance it and insert it in token jack C1T board AF (Figs. 2 and 6B). As a result of this advancement of the token 122T from token jack B2T panel A to token jack C1T of panel C on the operator's control board AF there will be no cancellation of any part of the route. If, however, the token after having been inserted in token jack C1T is depressed, all of the relays of the route to the rear of fix C will be deenergized and the lamps in all of the posting units and also the direction indicating lamps B2EQR, B2EKR, C1WQR and C1WKR to the rear of fix C will be extinguished.

It is thus seen that the operator may first set up a tentative flight route on his control board which will be manifested on the control board by one or two direction lights for each affected control area and which is also manifested by direction lamps located on the flight progress board displaying arrows indicating the direction of flight over the proposed route. He may then display on his west-to-east arrival time calculator the starting time as well as the cruising speed of the airplane which will result in the visual display of arrival time on the indicating dials of his calculator at each of the fixes on the entire portion of the route extending over his board. The operator may then compare these arrival times with arrival times displayed on conflicting flight routes already set up on the flight progress board adjacent the proposed flight route and if he is convinced that it is safe to complete the setting up of the new route for airplane 122 as proposed he may depress his token and depress a transfer button also located on the controller's desk as a result of which both the airplane identification numerals and the estimated arrival time numerals will be transmitted electrically and automatically from contacts on the token jack and contacts on the arrival time calculator to display both the airplane identification and the estimated arrival times on the flight progress board. The operator of the second control board LN may extend the route on his control board and flight progress board in a similar manner. If thereafter the pilot reports arriving at some subsequent fix the over-report operator will depress proper push buttons in accordance with the report received by him, as by radio-phone, and if the pilot's over-report defines the same flight route as is set up on the flight progress board at the reported fix and in the reported altitude the over-report time will be displayed on the flight progress board in the proper posting display area in the column "over" at the reported fix. Advancement of the token to another token jack in the route followed by depressing of the token will result in cancellation of that portion of the route to the rear of the token.

If the proposed route extends over a portion of two boards the posting of airplane identity as well as the arrival time will occur at the common fix on both boards. In advancing the token from the common fix-posting of one board to the common fix-posting on the second board it is not necessary to first depress the token. The over-report posting on the second board and cancellation of the route to the rear of the token is accomplished on the second board in exactly the same way as it is on the first board as already described briefly.

*Detailed operation*

In the brief operation just reviewed it was assumed that a flight route beginning at posting 2 of fix B assigned to the 3000 foot altitude was extended through posting 1 of fix C assigned to the 2000 foot altitude and common to both boards AF and LN and was then extended to posting 2 of fix N assigned to the 2000 foot altitude on board LN.

*Establishing a flight route circuit.*—Let us now consider the establishment of the route circuit for this flight route. In order to initiate this flight route at posting 2 of fix B it will be necessary for the operator to insert a token in the token jack B2T (see Figs. 6A and 6C) where the token 122T has been illustrated inserted in the token jack B2T. With this token 122T so inserted in token jack B2T the token repeater relay B2TP will be energized and picked up through a pickup circuit including the contact 500 of the token jack B2T and which is readily traced in the drawings. This token repeating relay B2TP is then stuck up through a stick circuit which may be traced from the terminal (+) of a suitable source of current through the cancelling push button CPB (see top of Fig. 6B) through front push contact 551 of the token jack C2T, front push contact 451 of token jack C1T, wire 474, front push contact 501 of the token jack B2T, front push contact 401 of token jack B1T, connecting link or jumper 199 at end fix (shown dotted), cancel bus 574, stick contact 543 of the token repeating relay B2TP through the winding of this relay to the other terminal (—) of the same source of current. Obviously, the token repeater relay B2TP will remain energized even though the token 122T is removed from the token jack B2T. It should be noted that these various push contacts are each normally shunted by a back contact 13 of the associated over-report lighting relay EOPS (see Fig. 6D).

To set up this route the operator will then depress the push buttons B2EX (Fig. 6A) and C1WX (Fig. 6B), it being remembered that network battery feeds plus energy to the out bus OUTBUS for posting 2, fix B, as a result of which the combination relays *a2*, *b2* and *c2* (Fig. 6A) will be picked up through the following circuits: Beginning at the terminal (+) of a source of current through back contact 416 of the token repeating relay C1TP (LN) of board LN (but shown in Fig. 6B), back contacts 417 and 418 of the relays C1TP (AF) and C1LE in multiple, through back contacts 420 and 421 of the relays C1LE and C1LN in multiple, back contacts 422 and 423 of the relays C1LE and C1LS in multiple, back contacts 424 and 425 of the relays C1LN and C1LS in multiple, back contact 426 of the relay C1LW, through push contacts *a*, *b* and *c*, of the push button C1WX, wires 427, 428 and 429 in multiple, through the windings of the relays *a2*, *b2* and *c2*, through back contact 531 of the push button repeater relay B2LE, through push contact 532 of the push button B2EX, and back contacts 533 and 535 of the relays B2LW and B2TP in multiple, to the other terminal (—) of the same source of current. This causes all three of the combination relays *a2*, *b2* and *c2* (Fig. 6A) to pick up and through the medium of their front contacts 540 close energizing circuits readily traced for the push button repeater relay B2LE. This push button repeater relay is slow to pick up, as conventionally shown, and before it is actually picked up the push button repeating relay C1LW is picked up through a circuit including the back contact 537 of the push button relay B2LE. This latter pick-up circuit may be traced from the link wire B2E, through back contact 537 of the relay B2LE, push contact 536 of the push button B2EX, bus wire 57, wire 430, push contact 475 of the push button C1WX, through the upper winding of the relay C1LW (Fig. 6B), through pull contact 472 of the push button C1WX to the other terminal (—) of the same source. This is followed by picking up of the push button repeating relay B2LE. The combination relays *a2*, *b2* and *c2* (Fig. 6A) are then stuck up through stick circuits including their stick contacts 539 and the pull contact 538 of the push button B2EX. The push button repeater relay C1LW is stuck up through a stick circuit including its stick contact 494, and pull contact 472 of the push button C1WX, the link wire C1W receiving plus energy from link wire B2E through front contacts 511, 512 and 513 of relays *a2*, *b2* and *c2* (Fig. 6A).

The picking up of the push button repeater relay C1LW (Fig. 6B) through the medium of its front contact 494 closes a pickup circuit for the direction relay C1DE including the back contact 496 of the token repeating relay C1TP (Fig. 6B) and the back contacts 464, 454 and 456 of the direction relays C1DW, C1DS and C1DN. It is thus seen that only one of the four direction relays at a common fix-posting can be picked up at one time. It is also readily seen from the contacts 420 and 422 of relay C1LE (Fig. 6B), contacts 421 and 424 of relay C1LN and contacts 423 and 425 of relay C1LS that the push button C1WX is effective only so long as not more than two of these relays are energized. This imposes the restriction of allowing only two push button repeater relays at a common fix-posting to be picked up at any one time. The direction relay C1DE will then stick up through a stick circuit including its stick contact 495 and including front contact 494 of the push button repeater relay C1LW. The picking up of the push button repeater relay B2LE will by this time open the pick-up circuit for the relay C1LW (Fig. 6B) at its back contact 537. The stick circuits for these relays *a2*, *b2* and *c2*, C1LW and C1DE will of course receive energy from the link wire B2E which link wire receives its energy from the terminal (+) of the network battery through inductance 999 and front contact 504 of the token repeating relay B2TP.

The operator of the control board AF may now, in a manner as already generally described and more specifically described below, post the airplane identifying number 122 and the starting time of ten o'clock on the panel board B and the airplane identifying number 122 and the arrival time of 11:10 at posting 1 of fix C on both boards AF and LN so that the operator of board LN is informed that the flight route has been set up on the board AF up to the common fix C. The operator of board LN may now extend the route from posting 1 of fix C of board LN to the posting 2 of fix N, board LN. This will be accomplished by the simultaneous depression of the push button C1SX (Fig. 6I) and push button N2NX (Fig. 6H). Simultaneous depression of these two push buttons establishes energizing circuits for the relays *a1* and *b1* (Fig. 6I) only, the relay *c1* not being energized because the contact *c* of push button N2NX has no wire connected thereto. The circuits for energizing these relays *a1* and *b1* may be traced from the terminal (+) of the network battery through back contacts 946 and 947 of the relays N2LS and N2TP, back contact 948 of the relay N2LN, push contact *a* and *b* of the push button N2NX, wires 777 and 778 in multiple, windings of the relays *a1* and *b1* in multiple, back contact 681 of the push button repeating relay C1LS, through push contact 682 of the push button C1SX, back contacts 670 and 671 of relays C1LW and C1LE in multiple, back contacts 668 and 669 of relays C1LN and C1LE in multiple, back contacts 666 and 667 in multiple of relays C1LN and C1LW, back contacts 683 and 685 in multiple of relays C1LN and C1TP (LN), and back contact 665 of the relay C1TP (AF), to the other terminal (—) of the network source. With these relays *a1* and *b1* now energized and picked up, they will through the medium of their front contacts 690 energize the push button repeating relays C1LS. The relays *a1* and *b1* are stuck up through stick circuits including their stick contacts 689 and including pull contacts 688 of the push button C1SX and derive their stick energy from the link wire C1S. Before the push button repeater relay C1LS picks up, this relay being a slow pick-up relay as conventionally shown, an energizing circuit for the push button repeater relay C2LN is closed which may be traced from the link wire C1S (Fig. 6I) through back contact 687 of the relay C1LS, push contact 696 of the push button C1SX, wires 257 and 789, push contact 725 of the push button N2NX, through the upper winding of the relay N2LN, through the pull contact 722 to the other terminal (—) of the network source. The push button repeater relay N2LN will of course pick up before the push button repeater relays C1LS is picked up and will then stick up through its stick circuit including its stick contact 794 and pull contact 722 of the push button N2NX, energy being supplied from link wire N2N. The picking up of the push button repeater relay C1LS (Fig. 6I) by closing its contact 660 will connect the out bus OUTBUS posting 1, fix C to the link wire C1S, it being understood that the direction relay C1DN (Fig. 6I) did not pick up because the direction relay C1DE (Fig. 6B) is now energized thereby holding its back contact 692 included in series with the direction relay C1DN (Fig. 6I) open.

It should now be remembered that the token 122T is located in token jack B2T (Fig. 6A) thereby holding the token repeating relay B2TP energized, and that relays B1LE, *a2*, *b2* and *c2* (Fig. 6A) are now energized, that relays C1LW and C1DE (Fig. 6B) are now energized, that relays C1LS, *a1* and *b1* (Fig. 6I) are energized, and that relays N2LN and N2DS (Fig. 6H) are energized. The following energized route circuit may now be traced through front contacts of these various relays as follows: beginning at the terminal (+) of the network battery inductance 999, front contact 504 of the token repeating relay B2TP (Fig. 6A), the associated outbus OUTBUS back contact 509 of relay B2DW, front contact 510 of relay B2LE, link wire B2E, front contacts 511, 512 and 513 of relays a2, b2 and c2 (Fig. 6A), the wire 1 of the vertical altitude bus (section B—C) link wire C1W, front contact 457 of relay C1LW, front contact 458 of relay C1DE, the in bus INBUS (Fig. 6B), back contact 415 of the token repeating relay C1TP (Fig. 6B), wire 476 (Figs. 6B and 6I), back contact 615 of the token repeating relay C1TP (Fig. 6I), the out bus OUTBUS, back contact 659 of relay C1DN, front contact 660 of relay C1LS, link wire C1S, front contacts 661 and 662 of the relays a1 and b1, back contact 663 of the relay c1 (Fig. 6I), the wire 2 of the vertical altitude bus (section C—N) the link wire N2N (Figs. 6I and 6H), and through front contacts 707 and 708 of the relays N2LN and N2DS respectively, to the in bus INBUS for posting 2 of fix N (Fig. 6H). This route circuit just traced is primarily used to connect in multiple the transformers which feed the various alternating current relays ER (see Figs. 6D, 6F, 6L and 6J).

The proposed route for airplane 122 having now been set up from fix B to fix C on board AF and from fix C to fix N on board LN by the lighting of the direction arrow lights B2EQR, B2EKR (Fig. 6A), C1WQR, C1WKR (Fig. 6B), C1SQR, C1SKR (Fig. 6I), N2NQR, and N2NKR (Fig. 6H).

With the route circuit just traced now energized and with the various associated push button relays and direction relays energized therefrom through their respective stick circuits including stick contacts of these push button relays and direction relays energize various direction arrow lights above mentioned through circuits which will now be successively traced. Direction lights B2EQR and B2EKR are energized through back contact 111 of the alternating current relay B2ER (Fig. 6D), wire 937, front contact 912 of relay B2LE, and back contact 913 of relay B2DW; lamps C1WQR and C1WKR are energized through back contact 160 of the alternating current relay C1ER (Fig. 6F) through wire 839, front contacts 814 and 815 of relay C1LW and C1DE respectively (Fig. 6B); the lamps C1SQR and C1SKR are energized through back contact 210 of the alternating current relay C1ER (Fig. 6L), wire 841, front contact 820 of the relay C1LS, and back contact 821 of the relay C1DN; and direction lamps N2NQR and N2NKR are energized through back contact 261 of the alternating current relay N2ER, wire 943, front contacts 922 and 923 of relays N2LN and N2DS respectively (Fig. 6H).

*Setting calculator—Board AF.*—The operator of control board AF is now in a position to calculate his estimated arrival times. Let us therefore assume that the operator adjusts his cruising speed dial EC of his west-to-east calculator on the control board AF (Fig. 2 to the proper cruising speed of 180 M. P. H. and that he adjusts the time dials for fix B to indicate the starting time of 10:00 and makes such adjustments on his variable correcting dials as deemed necessary. In response to this manipulation of the dials of the west-to-east arrival time calculator the time 11:10 will appear on the time dial for fix C.

*Posting identity, starting and arrival time.*— The operator for board AF will now depress his token 122T located in token jack B2T (Figs. 6A and 6C) and will simultaneously therewith depress his transfer push button WETB (Fig. 6G) in response to which the starting time of 10:00 and arrival time of 11:10 as well as the airplane identifying number 122 will be transferred from the control board AF to the posting units at fixes B and C on the flight progress board FPAF all in a manner as previously briefly described. Depression of the push button WETB (Fig. 6G) causes the master posting relay MPR (Fig. 6G) to be picked up through a circuit including the push contact 78 of push button WETB and back contact 34 of the relay MOP. As soon as the master posting relay MPR picks up the pick-up circuit for the lower winding of the master over-report posting relay MOP is broken at back contact 35 of the relay MPR, so that over-report posting is locked out so long as regular posting is carried out. With the relay MPR now picked up an energizing circuit for the west-to-east calculator relay WER (Fig. 6E and 7) including the front contact 36 of the master posting relay MPR, push contact 37 of push button WETB, wire 38, and back contact 39 of the east-to-west calculator relay EWR is closed. The picking up of the relay WER (Fig. 6E) will by the opening of its back contact 44 open the pick-up circuit for the relay EWR and by the closing of its stick contact 45 will close a stick circuit including the front contact 36 of the master posting relay MPR and wire 46. The pick-up circuit for the east-to-west calculator relay EWR, which cannot now be closed, includes the push contact 47 of the push button EWTB and the wire 48. Depression of the token 122T and the token jack B2T in which it is now inserted by closure of push contact 503 (Fig. 6D) of this token jack B2T closes an energizing circuit for the primary winding of the transformer TB2 (Fig. 6D). This energizing circuit may be traced from the right-hand terminal of the secondary winding of the transformer TAF (Fig. 6G), wire 87 through back contact 50 of the relay MOP, wire 89 (Figs. 6G, 6E and 6D), through push contact 503 of token jack B2T, through the primary winding of the transformer TB2, through wire 90 (Figs. 6D, 6E and 6G) to the left-hand terminal of the secondary winding of transformer TAF. The energization of the transformer TB2 (Fig. 6D) causes the alternating current relay B2ER to be picked up. The alternating current relay C1ER (Fig. 6F) will however also be energized by deriving energy from the route circuit heretofore traced (Figs. 6A and 6B) and this energizing circuit will now be traced as follows: beginning at the upper terminal of the primary winding of the transformer TB2 (Fig. 6D) through wire 933, front contact 901 of the push button repeating relay B2LE, condenser CB2E, link wire B2E, front contacts 511, 512 and 513 of the relays a2, b2, c2 (Fig. 6A), wire 1 of the altitude bus (section B—C) link wire C1W (Fig. 6B) from whence the circuit branches down through the condenser CC1W, front contact 802 of relay C1LW, through wire 834, to the upper terminal of the primary winding of the transformer TC1 board AF (Fig. 6F). Similar circuits connect the transformer TC1 board LN (Fig. 6L) and the transformer TN2 in multiple through the medium of condensers CC1S and CN2N. The lower terminal of each of these transformers TB2 and TC1 are connected to the wire 90 which in turn is connected to the left-hand terminal of the master transformer TAF, the lower terminals of the transformers TC1 board LN (Fig. 6L) and TN2 (Fig. 6J) being connected to the wire 290 which is connected to the left-hand terminal of the secondary winding of the transformer TLN of board LN (Fig. 6N). With the alternating current relays B2ER (Fig. 6D) and C1ER (Fig. 6F) now energized all of the posting units for posting airplane identity and designated I with additional suffix letters for the route 122 on board AF and all estimated arrival time posting units designated E with additional suffix letters for the same route portion will have their return circuits closed to the terminal minus of the source Baf through front contacts 52 of their respective associated alternating current relays B2ER (Fig. 6D) and C1ER (Fig. 6F) and wire 96 and front contact 97 of master posting relay MPR (Fig. 6G).

Referring to Fig. 6C it will be observed that the token 122T allows current to flow to each of the thirty wires leading therefrom through rectifiers 505 except through wire 1 for the hundredths column H which is connected to bus wire 61, the wire 2 in the tens column T connected to the bus wire 72, and the number 2 wire of the units digit connected to the bus wire 82. By referring to the airplane identification posting units IB2H, IB2T and IB2U (Fig. 6C) it will be observed that only the stationary contact, shown by dots, connected to the deenergized bus wire for each digit will remain engaged by the rotary contact arm 49 if the circuit portion leading to the negative terminal of the battery from such posting unit is closed. In other words, the posting unit IB2H will be operated until the contact of the wire 1 thereof is connected to the clutch magnet CM by rotary arm 49, whereas the posting units IB2T and IB2U will be operated to positions where the contacts of wires 2 thereof are connected to their respective clutch magnets CM by their respective rotary arms 49. In a similar manner each of the estimated arrival time posting units EB2HT, TB2HU, EB2MT, EB2MU (Fig. 6D) will be operated to positions where they display a number corresponding to the number assigned to the wire thereof which is deenergized.

The circuit for operating the identification posting units IB2H, IB2T and IB2U will now be traced. Beginning at the terminal (+) of the battery Baf, back contact 53 of the relay EXR (Fig. 6G), front contact 107 of the master posting relay MPR, wire 108 (Figs. 6G, 6E and 6D), front contact 54 of the alternating current relay B2ER, wire 155, contact 502 of the token jack B2T (Fig. 6C), through the various token jack contacts and rectifiers 505, and through the various bus wires 60, 62, 70, 71, 80 and 81 to the various identification posting units IB2H, IB2T, IB2U (Fig. 6C), IC1H, IC1T, IC1U (Fig. 6E), IC1H, IC1T, IC1U (Fig. 6M), to the upper winding of the various associated EP relays, and then through front contact 52 of the various associated alternating current relays ER to the wire 96 for board AF (Figs. 6E and 6G) through front contact 97 of the master posting relay MPR to the (—) terminal of the battery Baf for board AF (Fig. 6G). These various posting units for posting identity and designated I (with suitable suffix letters) for that flight route will each be operated in response to the completion of these circuits to indicate the airplane or flight route number 122. In a similar manner the various estimated arrival time posting units for that flight route will be operated through circuits including front contacts of the calculator relay WER (Figs. 6E and 7) and the various contact mechanisms, such as contact mechanisms EHTB, EHUB, EMTB and EMUB (Figs. 6D and 7), until the posting units for posting 2 of the fix B assume positions to indicate the starting time of 10:00 and the contact mechanisms EHTC, EHUC, EMTC and EMUC (Fig. 6F) until the posting units for posting 1 of that fix C assume positions to indicate an arrival time of 11:10. These latter circuits will now be traced.

The circuits for operating the tens of hours posting unit EB2HT (Fig. 6D) in accordance with the position assumed by the contact mechanism EHTB (Figs. 6E and 7) may be traced from the plus terminal of the battery Baf (Fig. 7) through front contacts 27 and 29 of the relay WER wires 0 and 2 in cable 73, through two groups of series contacts numbered 0, 1, 2, 3, 4, 5, 6, 7, 8, 9 and 0, 1, 2, 3 respectively to wires 0 and 2 leading to posting unit EB2HT through contacts 0 and 2 successively, the rotary arm 49 and the clutch magnet CM of this posting unit EB2HT (Fig. 6D) through rectifier 113 through the upper winding of relay B2EP, front contact 52 of relay B2ER, wire 96 (Figs. 6D, 6E and 6G) through front contact 97 of master posting relay MPR to the other terminal (—) of the same battery Baf. The circuits for the units of hours posting unit EB2HU start at the positive terminal of the battery Baf pass through contacts 25 and 26, wires 1 and 2 of cable 74 through two series groups of contacts 1, 1, 1, and 2, 2, 2, respectively out over wires 1 and 2 through the contacts 1 and 2 successively of posting unit EB2HU (Fig. 6D), the rotary arm 49 and the clutch magnet CM, through rectifier 113 through the upper winding of relay B2EP, front contact 52 of relay B2ER, wire 96 (Figs. 6D, 6E and 6G) front contact 97 of master posting relay MPR to the other terminal of battery Baf. The circuits for posting units EB2MT and EB2MU may be similarly traced through wires 1 and 2 of cable 75 and wires 1 and 2 of cable 76 (Figs. 7 and 6D) as a result of which they each display the numeral zero. The completion of these circuits causes the posting units EB2HT, EB2HU, EB2MT and EB2MU to display the starting time 10:00. In a similar manner the estimated arrival time posting units EC1HT, EC1HU, EC1MT and EC1MU will be caused to display the arrival time 11:10 when the rotary arms of the calculator for fix C assume the 11:10 position.

Each of the various EP relays for that route such as relays B2EP, C1EP will of course pick up in that they are connected in series with the posting units just mentioned and as they pick up they each close a stick circuit for the master posting relay MPR (Fig. 6G) including for instance the front contact 63 of the relay B2EP, front contact 64 of the associated alternating current relay B2ER, wire 102 (Figs. 6D, 6E and 6G) and stick contact 101 of the master posting relay MPR (Fig. 6G). It is thus seen that the master posting relay MPR will be stuck up so long as any posting unit has not been fully operated to its new position. When the posting units for posting both identity and arrival time have all reached their new positions the energizing circuits through the upper windings of the EP relays will be broken and all the stick circuits for the master posting relay MPR will all be opened.

While these various EP relays are in their energized and picked up positions they however close through the medium of their front contacts 68 and pick-up circuit for their associated stick lighting relay, such as relay B2EPS for relay B2EP. Since each EP relay, such as relay B2EP, is provided with a front contact 65 to energize its associated transformer, such as transformer TB2, all of the alternating current relays ER for the flight route will be energized and in their picked up condition, so long as any EP relay for that flight route is in picked up condition, and it will not be necessary for the operator to continue holding his token 122T in token jack B2T down to hold the contact 503 associated therewith closed. This holding of all ER relays energized is necessary insofar as transfer of the airplane identification is concerned in that since the token is assumed to be in token jack B2T the relay B2ER must remain up to maintain its front contact 54 closed to feed energy to the token jack B2T even though relay B2EP has already assumed its deenergized position; at least until all the other EP relays have also assumed their deenergized position. When the relay B2EPS has once been picked up, it remains stuck up through a stick circuit including its stick contact 69 and including wire 185 and front contact 183 of push button repeating relay B2LE.

Not only was by this transfer function the airplane identification number 122 displayed in postings 2 of fix B and posting 1 of fix C on the progress board FPAF (Fig. 4) but this number 122 was also displayed in posting 1, fix C, board FPLN identity column, as was also the arrival times of 11:10. To accomplish this the alternating current relay CIER board LN (Fig. 6L) was not required to be picked up because the right-hand terminal of the upper winding of series relay CIEP (Fig. 6L) is at the time of transfer connected to the minus terminal of battery Baf through wire 304, front contact 105 of relay CIER, board AF (Fig. 6F), wire 96, and front contact 97 of master posting relay MPR (Fig. 6G). For like reasons the posting units in the "estimate" column, posting 1, board FPLN (Fig. 6L) will also be operated to display the arrival time of 11:10.

As already pointed out alternating current should be continued to be supplied to the route network for flight route 122 on board AF until all posting units for that flight route have completed their operation. Since the series relay CIEP, board LN (Fig. 6L) manifests when the token units for board LN of the common fix C have completed their operation it is necessary for alternating current to be applied to the network of board AF until this relay CIEP of board LN assumes its deenergized position. This is accomplished by the partial circuit for shunting the front contact 65 of the relay CIEP (Fig. 6F) which partial circuit includes the wires 88 and 89 (Figs. 6F, 6M and 6L) and the contacts 808 and 809 of the relays CIER and CIEP, board LN (Fig. 6L). Similarly, a stick circuit for master posting relay MPR (Fig. 6G) should be intact and energized so long as posting on the second board of the common fix continues and this stick circuit may be traced from the terminal plus of the source Baf, front contact 714 of relay CIEP (Fig. 6L), back contact 744 of the associated alternating current relay CIER, wire 102 (Figs. 6L, 6M, 6F, and 6G) stick contact 101 of relay MPR (Fig. 6G) to the other terminal minus of the same source Baf. Similar circuits similarly identified are provided at the fix C for board LN.

Obviously, it should not be possible to cause simultaneous posting at a common fix by manipulation of a posting push button on both boards. For this reason the alternating current relays of a common fix-posting are interlocked so that only one of these relays can be energized at a time. This is accomplished by including the back contact 678 of relay CIER (Fig. 6F) of board AF in series with the winding of the relay CIER of board LN (Fig. 6L) through wires 750 and 751, and by including the back contact 878 of relay CIER board LN (Fig. 6L) in series with the winding of relay CIER board AF (Fig. 6F) through wires 950 and 951.

Attention is directed to the circuit including the lower winding of each EP relay, see the relay B2EP for instance (Fig. 6D). This circuit including the front contact 14 of the relay B2ER and back contact 15 of relay B2EPS is provided so that the relay B2EP will pick up at least long enough to allow the relay B2EPS to be picked up even though all of the posting units, the energizing circuits whereof pass through the upper winding of this relay B2EP, have already assumed the position to which they were to be operated. Similar auxiliary energizing circuits are provided the relays EOP, the lower minding of the relay B2EOP (Fig. 6D), for instance, including the front contact 93 of relay B2ER and the back contact 94 of the relay B2EOPS.

*Setting calculator—Board LN.*—The operator of board LN, as assumed, has already extended the flight route circuit to posting 2 fix N. Since he now has posted before him the arrival time of 11:10, which was placed there by the operator of board AF, he will now set his starting time dials SHC—SMC (not shown, wherein "S" indicates south) for the common fix C of his north-to-south calculator to 11:10 and will adjust his cruising dial SC (not shown but see dial EC Fig. 2) and suitable variable factor dials (not shown) to the proper positions. This will immediately cause the time dials SHN—SMN (not shown) to indicate the arrival time of 12:30. After the operator of board LN compares this arrival time of 12:30 with that of other arrival times in space conflict therewith at fix N and assures himself that it is perfectly safe for the airplane to proceed to posting 2 of fix N over the proposed flight route 122, he will proceed to project or transfer the airplane identification number 122 and the arrival time of 12:30 into the posting units for posting 2 fix N. This is accomplished in the manner as stated below.

*Reposting of identity.*—The operator of board LN will now simultaneously depress the token jack CIT board LN (Fig. 6M), without a token therein, and will depress the north-to-south transfer button NSTB (Fig. 6N). Depression of the transfer push button NSTB (Fig. 6N) will cause the master posting relay MPR for board LN (Fig. 6N) to be picked up and later stuck up in a manner as already explained in connection with relay MPR of board AF (Fig. 6G). The north-to-south calculator relay NSR (Fig. 6K) will of course be picked up and stuck up in exactly the same manner as the west-to-east calculator relay WER was heretofore picked up and stuck up. Depression of the token jack CIT board LN (Fig. 6M) without a token therein will cause the extension relay EXR for board LN (Fig. 6N) to be picked up through the following circuit: beginning at the terminal plus of a suitable source of current, push contact 361 of token jack CIT (Fig. 6M) without a token therein, back contact 362 of the token repeater relay CITP (Fig. 6M), wire 316 (Figs. 6M, 6L, 6K and 6N) winding of the extension relay EXR for board LN (Fig. 6N) to the other terminal (−) of the same source. The completion of this circuit will of course cause the extension relay EXR (Fig.

6N) to be picked up, resulting in the application of energy from the plus terminal of a special source B*xln* through front contacts 253 and 307 of relays EXR and MPR, respectively (Fig. 6N), to the wire 308, instead of energy from the battery B*ln* as would have been the case had the extension relay EXR not been picked up, from whence current from said special source B*xln* may flow to the wire 355 (Fig. 6L and 6M assuming the relay C!ER (Fig. 6L) to be in its energized condition. The front contacts 314 and 315 of this extension relay EXR (Fig. 6N) will of course also be closed. The contacts included in the posting units IC!H, IC!T and IC!U shown by large dots, may now serve instead of the contacts of a token jack to apply extension energy B*xln* to certain bus wires of the identity posting bus, which energy through the medium of the conversion relays, shown in the lower left-hand corner of Fig. 6N of the drawings, will cause the application of regular bus energy from battery B*ln* to be applied to the identity posting units IN2H, IN2T and IN2U for flight progress board FPLN (Fig. 6K) to cause these latter units to assume the same positions as do the corresponding units for posting fix C. This operation is more fully described below. Depressing of the token jack C!T board LN (Fig. 6M) will of course cause the associated alternating current relay C!ER to be picked up through the medium of the push contact 653 of this token jack (Fig. 6L) and this will cause the estimated arrival time of 12:30 to be displayed in the column estimate posting 1 flight progress board LN (Figs. 5 and 6J) all in a manner as already hereinbefore described for board FPAF.

Let us now observe how the application of special energy from a special battery or source B*xln* to the posting units IC!H, IC!T and IC!U (Fig. 6M) may cause three of the various conversion relays shown in the lower left-hand corner of Fig. 6N to be picked up, it being of course understood that only nine of the thirty conversion relays have been illustrated. Depression of the token jack C!T board LN (Fig. 6M), without a token therein thus leaving the associated token repeating relay C!TP deenergized, will cause current to flow from the terminal plus of the battery B*xln*, front contact 253 of the extension relay EXR board LN (Fig. 6N) front contact 307 of the master posting relay MPR (Fig. 6N) wire 308 (Figs. 6N, 6M and 6L) front contact 254 of the alternating current relay C!ER (Fig. 6L) wire 355, push contact 358 of the token jack C!T (Fig. 6M), back contact 359 of the associated token repeating relay C!TP, where the circuit branches out into three circuits including the three rectifiers 360, through contact 1 of posting unit IC!H and through contacts 2 of each of the posting units IC!T and IC!U, through bus wires 61, 72 and 82 respectively, causing the conversion relays H!, T2 and U2 in the lower left-hand corner of Fig. 6N to be picked up, from whence the circuits unite and pass through front contact 315 of the extension relay EXR board LN (Fig. 6N) to the other terminal minus of the special batteries B*xln*. The conversion relays H!, T2 and U2 (lower left-hand corner of Fig. 6N) now being in their attracted and picked up condition apply energy from the regular battery of the board LN, namely, battery B*ln* to all of the 27 wires which were not energized (three only having been energized) by the special battery (of which only nine have been shown). That is, this will cause energization of bus wires 60, 62, 70, 71, 80 and 81, and also all of the identification bus wires not shown, and this energy may then flow to the posting units for identity posting 1, fix N (Figs. 5 and 6K). These circuits may be traced from the positive terminal of the battery B*ln* through front contact 314 of the extension relay EXR board LN (Fig. 6N) through front contacts of the energized conversion relays H!, T2, U2 (lower left-hand corner Fig. 6N) to the identity bus wires 60, 62, 70, 71, 80 and 81 (Figs. 6N and 6K) and thence through the posting units IN2H, IN2T and IN2U (Figs. 5 and 6K) through three rectifiers 356 from whence the circuits join into a single circuit passing through the upper winding of the series relay N2EP through front contact 52 of the alternating current relay N2ER (Fig. 6J) through wire 296 (Figs. 6J, 6K and 6N) through front contact 297 of the master posting relay MPR (Fig. 6N) to the other terminal minus of the battery B*ln*. It is thus seen that the airplane identifying number 122 indicated by the posting units for posting 1 of fix C are characterized by allowing current from a special source to flow only through one of the wires leading from each of these posting units, that this current flowing only over one wire for each posting unit results in the picking up of one conversion relay for each posting unit and that this conversion relay in turn energizes all of the remaining bus wires by direct current from another and distinctive source, which latter current from such distinctive source may then energize all but one of the wires of each posting unit for identity at posting 2 fix N, to cause such posting unit to assume the same indicating position as was the case for the corresponding posting unit for postings 1 fix C, from which identity was extended or copied to posting 2 fix N. Attention is directed to these conversion relays in the lower left-hand corner of Figs. 6G and 6N, by study of which it is readily seen that each conversion relay is energized from one bus wire and is provided with front contacts to energize all of the other bus wires for that digit. In other words, the name "conversion relay" is significant in that each relay by being energized by one wire of the 10 wires of a digit in turn energizes the other nine wires for such digit from a different source of which wires only three wires for each digit have for convenience been illustrated.

In the form of a short résumé, it should be remembered that a route circuit over a portion of two control boards, is still established, this route circuit starting at posting 2, fix B and extending through posting 1 of the common fix C on both boards and then continuing to posting 2 fix N of the second board LN. By referring to Figs. 4 and 5 it will be remembered that the flight route identification number 122 appears in the identity column for posting 2 fix B, posting 1 fix C both boards and posting 2 fix N and that the starting time of 10:00 appears in the estimate column posting 2 fix B and that the arrival times of 11:10 and 12:30 appear in the estimate column posting 1 fix C both boards and at posting 2 fix N, respectively. Since the flight route under consideration passes over a portion of two boards, it is deemed probable that the pilot of the airplane will be instructed by the dispatcher rather than by either of the two operators of board AF or LN. Let us assume that the dispatcher instructs the pilot to fly over the flight route 122 by transmitting the following short-form instruction: Flight 122, speed 180, cruising 2000 to cross B 3000 at 10:00, C at 11:10 to N at 12:30, which means he is to fly at 2000 feet throughout the entire flight except where other altitudes are specified.

*Over-report posting at fix C.*—Let us now assume that the pilot of airplane 122 passes over fix C at the 2000 foot altitude at a time two minutes later than the estimated arrival time, namely, at 11:12 and that he reports his airplane 122 flying over fix C at altitude 2000 at 11:12. Either the over-report operator who operates the over-report board or pedestal OPAF or the one who operates the over-report pedestal OPLN, or only one over-report operator may operate both boards, will depress the push buttons H1, T2 and U2 of his board in the columns headed "identification," will depress the push button PBC denoting fix C, the push button PB2 denoting the 2000 foot altitude and will depress the push buttons T1 and U2 in the columns headed "over-time" (Figs. 3 and 6G). These push buttons will all remain in their depressed position, wherein they will be held by suitable latches releasable by one or more latch magnets of which the latch magnet LM for push button PBC (Fig. 6G) only has been illustrated. The over-report operator will now depress his over-report transfer button OTB (Fig. 6G) resulting in the closure of an obvious pick-up circuit for the relay MOR. The relay MOR is of course stuck up through a stick circuit including back contact 168 of relay MOP and the stick contact 169. With the relay MOR picked up, and on the assumption that the master posting relay MPR is now deenergized, it will be stuck up through a stick circuit including the stick contact 169. A pick-up circuit for the master over-report posting relay MOP is then closed through back contact 35 of the relay MPR and front contact 163 of the relay MOR.

The picking up of the relay MOP will of course cause dropping of the relay MOR because the stick circuit for this latter relay is broken at back contact 168 of relay MOP. With the relay MOP once picked up it is stuck up through its stick circuit including its stick contact 164, the back contact 165 of the cancelling repeater relay CANP and the normally closed cancel push button contact OCB (Fig. 6G). With the master over-report relay MOP picked up its open back contact 34 prevents the master posting relay MPR from being picked up and the open back contact 50 prevents alternating current being applied to any of the alternating current relays ER associated with the board AF. That is, no alternating current relay is required to be picked up to post an over-report, and the back contact 50 of relay MOP is provided to guard against the picking up of an alternating current relay ER. With the master over-report posting relay MOP now energized and with the push buttons PBC and PB2 depressed, and latched down, the following check circuit for checking correspondence between one set of the posting units for altitude 2000, fix C (the other posting units not having been illustrated in the drawings) and the set of over-report identification contacts shown in Fig. 6G is closed. This check circuit may be traced as follows: beginning at the (+) terminal of the check battery BO1af, front contact 221 of the master over-report relay MOP, push contact 136 of the push button PBC (Fig. 6G), push contact 186 of the push button PB2, wire 124 (Figs. 6G and 6E) front contact 193 of the push button repeating relay C1LW (Fig. 6E), from whence the circuit divides into three parts each including a sneak circuit preventing rectifier 160, through the contact mechanisms of the posting units for identity IC1H, IC1T, IC1U (Fig. 6E) through bus wires 61, 72 and 82 to the push buttons H1, T2 and U2 in the identification column of the over-report pedestal OPAF, and since each one of these push buttons H1, T2 and U2 have been depressed by the over-report operator and are latched in their depressed position, the three circuits continue through the check relays HR1, TR1 and UR1, from whence the three circuits combine into a single circuit and continue through front contact 223 of the relay MOP to the other terminal (—) of the same battery BO1af. Had the posting units for posting 1, fix C, board AF not assumed a position to indicate the airplane number 122 (as did the push buttons in the identification column Fig. 6G) or had the push button repeating relay C1LW (see its contact 193 Fig. 6E) not been in its picked-up condition, signifying that a route circuit through posting 1 of fix C, board AF, has actually been set up, the three check relays HR1, TR1 and UR1 would not have assumed their energized position, and no over-report posting could have taken place. With these check relays HR1, TR1 and UR1 now assuming their energized position current may flow to the tens over-report unit OC1MT (Fig. 6F) from the (+) terminal of the battery Baf through front contact 172 of the relay MOP (Fig. 6G) through the two push contacts of push button T1 in the over-time column (Fig. 6G), over-report bus wires 30 and 32 in multiple (Figs. 6G, 6E, 6F) to the contacts 0 and 2 of the over-report posting unit OC1MT leaving wire 1 deenergized (Fig. 6F) as a result of which this posting unit will be operated to the "one" position if its outlet wire is connected to the negative terminal of the battery Baf, from whence the circuit continues through sneak circuit preventing rectifier 177, upper winding of the relay C1EOP, through wire 122 (Figs. 6F, 6E and 6G), through push contacts 188 and 138 of the push buttons PB2 and PBC respectively, through front contacts 176, 175 and 174 of the check relays HR1, TR1 and UR1 respectively, through front contact 173 of the over-report relay MOP, to the other terminal (—) of the battery Baf. The closure of this circuit will for reasons hereinafter pointed out cause the over-report posting unit OC1MT (Fig. 6F) to be operated to the "one" position. A similar circuit for operating the posting unit OC1MU (Fig. 6F) to the "two" position may be traced from the (+) terminal of the Baf through front contact 172 of the relay MOP from whence the circuit branches out into nine circuits (of which only two have been illustrated) through two push contacts U2 in the over-time column (Fig. 6G) through multiple paths including over-report bus wires 40 and 41 (Figs. 6G, 6E and 6F) to contacts 0 and 1 of the over-report posting unit OC1MU (Fig. 6F) through sneak circuit preventing rectifier 177, from whence the two circuits unite into one circuit continuing through upper winding of the relay C1EOP, wire 122 (Figs. 6F, 6E and 6G), through push contacts 188 and 138 of the push buttons PB2 and PBC respectively, through contacts 176, 175 and 174 of the check relays HR1, TR1 and UR1 respectively, through front contact 173 of the relay MOP, to the other terminal (—) of the battery Baf. The units posting unit, for posting over-report time, OC1MU is of course operated to the "two" position, the "two" wire being deenergized, in response to the closure of these circuits. The picking up of the series relay C1EOP (Fig. 6F) will through the medium of its front contact 95 pick up the lighting repeating relay C1EOPS through a pick-up circuit including the front contact 84 of the push button repeating relay C1LW (Fig. 6B), wire 85, front contact 95 of the relay C1EOP, the winding of the relay C1EOPS to the other terminal (—). This relay C1EOPS when once picked up is stuck up through its stick circuit including its stick contact 92.

As soon as the two over-report posting units OC1MT and OC1MU (Fig. 6F) have been operated to their new, namely, the "12" minute position, the circuits through these posting units will be broken in that these two units have been operated to the "one" wire and the "two" wire positions respectively, these wires being the only deenergized wires leading into these over-report posting units, as a result of which the series relay C1EOP is dropped to cause closure of the lighting circuits for the lamps C1OL of these over-report posting units OC1MT and OC1MU including the front contact 98 of the relay C1EOPS and the back contact 99 of the relay C1EOP.

Figure 6E:
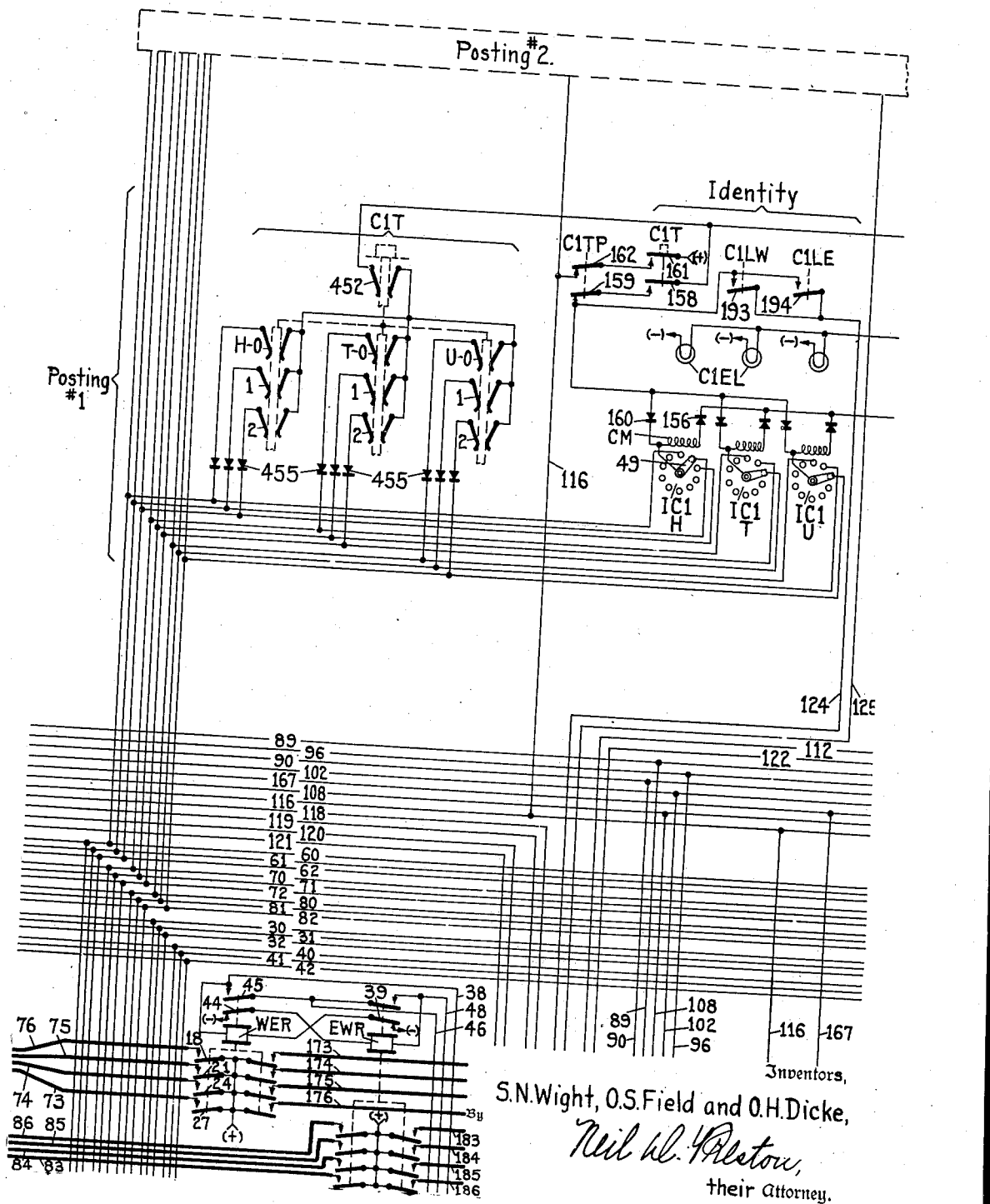
Figure 6K:
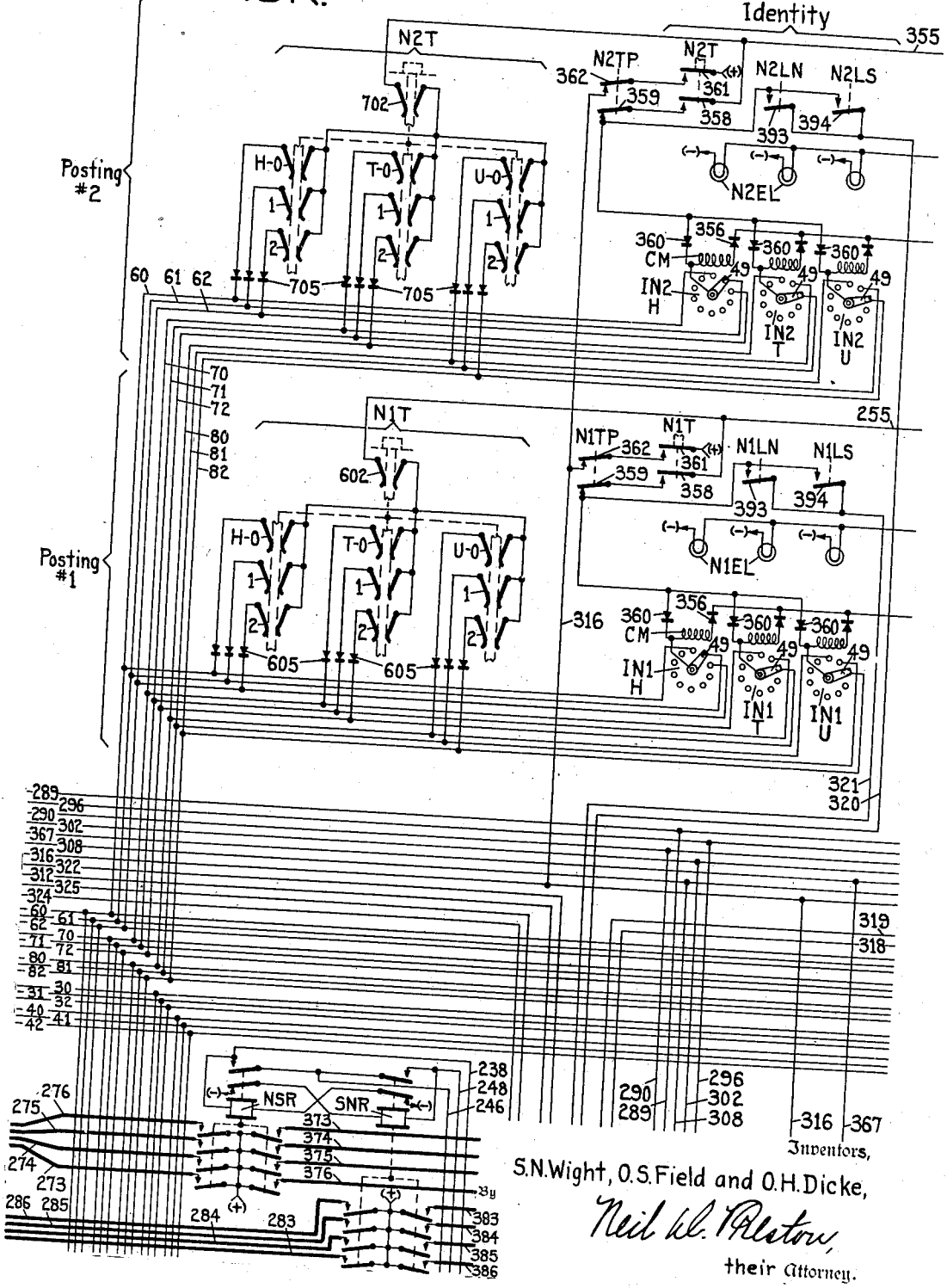

When the series relay C1EOP (Fig. 6F) picked up, due to the flow of current through the over-report posting units OC1MT and OC1MU, it picked up the cancel relay CANR (Fig. 6G) through the medium of its front contact 16, back contact 17 of relay C1ER and wire 167 (Figs. 6F, 6E and 6G). The picking up of the cancel relay CANR caused the cancel repeating relay CANP to pick up, but during this operation the front contact 166 of relay CANR closes before the back contact 165 of relay CANP opens so that the stick circuits for relay MOP including these contacts were not open in overlapped relation. Furthermore, the circuit for the latch magnet LM (Fig. 6G) was not momentarily made because the back contact 170 of relay CANR was opened before the front contact 171 of relay CANP was closed. When these posting units OC1MT and OC1MU (Fig. 6F) however have completed their operation and allowed the associated series relay C1EOP to drop, the stick circuit just mentioned for relay MOP is momentarily broken and the circuits for the latch magnets LM are momentarily energized. The over-report relay MOP and the various push buttons on the over-report board OPAF are therefore returned to their normal condition.

Not only are the over-report posting units OC1MT and OC1MU of the board AF (Fig. 6F) operated to post the over-report time of "12" minutes but this over-report posting time "12" is also posted in the posting units OC1MT and OC1MU of the board LN (Fig. 6L). Since both of these sets of the over-report posting units, one for each board, are connected to the same over-report bus including wires 30, 31, 32, 40, 41 and 42 it is only necessary to consider the return circuit from the upper winding of the series relay C1EOP board LN (Fig. 6L) to the negative terminal of the battery B*af*. This return circuit starting at the right terminal of the upper winding of the relay C1EOP, board LN, continues through wires 953 (Figs. 6L, 6M and 6F), back contact 677 of the relay C1ER (Fig. 6F), through wire 122 (Figs. 6F, 6E and 6G) through back contacts 188 and 138 of push buttons PB2 and PBC respectively, through contacts 176, 175 and 174 of the relays HR1, TR1 and UR1 respectively, through front contact 173 of the over-report posting relay MOP to the other terminal (—) of the battery B*af*. By reason of the fact that cancellation of the over-report operation should not take place until both of the two series relays C1EP (Figs. 6F and 6L) have assumed their deenergized position another circuit for holding the cancelling relay CANR energized, so long as the relay C1EP of the second board LN (Fig. 6L) assumes its energized condition, is provided. This circuit may be traced from the terminal (+) through the front contact 552 of the relay C1EOP (Fig. 6L), back contact 533 of the relay C1ER (Fig. 6L), wire 167 (Figs. 6L, 6M, 6F and 6G) through the winding of the cancelling relay CANR to the other terminal (—) of the battery B*af*. It is thus seen that both sets of over-report posting units OC1MT and OC1MU (Figs. 6F and 6L) are substantially simultaneously operated to new positions to indicate actual arrival time of 12 minutes after the hour, the particular hour being determinable from the estimated arrival time posted in the column "estimate" for the same posting 1, fix C on both boards. All of the master over-report apparatus has now been returned to its normal condition except that the lighting stick relays C1EOPS both boards (Figs. 6F and 6L) remain energized through their stick circuits including their stick contact 92 and 292, respectively, and including front contacts of the associated push button repeater relays (Figs. 6B and 6I). In this connection it should be noted that the front contacts 83 of relays C1LE and C1LS and contacts 84 of relays C1LW and C1LN are all connected in multiple through the medium of wires 85 and 600. The lamps C1OL in both sets of over-report posting units thus remain energized until all of the push button repeating relays C1LW and C1LE board AF and relays C1LN and C1LS board LN (Figs. 6B and 6I) have assumed their deenergized position, relay C1LW (Fig. 6B) and relay C1LS (Fig. 6I) still being energized.

*Cancelling flight route fix B to fix C.*—The operator of the control board AF will of course keep his eyes on the associated flight progress board FPAF and will observe that the actual arrival time (over-report time) at which the airplane 122 flew over posting 1 of fix C has been posted on the flight progress board and that there is no longer need for the flight route circuit insofar as the portion of the route circuits signifying the flight route from posting 2, fix B to posting 1, fix C is concerned and that he may now cancel this portion of the flight route by advancing his token from token jack B2T to token jack C1T, board AF (Figs. 6A and 6B) and then depressing it. It may be pointed out here that the relay MOR (Fig. 6G) is employed to hold over the fact that the over-report transfer push button OTB has been momentarily depressed. This feature constitutes a so-called preconditioning feature in that with the relay MOR once energized and held energized by its stick circuit the over-report mechanism is initiated automatically as soon as the master posting relay MPR, which presumably was energized and performing a posting operation at the time the push button OTB was depressed, is returned to its deenergized position.

Referring now to Figs. 6A and 6B, let us observe how the advancing of the token 122T may cancel that portion of the route to the rear of this token when depressed in its new position. Let us assume that the operator of board AF removes the token 122T from the token jack B2T (Fig. 6A). This removal of the token 122T will produce no change in the apparatus in that the token repeating relay B2TP is stuck up through its regular stick circuit including its stick contact 543. Let us now assume that the operator inserts the token 122T in the token jack C1T, board AF (Fig. 6B). This insertion of the token 122T in the token jack C1T will cause the token repeating relay C1TP (Fig. 6B) to be picked up and stuck up through its stick circuit including the stick contact 493 so that subsequent removal of the token 122T from this token jack C1T will not cause deenergization of the associated token repeating relay C1TP. Let us now assume that the operator depresses his token 122T when inserted in token jack C1T (Fig. 6B) to thereby cause opening of the push contact 451 of token jack C1T (Fig. 6B). Since this contact 451, which was formerly shunted by the back contact 13 of the lighting relay C1EOPS, is no longer shunted because this lighting relay C1EOPS is now energized, this opening of push contact 451 causes (+) energy to be removed from the wire 474 connected through link 199 to cancel bus 574, and energy is therefore removed from the stick contact 543 of the token repeating relay B2TP (Fig. 6A), thereby causing this token repeating relay B2TP to be deenergized and again assume its normal retracted position. The picking up of the relay C1TP in response to the insertion of the token 122T in token jack C1T (Fig. 6B) caused the in bus INBUS and the out bus OUTBUS for posting 1, fix C, to be isolated from each other by the opening of back contact 415 of the token repeating relay C1TP. From that time on the out bus received energy from the (+) terminal of the network battery through inductance 999 and front contact 406 of the token repeating relay C1TP (Fig. 6B) whereas the in bus continued to receive its energy through the front contact 504 of the token repeating relay B2TP (Fig. 6A) so long as this latter relay remained energized.

Since this latter token repeating relay B2TP (Fig. 6A) is no longer energized and no longer supplies (+) energy from the network battery to the route circuit all of the stick relays to the rear of the token jack C1T (Fig. 6B) will now be deprived of energy and assume their deenergized position, so that the following stick relays are all dropped to their deenergized position: B1LE, a2, b2, c2 (Fig. 6A), C1LW and C1DE (Fig. 6B), whereas the stick relays C1LS, a1, b1 (Fig. 6I), and stick relays N2LN and N2DS (Fig. 6H) will remain energized through stick circuits receiving their energy through the medium of front contact 406 of the token repeating relay C1TP (Fig. 6B). In other words, the insertion of a token in an intermediate token jack of a flight route will cause the route circuit to be broken up into two parts the first part of which is maintained energized through a front contact of the token repeating relay associated with the token jack from which such token was just removed and of which the second portion of the route circuit is energized through a front contact of the newly picked up token repeating relay.

Let us now assume that the operator of the control board AF, after having first depressed the token while in token jack C1T (Fig. 6B) on the board AF, to cancel the route portion in the rear as above described, hands this token 122T to the operator of the board LN who will insert it in the token jack C1T, board LN (Fig. 6I). The insertion of the token 122T in the token jack C1T, board LN (Fig. 6I) causes the associated token repeating relay C1TP to be picked up but this relay C1TP is not immediately stuck up because its stick circuit including its stick contact 693 and wires 395 and 396 is open at the back contact 442 of the token repeating relay C1TP, board AF (Fig. 6B). The picking up of the relay C1TP, board LN (Fig. 6I) will, however, at its front contact 606 apply energy to the out bus OUTBUS for the common fix C, posting 1, and will by the opening of its back contact 642 included in series with wires 195 and 196 interrupt the stick circuit including stick contact 493 for the token repeating relay C1TP, board AF (Fig. 6B). This picking up of one of the token repeating relays C1TP for board LN and the dropping of the corresponding relay C1TP for the board AF produces no change in any other relay in that the stick relays which were held up by energy derived through front contact 406 of the relay C1TP, board AF (Fig. 6B) are now held energized by energy derived through the front contact 606 of the token relay C1TP, board LN (Fig. 6I).

*Over-report posting at fix N.*—Let us now assume that the pilot of the airplane 122 passes over fix N at 12:22, that is, he arrives eight minutes earlier than the estimated arrival time for his airplane at fix N. Let us assume that he reports flying over fix N, altitude 2000 at 12:22 and that in accordance with the usual procedure the over-report operator who operates over-report pedestal OPLN, depresses his push buttons PB2 (signifying altitude of 2000 feet), PBN (signifying fix N), push buttons H1, T2 and U2 in the columns headed "identification" (signifying airplane 122) and push buttons T2 and U2 in the columns headed "over-time" (signifying the actual arrival time over fix N of 12:22). Since there are two postings in the 2000 foot altitude at fix N and since both of these postings have been illustrated in the drawings the necessary circuits are present to ferret out, so to speak, whether the actual arrival time over fix N shall be displayed in the over-report posting units ON1MT—ON1MU or ON2MT—ON2MU. This ferreting out, so to speak, whether the route 122 passes through posting 1 or posting 2 of fix N is accomplished by providing one set of check relays HR1, TR1 and UR1 (Fig. 6N) for posting 1 of any particular fix under consideration and a separate set of check relays HR2, TR2, UR2 for the second posting of any fix under consideration. These check circuits including the above-mentioned check relays for checking whether the identification posting units IN1H, IN1T, IN1U or the posting units IN2H, IN2T, IN2U display an active indication 122 is determined by applying energy from two different sources through the "identification" push buttons shown in Fig. 6N and then through the contacts of the posting units IN1H, IN1T, IN1U (Fig. 6K) as from the (+) terminal of a battery BO1*ln* and through contacts of the posting units IN2H, IN2T and IN2U (Fig. 6K) as from the positive terminal of a battery BO2*ln*.

The check circuits for posting 2 of fix N may now be traced from the (+) terminal of the battery BO2*ln* (Fig. 6N), through front contact 420 of the relay MOP (Fig. 6N), through push contact 330 of the push button PBN, push button contact 339 of the push button PB2 (Fig. 6N), wire 320 (Figs. 6N and 6K), front contact 393 of the push button repeating relay N2LN (Fig. 6K), three rectifiers 360 leading to the contact mechanisms of the posting units IN2H, IN2T and IN2U and thence through three separate circuits including three rotary arms 49 of these posting units, bus wires 61, 72 and 82 (Figs. 6K and 6N), through contacts of push buttons H1, T2 and U2 in the "identification" column of the master over-report board OPLN (Fig. 6N) through windings of the check relays HR2, TR2, UR2, from whence the circuits join and pass through the front contact 422 of the master over-report relay MOP to the other terminal (—) of the battery BO2ln (Fig. 6N). The only reason that all three of the check relays HR2, TR2 and UR2 receive energy is because the contacts of the identification posting units IN2H, IN2T, IN2U are positioned to signify the number 122 as does also the pattern of depressed push buttons in the column "identification" on the over-report board. Let us now observe whether any of the check relays HR1, TR1, UR1 (Fig. 6N) will be picked up irrespective of the number displayed by the posting units IN1H, IN1T, IN1U (Fig. 6K) on the assumption that no route is set up through these posting units. It will be remembered that the circuit under consideration involves either the contact 393 of the north push button repeating relay N1LN or the front contact 394 of the south push button repeating relay N1LS, and since both of these relays will be deenergized if no route circuit is set up through posting 1, it is obvious that none of the check relays HR1, TR1 or UR1 (Fig. 6N) will be picked up.

Let us now assume that a flight route number 222 is set up through posting 1 of fix N at the time under consideration, namely, when the over-report posting for airplane 122 at 2000 feet over fix N takes place, and that both of the push button repeating relays N1LN and N1LS are energized and that the posting units IN1H, IN1T, IN1U assume posting positions to reflect the airplane flight route 222. The check circuit in this instance may be traced from the (+) terminal of the battery BO1ln, front contact 421 of the relay MOP (Fig. 6N), push contact 331 of the push button PBN, push contact 340 of the push button PB2 (Fig. 6N), wire 321, front contacts 393 and 394 in multiple of the push button repeating relays N1LN and N1LS respectively, three rectifiers 360 included in series in the downwardly directed lead-in wires for posting units IN1H, IN1T and IN1U (Fig. 6K), through the contact buttons 2 in each one of these three posting units (these units displaying the number 222) through the three rotary contact arms 49 over the three-bus wires 62, 72 and 82 (Figs. 6K and 6N) through push contacts T2 and U2 in the column headed "identification" (Fig. 6N) through the check relays TR1 and UR1 from whence the two circuits of the bus wires 72 and 82 join and pass through the front contact 423 of the master over-report relay MOP (Fig. 6N) to the terminal (—) of the battery BO1ln. The circuit through the bus wire 62 is not complete because the push button H2 in the "identification" column is not depressed, push button H1 having been depressed, from which it is readily understood that the check relays TR1 and UR1 are energized and picked up but the check relay HR1 remains in its deenergized position as a result of which the check circuit through front contacts 376, 375 and 374 of the check relays HR1, TR1 and UR1 (Fig. 6N) is not completed. Since this latter check circuit is not completed the over-report time of 22 minutes will not be displayed in the over-report posting units ON1MT and ON1MU but since the check circuit through the front contact 382, 381 and 380 of the check relays HR2, TR2 and UR2 is closed, this over-report time of 22 minutes will be displayed in the over-report posting units ON2MT and ON2MU.

The circuits for posting this over-report time of 22 minutes in these latter posting units ON2MT and ON2MU will now be traced: beginning at the terminal (+) of the battery Bln through front contact 372 of the master posting relay MOP through contacts of push buttons T2 and U2 in the column "over-time" from whence the circuit branches into four circuits through the bus wires 30, 31, 40 and 41 of the over-report bus (Figs. 6N, 6K and 6J), bus wires 32 and 42 being left deenergized, to the over-report posting units ON2MT and ON2MU (Fig. 6J) and since all of the upwardly directed inlet wires except wires 2 of these two posting units are energized these posting units ON2MT and ON2MU will be operated until they each assume the number 2 position signifying arrival time of 22 minutes, from whence these circuits join and pass through the upper windings of the series relay N2EOP, through wire 319 (Figs. 6J, 6K and 6N) through push contacts 341 and 332 of push buttons PB2 and PBN, respectively, through front contacts 382, 381 and 380 of the check relays HR2, TR2 and UR2 respectively, through front contact 373 of the master over-report posting relay MOP to the other terminal (—) of the battery Bln. The series relay N2EOP will, of course, momentarily pick up while the posting units ON2MT and ON2MU are operated and by the closing of its front contact 295 will close a pick-up circuit for the lighting relay N2EOPS. This pick-up circuit may be traced from the (+) terminal of a battery through the front contact 184 of the push button repeating relay N2LN (Fig. 6H), through wire 185 (Figs. 6H and 6J), through front contact 295 of the relay N2EOP, through the winding of the relay N2EOPS, to the other terminal (—). This lighting relay N2EOPS after being picked up will, of course, then be stuck up and remain stuck up so long as one of the push button repeating relays N2LN or N2LS remains energized. This stick circuit includes the stick contact 292 of the relay N2EOPS.

*Cancelling flight route fix C to fix N.*—The operator of the control board LN will, of course, keep his eyes glued on the flight progress board FPLN and will observe that the arrival time of 22 minutes has been posted in the column "over-time" for posting 2 assigned to the altitude 2000 of fix N, board LN (Figs. 5 and 6J). The operator of board LN is, of course, aware of the fact that the portion of the route extending from posting 1, fix C of board LN to posting 2, fix N is no longer necessary and he will then remove his token 122T from the token jack C1T, board LN (Fig. 6M), and will insert it in token jack N2T (Fig. 6H). The insertion of the token 122T in the token jack N2T (Fig. 6H) will cause the token repeating relay N2TP to be picked up, so as to stick up through its regular stick circuit including its stick contact 743, to thereby through its front contact 104 supply energy to the out bus OUTBUS so as to hold all of the stick relays of the control board associated with that part of the route 122 in advance of the token N (if any) energized. The operator may now cancel the route circuit to the rear of the token 122T now located in token jack N2T by merely depressing the token 122T and its contained token jack N2T to cause opening of the push contact 701. This push contact 701 of token jack N2T is no longer shunted because the back contact 213 of the lighting relay N2EOPS is now open. The opening of push contact 701 of token jack N2T opens the stick circuit for the token repeating relay C1TP (Fig. 6I) in that it is included in series in the stick circuit for this relay CITP through the medium of wire 674 (Figs. 6H and 6I) link or jumper 399 (shown dotted) and cancel bus 774. This will cause token repeating relay CITP (Fig. 6I) to drop and by the opening of its front contact 606 remove all of the energy from the route circuit to the rear of posting 2, fix N, thereby causing the relays CILS, a1, b1 (Fig. 6I), N2LN, and N2DS (Fig. 6H) to be deenergized, as a result of which the entire route circuit for flight route 122 has been cancelled but the out bus OUTBUS for posting 2, fix N is still energized through the medium of front contact 704 of the token repeating relay N2TP. This token repeating relay N2TP may now be deenergized by the operator of the board LN removing the token 122T and then depressing the cancel button CPB (see upper right-hand corner of Fig. 6H of the drawings). The dropping of the token repeating relay N2TP will by the opening of its front contact 704 cause deenergization of out bus OUTBUS for that posting-fix. The dropping of push button repeating relay N2LN by the opening of its front contact 184, included in the stick circuits for both of the lighting relays N2EPS and N2EOPS, of course, caused deenergization of both of these relays and the extinguishment of the posting units associated with these relays. In a manner as hereinbefore pointed out the master over-report relay MOP (Fig. 6N) was dropped as a result of the dropping of the cancelling relay CANR which cancelling relay was maintained energized only so long as the series relay N2EOP remained energized. The apparatus has thus all been returned to its normal condition.

*Route network modifications—Figs. 9 to 12.*—In Fig. 9 has been illustrated the circuit construction of a common fix to a plurality of boards such as shown in Figs. 6B and 6I of the drawings, but as specifically illustrated this common fix is an end fix on each of four different control boards. A top view of such boards has been illustrated in Fig. 10 of the drawings where A is the common fix and where the boards have been designated No. 1, No. 2, No. 3 and No. 4 and have been arranged with end "A" panels adjacent each other. It will be observed that these boards No. 1, No. 2, No. 3 and No. 4 have the direction letters N, E, W and S respectively associated therewith, and that these letters are used in the reference characters for the associated push buttons and relays except for the token jacks and token relays where distinguishing numerals are employed.

From the foregoing drawings and description it is, of course, obvious that if a common fix on four different boards, whether an end fix or an intermediate fix, a separate token jack and token repeating relay will be necessary for each board. This is particularly true because a separate cancelling bus is provided for each board. For this reason the four token jacks 1AIT, 2AIT, 3AIT and 4AIT have been illustrated in Fig. 9 in each reference character of which the first number designates the board number, the first letter designates the fix, the second number designates the posting, and the last letter signifies token. It will be observed that each token jack is provided with a token repeating relay designated by the same reference character as the token jack except for the addition of the letter "P." A repeating repeating relay designated AITP for the four token repeating relays just mentioned is also provided, this token repeating repeating relay AITP is provided with four energizing circuits each including one of the four contacts 955, 956, 957 or 958 of the relays AITP, 2AITP, 3AITP or 4AITP, respectively. It will be observed that each one of the token repeating relays is provided with a stick circuit including its own stick contact 960 and the back contacts 961, 962 and 963 of the other three token repeating relays from whence the stick circuit is connected to the cancel bus for that board, which cancel bus for board AF (Figs. 6A and 6B) has been identified by the reference character 574. In Fig. 9 these cancel buses have been designated 1C, 2C, 3C and 4C for the respective like numbered control boards. It will be observed that in the same manner as shown for posting 1, fix C (Figs. 6B and 6I), the in-bus INBUS of the Fig. 9 construction is connected to the out-bus OUTBUS through the medium of back contact 964 of the token repeating repeating relay AITP and that upon the energization of this relay AITP current from the (+) terminal of the network source may flow through the inductance 965 and front contact 964 to the out-bus OUTBUS. Similarly, the push buttons AINX, AIEX, AIWX and AISX as well as the push button repeating relays AILN, AILE, AILW, AILS and the direction relays AIDS, AIDW, AIDE and AIDN are connected in exactly the same manner as illustrated for posting 1, fix C of the drawings Fig. 6B and 6I. The principal difference between the modification shown in Fig. 9 and that shown for posting 1, fix C (Figs. 6B and 6I) resides in the locking contacts for feeding energy through push contacts of the various push buttons. Referring for a moment to the direction relays it will be observed that in the event the token repeating repeating relay AITP for the four token repeating relays is deenergized, the circuits for the direction relays AIDS, AIDW, AIDE and AIDN are such that only one direction relay can be picked up at a time. If, on the other hand, this token repeating repeating relay AITP is energized, as it would be if a route circuit were initiated at the fix A on any one of the four boards No. 1, No. 2, No. 3 and No. 4 none of the direction relays can be picked up, in that the pick-up circuits for the direction relays have included therein back contacts 966, 967, 968 or 969 of the token repeating repeating relay AITP. In other words, the token repeating repeating relay AITP determines whether one or none of the direction relays shall be picked up. This feature is the same as in the form shown in Figs. 6B and 6I. In the same manner as just mentioned in regard to the direction relays of Fig. 9 this token repeating repeating relay AITP determines through the medium of its back contacts 970, 971 and 972, and similar numbered contacts for other push button repeating relays, whether only one or only two push button repeating relays may be picked up at one time, and more specifically determines by being energized that only one push button repeating relay may be picked up and by being deenergized that two push button repeating relays may be picked up. In other words, if a route circuit originates at fix A on any one of the four boards (relay AITP energized) only one of the push button repeating relays may be picked up and if a route circuit is initiated on one board extends through the common fix and then continues on a second board (no token in any one of the four token jacks) two such push button repeating relays may be picked up. In other words, for the fix A of board 1 the picking up of the token repeating repeating relay AITP opens the multiple circuits through back contacts 973, 976 and 977 of the push button repeating relays AILE, AILS and AILW respectively, so that only the three back contacts 974, 975 and 978 of the push button repeating relays A1LW, A1LE and A1LS respectively in series remain in the circuit for feeding energy to the push button A1NX. It is thus seen that with the token repeating repeating relay A1TP deenergized it requires two of the push button repeating relays A1LE, A1LW and A1LS to be up before the push button A1NX is rendered electrically ineffective and that with this token repeating repeating relay in its energized position any one of these three push button repeating relays by being up can render the push button A1NX electrically ineffective. The back contact 979 of the push button repeating relay A1LN, of course, renders the push button A1NX ineffective after it has once performed its function in exactly the same manner as has hereinbefore been described.

The back contacts 1023, 1033, 1043 in the circuit controlled by the push button A1NX (Fig. 9) impose other limitations upon the functions performed by this push button. These limitations are such as to render this push button A1NX electrically ineffective if a token reposes in any one of the token jacks of the other three boards. This is as it should be in that if a flight route is initiated at a common fix on a particular board, it should not be permitted to be extended on any other board. Corresponding contacts in the circuits feeding energy to the other push buttons A1EX, A1WX and A1SX have been assigned like reference characters except that these reference characters have been decreased by 3, 2 and 1 respectively.

It is not believed necessary to describe the operation of the modified system shown in Fig. 9 of the drawings because the operation is obvious when the portion of the system shown in Fig. 9 is considered in the light of the network disclosed in Figs. 6A, 6B, 6H and 6I. The push button repeating relays and direction relays, of course, perform the same functions as do like relays in the form of the invention shown in Fig. 6.

Although Fig. 9 illustrates a modified system as applied to a common fix which constitutes an end fix on each of four different boards, it should be understood that if the common fix is an intermediate fix on two boards only that exactly the same circuit construction as illustrated is employed except that two of the token jacks and their associated token repeating relays will be omitted, it being understood that in this case only two token jacks and only two cancel buses are present and therefore only two token repeating relays would be employed to control the token repeating repeating relay A1TP illustrated. In this case the push buttons A1NX and A1SX and associated apparatus may be considered as belonging to a route on one board and the push buttons A1WX and A1EX and associated apparatus as belonging to a route crossing the first mentioned route and located on the other board. It is readily seen that the control circuits for the direction relays of Fig. 9 are identical to the control circuits for the direction relays of Figs. 6B and 6I so that it is unnecessary to discuss these circuits further.

Referring now to Figs. 11 and 12 of the drawings the construction shown in Figs. 9 and 10 has been extended in Figs. 11 and 12 to a proposed system where six control boards have a common fix which is an end fix. This fix has been designated A the same as in Figs. 9 and 10 and four of the six boards, namely, boards No. 1, No. 2, No. 3 and No. 4 are arranged (see Fig. 12) the same as they are in Fig. 10 and the additional boards No. 5 and No. 6 have been added and these latter boards extend in a left direction "L" and in a right direction "R" respectively along a diagonal line. These letters L and R of boards Nos. 5 and 6 are used in the reference characters for the push button relays A1LR and A1LL (Fig. 11) in the same way as the letters E, W, N and S have been used in Fig. 9 in the drawings. Similarly, the numbers "5" and "6" are used in the reference characters for the token repeating relays 5A1TP and 6A1TP (Fig. 11) in the same way as similar reference characters 1A1TP, 2A1TP, 3A1TP and 4A1TP are employed in Fig. 9 of the drawings. It should be observed that the lock circuit shown in Fig. 11 which at times prevents the flow of current to the push button A1NX is an obvious extension of the lock circuit for the push button A1NX shown in Fig. 9 of the drawings, that is, groups of pairs of back contacts of push button repeating relays are connected in series, there being a pair for every group of two relays exclusive of the push button relay A1LN which is directly associated with and directly controlled by the push button A1NX. Each of these pairs of contacts has one of such contacts included in series with a back contact of the token repeating repeating relay A1TP so that if this relay A1TP is energized any one of the relays A1LE, A1LW, A1LS, A1LR or A1LL will by being picked up open the lock circuit, whereas if this relay A1TP is deenergized the lock circuit will not be broken until at least two of these various push button repeating relays are in an energized condition. The operation of the system shown in Figs. 11 and 12 is identical to that shown in Fig. 9 and therefore this operation need not be discussed.

It will, of course, be understood that the back contacts 1015, 1016, 1017, 1018 and 1019 of the relays 2A1TP, 3A1TP, 4A1TP, 5A1TP and 6A1TP, respectively (Fig. 11) perform the same functions as do back contacts 1023, 1033 and 1043 of the relays 2A1TP, 3A1TP and 4A1TP (Fig. 9) respectively.

It should, however, be understood that the system shown in Figs. 11 and 12 may be slightly modified as already explained in connection with Fig. 9 to consolidate the common end fix of two boards, such as boards No. 5 and No. 6, into a common crossing fix existing on only one board, all in a manner as already described in connection with Fig. 9 of the drawings.

*Checking structure.*—Referring for a moment to Figs. 6C and 6E of the drawings it will be remembered that the hundreds digit "identity" posting unit IC1H (Fig. 6E) is at times controlled by a token such as token 122T located in token jack B2T (Fig. 6C), and that this token is intended to energize nine of the bus wires out of a total of ten bus wires 60, 61, 62, etc., the posting unit IC1H, of course, operating until its rotary contact arm 49 gets to a deenergized bus wire, at which point it will discontinue operation. Should a faulty open circuit exist either in the bus wire itself or as would more likely be the case in the token jack, or should one of the rectifiers 505 be open circuited, it becomes apparent that the posting unit IC1H would operate until it gets to the first one of the two deenergized wires and this could possibly cause the display of the wrong hundreds digit number of airplane identification. In order to prevent such a wrong display of an indication by a posting unit a checking system may be employed such as illustrated in Fig. 13 of the drawings. This check system has been shown applied to the bus wires for the hundreds digit of airplane identification, but may obviously be applied to each of the bus systems which control the various posting units illustrated in Fig. 6. Referring to Fig. 13 it will be observed that check relays CK0, CK1, CK2, CK3, CK4, CK5, CK6, CK7, CK8 and CK9 have been provided and that these respective check relays CK0, CK1, CK2, etc., are connected to the bus wires 60, 61, 62, etc. Each of these check relays has included in series therein a sneak circuit preventing rectifier to assure against false operation of any of these relays. Although these sneak circuit preventing rectifiers may not be necessary in that each possible sneak circuit would include at least two relay windings in series, nevertheless these rectifiers have been shown to assure against possible false operation. It will be observed that each of these check relays CK is provided with a front contact 1025 all connected in multiple in a circuit including a back contact 1026 of another check relay CKR. From this circuit construction it is readily seen that if any one of the relays CK0, CK1, CK2, etc., is energized that the bell or other suitable alarm BL will be sounded unless the check relay CKR is also energized and opens the circuit at the back contact 1026. It will also be observed that each of the check relays CK0, CK1, CK2, etc., is provided with contacts 1027 and 1028 and that these contacts 1027 and 1028 are so interconnected that the check relay CKR is picked up under all conditions of energization of the relays CK0, CK1, CK2, etc., except the condition where all of these relays are deenergized or the condition where all of these relays except one are energized. In other words, if any one or more of the bus wires 60, 61, 62, etc., are energized the check relay CKR will not be energized nor picked up unless there are a total of nine of these bus wires energized. Since for successful operation it is necessary to energize nine of the ten bus wires each time that a posting unit is to be operated and since under this condition the check relay CKR will be energized it will be observed that the alarm BL will be sounded under all attempted operations except when nine out of the ten bus wires are actually energized.

Referring now to Fig. 6G of the drawings it will be observed that the lead-out wires from all of the posting units terminate at the wire 96 and that this wire 96 is only connected to the (—) terminal of the battery B*af* if the master posting relay MPR is energized and holds its front contact 97 closed. In order to prevent false operation of any posting unit this wire 96 is taken through a front contact 1024 of the check relay CKR (see Fig. 13). If the checking feature of Fig. 13 is therefore applied to the system shown in Fig. 6 a plurality of such front contacts 1024 of relays such as relays CKR would be included in series in the wire 96 of Fig. 6G of the drawings, there being one such contact 1024 for each group of bus wires to which this checking feature is applied. It should be understood that this checking feature should be applied to each one of the bus systems for "identity," "estimate" arrival time, and "over-report" time.

*Résumé—Route network.*—Referring to Fig. 6A, for instance, it will be observed that if a route circuit is set up through posting 2, fix B, that both of the push button repeating relays B2LW and B2LE will be in their energized picked-up condition. Under this condition the open back contact 748 of the relay B2LW renders depression of the push button B2WX electrically ineffective to pick up combination relays *a, b* or *c* toward the left and open back contact 531 of the push button repeating relay B2LE renders the push button B2EX electrically ineffective to pick up similar combination relays toward the right. From this consideration it is obvious that no second route can be set up into or out of posting 2, fix B because both of the push buttons associated therewith are electrically ineffective.

Let us now assume that a route originated at posting 2, fix B, as was assumed in the operation hereinbefore described, it will be observed that in this case both of the contacts 546 and 547 of the token repeating relay B2TP were open before a push button B2WX or B2EX was depressed as a result of which no direction relay can be picked up at this posting-fix. If we now assume that the route was set up toward the right resulting in the picking up of the push button repeating relay B2LE, it will be observed that the push button B2WX is rendered ineffective by open back contacts 746 and 747 of the relays B2LE and B2TP respectively. The conclusion to be reached is that if a route starting at a particular posting-fix has been set up in a direction away from such posting-fix that no second route can be set up either into or out of that particular posting-fix. By study of the circuits for posting 2, fix B (Fig. 6A), it should also be observed that only one of the direction relays B2DE or B2DW can be picked up when the route does not originate at that posting-fix. This is true because each of these direction relays has a back contact of the other direction relay included in its energizing circuit. It will also be observed that picking up of the token repeating relay B2TP will by the opening of its back contact 504 isolate the in-bus INBUS from the out-bus OUTBUS and will by the closure of the front contact 504 apply network energy to the out-bus OUTBUS. This feature enables the out-bus OUTBUS and all of the route circuits beyond that point to be energized through a front contact of the token repeating relay at this posting-fix and leaves the in-bus INBUS energized through a front contact of an energized token repeating relay in the rear, so that deenergization of such token repeating relay in the rear causes cancellation and deenergization of all of the route circuits in the rear. It should also be noted that holding circuit energy for relays B2WL and B2DE is derived from link wire B2W; whereas, holding circuit energy for relays *a2, b2, c2* and B2DW is derived from link wire B2E, the push button repeater relay B2LE being indirectly stuck up by energy derived from this link wire B2E.

It should also be noted that if a route is set up left-to-right to posting 2, fix B, and the token is then advanced to this posting-fix that the token relay in this case is ineffective to render the push button B2EX ineffective because the front contact 534 of direction relay B2DE in this instance closes a shunt around open back contacts 533 and 535 of relays B2LW and B2TP, respectively.

Referring to the posting 1, fix C, common to both boards AF and LN (Figs. 6B and 6I), it will be observed that four direction relays C1DE, C1DW, C1DS, C1DN are provided and that each of these direction relays has included in series the back contacts of the other three direction relays. From this it will be understood that only one direction relay can be picked up at any one time. This feature is necessary to avoid two route circuits being extended into or out of a common posting-fix, such as posting 1, fix C.

Referring to posting 1, fix C (Figs 6B and 6I) it will be observed that the push button C1WX, for instance, will be electrically effective only if not more than one of the associated push button repeating relays is energized. In this connection it should be observed that when push button repeating relays C1LE and C1LN are both energized that their respective back contacts 420 and 421 in multiple will interrupt the circuit feeding energy to the push button C1WX, so that only one of these push button repeating relays C1LE or C1LN may be energized and still allow the push button C1WX to function electrically to result in the extension of a route circuit into or out of posting 1, fix C. What has been said about back contacts 420 and 421 of relays C1LE and C1LN is no less true of back contacts 422 and 423 of relays C1LE and C1LS, respectively, and of back contacts 424 and 425 of relays C1LN and C1LS, respectively. The circuit portions feeding energy to the push buttons C1EX (Fig. 6B), C1NX and C1SX (Fig. 6I) are likewise provided with multiple pairs of back contacts of push button repeater relays in series, from which the conclusion must be reached that of the four push button repeating relays provided at a common posting-fix only a maximum of two may be energized at a time, at least if the associated token repeating relays are all deenergized.

Referring now to posting 1, fix C, board AF (Fig. 6B) it will be observed that if a route is initiated at this posting 1, fix C the opening of the back contacts 496 and 497 of the token repeating relays C1TP will prevent either one of the two direction relays C1DE or C1DW being picked up. It should also be observed that open back contacts 417 and 485 of the token repeating relay C1TP(AF) allows only one of the two push button repeating relays C1LE or C1LW for board AF to be picked up, in that the opening of the back contact 418 of the push button repeating relay C1LE (Fig. 6B) renders the push button C1WX electrically ineffective and that open back contact 483 of the push button repeating relay C1LW renders the push button C1EX electrically ineffective. In other words, only one push button repeating relay for posting 1, fix C board AF may be picked up at a time when the route is initiated at that posting-fix. It will also be observed that the picking up of this token repeating relay C1TP(AF) (Fig. 6B) renders both of the push buttons C1NX and C1SX (Fig. 6I) electrically ineffective by the opening of back contacts 616 and 665 of the token repeating relay C1TP(AF) (Fig. 6I). It is thus seen that if a route circuit is started on one board having a fix common with a like designated fix of another board that only one out of a total of four push button repeating relays can be picked up on both the boards and that no direction relay can be picked up on either board. This is as it should be so as to avoid a second route being set up either into or out of such common posting-fix when a first route is started from that posting-fix. In this connection it should, however, be observed that if a route has been set up on one board to a common posting-fix and this route was not extended on a second board before the token was transferred to the common posting-fix of the first board that in this case the front contact of a direction relay which was already up will shunt the open back contact of the token repeating relay of the first board, see for instance front contacts 419 and 484 of direction relays C1DW and C1DE, respectively, for shunting the back contacts 417 and 485, respectively, of the token repeating relay C1TP(AF) (Fig. 6B), it being understood if such direction relay is in an energized condition its associated push button repeating relay is likewise in its energized condition to hold its back contact, such as 418 of relay C1LE or 483 of relay C1LW, open. This feature is necessary to permit a through route on one board to be continued on that same board after the token has been advanced to the common fix under consideration. In this connection it should be noted that if a route which was initiated on one board and then extended to a common fix, that this route cannot be extended on the second board after the token has been advanced to the common posting-fix of the first board. This is a necessary requirement in that if such extension of a route on a second board were permitted after the token has been advanced to the common posting-fix of the first board this same provision would permit a route to be started at a common fix and continued out on both boards at one time, a function which should be prevented.

Referring again to the common posting-fix under consideration (Figs. 6B and 6I) it will be observed that the in-bus INBUS is connected to the out-bus OUTBUS through back contacts 415 and 615 in series of the relays C1TP(AF) and C1TP(LN) respectively so that if either one of these two token repeating relays C1TP is in a picked-up condition the in-bus and out-bus will be isolated from each other in which case the out-bus OUTBUS is energized through the front contact 406 or 606, as the case may be, of the respective token repeating relays C1TP(AF) and C1TP(LN).

It will be observed that every posting-fix whether it is a regular posting-fix or a common posting-fix has a circuit structure to prevent a push button being electrically effective if its associated push button repeating relay is in an energized condition. In other words, a push button may be used only once during a particular route set up for energizing a group of combination relays a, b, or c. Should the operator have continued a route to the wrong posting of a particular fix he may cancel out this wrong extension by pulling out the two push buttons that were manipulated when such extension was set up. This is accomplished through the medium of the associated pull contacts, such as pull contacts 538 and 472 of push buttons B2EX and C1WX, respectively, for instance. The cancel push buttons CPB shown in the upper right-hand corner of Figs. 6B and 6H of the drawings are used to drop the last token repeating relay in any particular route, that is, the token repeating relay located at terminating posting-fix of a route.

Comparing the circuit structure at a common fix illustrated in Figs. 6B and 6I with that illustrated in Fig. 9, the principle difference between these two systems resides in the locking circuits which feed energy to the push buttons. In the first structure (Figs. 6B and 6I) three pairs of back contacts of push button repeating relays are included in series and in addition have been provided in series therewith with back contacts of the associated two token repeating relays, of which the back contact of the token repeating relay of the board under consideration is shunted by either a front contact of the opposite direction relay or by a back contact of the push button repeating relay associated with such opposite direction relay for that posting fix of that board; whereas, in the Fig. 9 construction back contacts of the token repeating relay of the board under consideration are used to render one contact of each pair of the back contacts of push button repeating relays ineffective when such token repeating relay assumes its energized position. The functions performed by these contacts in the two circuit structures are substantially the same. There is, however, this difference that in the structure of Figs. 6B and 6I by reason of the provision of a front contact of a direction relay, such as front contact 519 of direction relay C2DW, allows the token to be advanced to that posting-fix before the route is extended beyond that fix. This is not possible when the structure of Figs. 9 and 10 is employed, because if a token is once inserted in a jack of a common fix to which a route circuit has once been set up, the route circuit cannot be extended either on the original board (if a crossing is involved) or on a second board by reason of the open back contacts of a particular token repeating relay, such as back contacts 1021, 1022 and 1023 of relay 2AITP, for instance (Fig. 9). In neither case, however, can a route which was initiated on a first board be extended on a second board after the token has been inserted in a token jack of the common fix of the first board.

In both of the route network structures under consideration the push button repeating relays controlled by the combination relays a, b and c are slow to pick up, whereas the other push button repeating relays and the direction relays are slow dropping, all as conventionally shown. The first mentioned push button repeating relay, such as relay B2LE (Fig. 6A) is slow enough in picking up so that an adjacent push button relay, such as C1LW (Fig. 6B) may pick up through the back contact 537 of the former relay, and the associated relays a2, b2, c2 and C2LW are slow enough dropping that they will not drop during the picking up of relay B2LE, which latter relay by picking up at its front contact 510 closes stick circuits for the relays a2, b2, c2 and C2LW. The direction relays are made slow dropping so as not to drop during the transition of an in-bus being isolated from its associated out-bus and the application of current to such out-bus for reasons heretofore pointed out.

*Resume—Posting network.*—The principal reason for energizing all but one of the lead-in wires for each posting unit and connecting these lead-in wires to the clutch coil CM of that unit one at a time, instead of energizing only one such lead-in wire and connecting all but one of the lead-in wires to the clutch coil CM, is to avoid the establishment of run-around or sneak circuits when a plurality of posting units are connected to the same posting bus wires as they all are at all times in the present system. In the prior application of Wight and Field, Ser. No. 489,774, filed June 5, 1943, the last mentioned arrangement was used and in that construction a sneak circuit preventing rectifier was inserted in each lead-in wire so as to allow current flow from the bus wire into but not out of the posting unit. Since only one of the lead-in wires of a posting unit in the present construction is connected to its clutch coil at any one time, no such rectifiers are required. Also since only one of the lead-in wires of a posting unit is connected to its clutch coil at one time, the position of such posting unit can most easily be manifested by feeding energy from a special source out from such posting unit over such wire and that is what is done in the disclosure in the present application. For reasons heretofore pointed out this electrical manifestation of the position assumed by a posting unit is used to copy or repost the airplane identification number from a common fix of a second board to subsequent fixes of such second board. Since this manifestation consists of a single energized wire for each digit and since all but one of the wires for such digit must be energized to operate the posting unit to a particular digit number conversion relays (see Figs. 6G and 6N) have been provided to convert a single energized wire, energized from one source, to a condition where all of the other wires for such digit are energized from another source. The over-report cancelling push button OCB is provided to enable the over-report operator to cancel a wrong set-up of over-report information. It performs two functions in that by the opening of its normally closed contact, it drops the over-report master posting relay MOP and by the closing of its normally open contact it energizes the one or more latch magnets LM.

*Analyzing conflicts.*—Referring to Figs. 4 and 5 of the drawings four flight routes 333, 444, 555 and 666 have been illustrated displayed on the flight progress boards, the flight routes 333 and 555 being south-east bound and the flight routes 444 and 666 being north-west bound. It is desired to point out that although flight routes 555 and 666 cross common fix C at the same altitude no hazard is established, whereas flight routes 333 and 444 cross fix C at different altitudes a dangerous condition is established and these latter flight routes should not be cleared without special instructions to the pilot. The danger imposed by these latter two routes lies in the fact that airplane 444 might make its descent late in moving from fix N to fix C, that is, make it near fix C; whereas airplane 333 might make its descent early in moving from fix C to fix N, that is, make its descent near fix C. If under this condition either airplane 333 were a little early or airplane 444 were a little late a collision could easily occur. Since these fixes C and N are more than an hour flying time apart the hazard could be easily removed by instructing each pilot to make his descent near fix N between fixes C and N. The times at which these planes are located just north of fix N are sufficiently different so as not to constitute a hazard. No hazard is established as between flight routes 555 and 666 in the territory fix C to fix N because airplane 666 should reach fix C at least 11 minutes before airplane 555 reaches fix C. As to the territory fix B to fix C there is no hazard on the assumption that the pilot of airplane 666 has been instructed to make his descent early in flying from fix C to fix B. It is proposed to be in the discretion of the operator or dispatcher as to the margin of safety to allow. It is, however, assumed that if two airplanes are routed so as to pass the same point in space they must be scheduled at least ten minutes apart in order to avoid a dangerous or hazardous condition.

Having thus shown and described one complete system embodying the present invention, which may if desired include the checking structure shown and described, together with modified forms of route network circuit constructions, it is desired to be understood that the embodiments of the invention disclosed herein have been selected to illustrate at least several forms that the invention may take and have also been selected to illustrate the nature of the invention, and the manner in which the invention may be used for airway traffic control and display purposes, and it should be understood that the invention may take various other forms and that various changes, modifications and additions may be made to adapt the invention to the various actual flight route problems encountered in practicing the invention, all without departing from the spirit or scope of the invention except as demanded by the scope of the following claims.

What we claim as new is:

1. In an airplane flight route display system, two posting units each including a movable mechanism capable of assuming positions to display a predetermined number of characters, a bus wire for each character, a lead-in wire for each character for each posting unit and permanently connected to the corresponding bus wire, electro-responsive means for each unit for when energized causing the operation of the associated mechanism, contact mechanism for each unit for connecting said lead-in wires to the associated electro-responsive means one at a time as said mechanism is operated, a lead-out wire for each unit, a conversion relay for each bus wire having its one terminal connected to such bus wire and having its other terminal at times connected to a special source of current and having front contacts to connect one terminal of the regular source of current to all of the other bus wires, means for connecting all but one of said bus wires to one terminal of a first source of current and connecting the lead-out wire of one of said posting units to the other terminal of such first source to cause said one posting unit to assume a position to display the character corresponding to the character of the deenergized bus wire, means for connecting the other terminal of said special source of current to the lead-in terminal of the electro-responsive means of said one posting unit to cause energization of the conversion relay connected to the said one bus wire by current from said special source to in turn cause all of the other bus wires to be connected to said one terminal of said regular source of current through the medium of said conversion relay, and means for connecting the lead-out wire of said other posting unit to the other terminal of said regular source of current to cause said other posting unit to be operated to the same position as that assumed by said one posting unit.

2. In combination, a plurality of posting units each having an operating mechanism which may assume positions to define a plurality of characters one for each position, a bus including a plurality of bus wires one for each character, electro-responsive means for each unit which when energized will cause operation of the mechanism of such unit, contact mechanism for each unit for successively connecting said bus wires to one terminal of its electro-responsive means one at a time so long as said mechanism is operating, a lead-out wire for each posting unit connected to the other terminal of its electro-responsive means, means for connecting all but one of said bus wires to one terminal of a source of current and connecting the lead-out wire of one of said posting units to the other terminal of said source to cause such one posting unit to assume the position defined by the deenergized bus wire, and means for electrically detecting the position assumed by said one posting unit including a circuit including the contact mechanism of said posting unit and the wire which was deenergized when the operating mechanism of such posting unit was last operated.

3. In combination, a posting unit including a movable mechanism capable of assuming a plurality of positions one position for each character, a multiple wire bus structure including one bus wire for each character, an electro-responsive device for said unit for when energized operating said mechanism, contact mechanism for connecting said bus wires to said electro-responsive device one at a time when said mechanism is operating, a lead-out wire for said posting unit, means constructed to when effective connect one terminal of a current source to all but one of said bus wires, and means for connecting the other terminal of said source to the lead-out wire of said posting unit only if all but one of said bus wires are actually energized.

4. In combination, a posting unit including a movable mechanism capable of assuming a plurality of positions one position for each character, a multiple wire bus structure including one bus wire for each character, an electro-responsive device for said unit for when energized operating said mechanism, contact mechanism for connecting said bus wires to said electro-responsive device one at a time when said mechanism is operating, a lead-out wire for said posting unit, means constructed to when effective connect one terminal of a current source to all but one of said bus wires, and means for connecting the other terminal of said source to the lead-out wire of said posting unit only if all but one of said bus wires are actually energized and for sounding an audible signal if some other condition of energization of said bus wires exists.

5. In combination, a posting unit including a movable mechanism capable of assuming a plurality of positions one position for each character to be displayed by said posting unit, a multiple wire bus structure including one bus wire for each character, an electro-responsive device for said unit for when energized operating said mechanism, contact mechanism for connecting said bus wires to said electro-responsive device one at a time when said mechanism is operating, a lead-out wire for said posting unit, means for connecting one terminal of a current source to all but one of said bus wires and connecting the other terminal of said source to said lead-out wire, and means for manifesting every other condition of energization of said bus wires than all but one of said bus wires energized.

6. In combination, a posting unit including a movable mechanism capable of assuming a plurality of positions one position for each character to be displayed by said posting unit, a multiple wire bus structure including one bus wire for each character, an electro-responsive device for said unit for when energized operating said mechanism, contact mechanism for connecting said bus wires to said electro-responsive device one at a time when said mechanism is operating, a lead-out wire for said posting unit, a set of conversion relays one relay for each bus wire and each having one terminal connected to such bus wire and having the other terminal connected to one terminal of a special source of current and each having front contacts which if closed connect one terminal of a regular source of current to all but said one of said bus wires, the other terminal of said regular source of current being connected to said lead-out wire, and manually controlled means for connecting the other terminal of said special source of current to said one bus wire.

7. In a display system, the combination with a plurality of posting areas on a display board, a posting unit for each posting area, each unit including a movable mechanism capable of assuming positions to display a predetermined number of characters, a multiple bus including a bus wire for each character which may be displayed by the posting units, a lead-in wire for each character for each posting unit and permanently connected to the corresponding bus wire, electro-responsive means for each posting unit for when energized causing the operation of the associated mechanism, contact mechanisms for each posting unit for deenergizing said electro-responsive means when said mechanism has been operated to a position where said contact mechanism connects only a deenergized bus wire to its electro-responsive means, a lead-out wire for each posting unit, means for energizing all but one of said bus wires from one terminal of a regular source of current to characterize a position a posting unit is to assume and for connecting the lead-out wire of one posting unit to the other terminal of such source of current to cause the mechanism of said one posting unit to be operated to display a character corresponding to the character of the deenergized bus wire, a conversion relay for each bus wire each relay having one terminal of its winding connected to such bus wire and having the other terminal connected to one terminal of a special source of current and having front contacts to apply energy from one terminal of a third source of current to all of the bus wires except the bus wire to which the winding of such relay is connected, means including said contact mechanism of said one posting unit for connecting the other terminal of said special source of current to said deenergized bus wire, and means for connecting the lead-out wire of another posting unit to the other terminal of said third source of current to cause this latter posting unit to be operated to a position to display the same character as is displayed by said one posting unit.

8. An annunciator of the type described comprising; a movable indicating mechanism capable of assuming positions to display any one of a predetermined number of characters; a lead-in wire for each character; electro-responsive means for, when energized, driving said mechanism; contact mechanism for connecting said lead-in wires to one terminal of said electro-responsive means one at a time as said mechanism is operated; a lead-out wire connected to the other terminal of said electro-responsive means; means for connecting all but any selected one of said lead-in wires to one terminal of a source of current; and means effective to connect the other terminal of said source to said lead-out wire only if all but one of said lead-in wires in any combination are connected to said one terminal of said source; whereby said annunciator is energized for operation only if all lead-in wires except one are connected to said one terminal of said source.

9. An annunciator system of the type described comprising; a plurality of movable indicating mechanisms each capable of assuming positions to display any one of a predetermined number of characters; a lead-in wire for each character for each mechanism of which the lead-in wires for like characters are permanently connected together; electro-responsive means for each mechanism for, when energized, driving said mechanism; contact mechanism for each indicating mechanism for connecting the lead-in wires of such mechanism to one terminal of the associated electro-responsive means one at a time as said mechanism is operated; a lead-out wire for each indicating mechanism connected to the other terminal of the associated electro-responsive means; means for connecting all but any selected one of said lead-in wires to one terminal of a source of current to characterize a particular character; and means for connecting the other terminal of said source to the lead-out wires of only those indicating mechanisms which are to be operated to display that character effective only if all but one of said lead-in wires in any combination are connected to said one terminal of said source; whereby even though all like character characterizing wires of a plurality of indicating mechanisms are permanently connected together selected ones only may be operated selectively simultaneously and such selected ones are energized for operation only if all lead-in wires except one are connected to said one terminal of said source.

10. In a display system; two posting units each including a movable mechanism capable of assuming positions to display a predetermined number of characters; a bus wire for each character; a lead-in wire for each character for each posting unit and permanently connected to the corresponding bus wire; electro-responsive means for each unit for when energized causing the operation of the mechanism of such unit; contact mechanism for each unit for connecting said lead-in wires to one terminal of the associated electro-responsive means one at a time as said mechanism is operated; a lead-out wire for each unit connected to the other terminal of its electro-responsive means; means for connecting all but one of said bus wires to one terminal of a source of current and connecting one, the other, or both of the two lead-out wires to the other terminal of such source to cause one, the other, or both of said posting units to assume positions to display the character corresponding to the character of the deenergized bus wire; and means for each bus wire having one of its terminals connected to such bus wire and having its other terminal connected to one terminal of a special source of current, whereby electrical manifestation of the position assumed by any one of said posting units is obtained by connecting the contact mechanism of said one posting unit to the other terminal of said special source of current and by observing the behavior of said last mentioned means.

11. In combination, a posting unit having one lead-out wire connected to one terminal of a first source of current and having a plurality of lead-in wires and including electro-responsive operating means included in series with said lead-out wire and effective when all but one of said lead-in wires are connected to the other terminal of said first source to operate said unit to a position corresponding to said one lead-in wire, a relay for each lead-in wire each having one terminal of its winding connected to such lead-in wire and having its other terminal connected to one terminal of a second source of current, contacts for each relay effective when such relay assumes its energized position to connect the other terminal of said first source to all of said lead-in wires except the lead-in wire to which its winding is connected, whereby if a particular lead-in wire is connected to the other terminal of said second source the relay associated with that lead-in wire will assume its energized position to cause the other terminal of said first source of current to be connected to all of the lead-in wires except the one to which such relay is connected and to thereby cause said posting unit to be operated to a position corresponding to that particular lead-in wire.

12. In combination, a posting unit having one lead-out wire connected to one terminal of a first source of current and having a plurality of lead-in wires and including electro-responsive operating means included in series with said lead-out wire and effective when all but one of said lead-in wires are connected to the other terminal of said first source to operate said unit to a position corresponding to said one lead-in wire, a relay for each lead-in wire each having one terminal of its winding connected to such lead-in wire and having its other terminal connected to one terminal of a second source of current, contacts for each relay effective when such relay assumes its energized position to connect the other terminal of said first source to all of said lead-in wires except the lead-in wire to which its winding is connected, and manually controllable means for connecting a particular lead-in wire to the other terminal of said second source, whereby the relay associated with that particular lead-in wire will assume its energized position to cause the other terminal of said first source of current to be connected to all of the lead-in wires except the one to which such relay is connected and to thereby cause said posting unit to be operated to a position corresponding to that particular lead-in wire.

SEDGWICK N. WIGHT.
OSCAR S. FIELD.
OSCAR H. DICKE.